United States Patent
Fan et al.

(10) Patent No.: US 12,063,682 B2
(45) Date of Patent: Aug. 13, 2024

(54) DATA TRANSMISSION METHOD AND APPARATUS

(71) Applicant: HUAWEI TECHNOLOGIES CO., LTD., Guangdong (CN)

(72) Inventors: Bo Fan, Chengdu (CN); Xi Zhang, Ottawa (CA); Lu Rong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 359 days.

(21) Appl. No.: 17/219,151

(22) Filed: Mar. 31, 2021

(65) Prior Publication Data

US 2021/0219336 A1 Jul. 15, 2021

Related U.S. Application Data

(63) Continuation of application No. PCT/CN2020/074549, filed on Feb. 7, 2020.

(30) Foreign Application Priority Data

Sep. 30, 2019 (WO) ............... PCT/CN2019/109608

(51) Int. Cl.
*H04W 74/00* (2009.01)
*H04W 72/1273* (2023.01)
*H04W 74/04* (2009.01)

(52) U.S. Cl.
CPC ..... *H04W 74/006* (2013.01); *H04W 72/1273* (2013.01); *H04W 74/04* (2013.01)

(58) Field of Classification Search
None
See application file for complete search history.

(56) References Cited

U.S. PATENT DOCUMENTS

| 2019/0222289 A1 | 7/2019 | John Wilson et al. |
| 2019/0297637 A1* | 9/2019 | Liou ................ H04W 72/1273 |
| 2019/0297640 A1* | 9/2019 | Liou ...................... H04L 5/001 |

FOREIGN PATENT DOCUMENTS

| CN | 109802787 A | 5/2019 |
| CN | 110167036 A | 8/2019 |
| WO | 2019099659 A1 | 5/2019 |

OTHER PUBLICATIONS

"Qualcomm Incorporated, Remaining Details on QCL," 3GPP TSG RAN WG1 Meeting #92, R1-1802832, Athens, Greece, Feb. 26-Mar. 2, 2018, 13 pages.

(Continued)

*Primary Examiner* — Frantz Bataille
(74) *Attorney, Agent, or Firm* — Fish & Richardson P.C.

(57) ABSTRACT

This application provides a data transmission method and apparatus, to determine a TC-state used for data transmission and correctly receive downlink data, thereby improving data transmission efficiency. The method includes: receiving a first physical downlink control channel (PDCCH), where the first PDCCH is used to schedule a first physical downlink shared channel (PDSCH); receiving a downlink signal by using a first transmission configuration indicator state (TC-state); obtaining a time interval between the first PDCCH and the first PDSCH; and if the time interval is less than a preset threshold, obtaining the first PDSCH from the downlink signal.

26 Claims, 6 Drawing Sheets

(56) References Cited

OTHER PUBLICATIONS

ZTE, "Enhancements on Multi-TRP and Multi-panel Transmission," 3GPP TSG RAN WG1 #96bis, R1-1904013, Xi'an, China, Apr. 8-12, 2019, 13 pages.

Intel Corporation, "Discussion on multi-TRP/multi-panel transmission," 3GPP TSG RAN WG1 Meeting #95, R1-1812509, Spokane, USA, Nov. 12-16, 2018, 13 pages.

3GPP TS 38.331 V15.7.0 (Sep. 2019), 3rd Generation Partnership Project; Technical Specification Group Radio Access Network; NR; Radio Resource Control (RRC) protocol specification (Release 15), Sep. 2019, 527 pages.

ZTE, "Considerations on beam management for multi-TRP," 3GPP TSG RAN WG1 #97, R1-1906244, Reno, USA, May 13-17, 2019, 7 pages.

3GPP TS 38.214 V15.7.0 (Sep. 2019), "3rd Generation Partnership Project; Technical Specification Group Radio Access Network; NR; Physical layer procedures for data (Release 15)," Sep. 2019, 106 pages.

3GPP TS 38.211 V15.7.0 (Sep. 2019), "3rd Generation Partnership Project; Technical Specification Group Radio Access Network; NR; Physical channels and modulation (Release 15)," Sep. 2019, 97 pages.

3GPP TS 38.212 V15.7.0 (Sep. 2019), "3rd Generation Partnership Project; Technical Specification Group Radio Access Network; NR; Multiplexing and channel coding (Release 15)," Sep. 2019, 101 pages.

3GPP TS 38.213 V15.7.0 (Sep. 2019), "3rd Generation Partnership Project; Technical Specification Group Radio Access Network; NR; Physical layer procedures for control (Release 15)," Sep. 2019, 108 pages.

PCT International Search Report and Written Opinion in International Application No. PCT/CN2019/109608, dated Jun. 29, 2020,9 pages.

PCT International Search Report and Written Opinion in International Application No. PCT/CN2020/074549, dated Jun. 28, 2020, 11 pages.

* cited by examiner

| R | Serving cell ID | BWP ID | Oct 1 |
|---|---|---|---|
| $C_0$ | TCI-state $ID_{0,1}$ | | Oct 2 |
| $S_0$ | TCI-state $ID_{0,2}$ | | Oct 3 |
| ⋮ | | | |
| $C_N$ | TCI-state $ID_{N,1}$ | | Oct M-1 |
| $S_N$ | TCI-state $ID_{N,2}$ | | Oct M |

FIG. 13

DATA TRANSMISSION METHOD AND APPARATUS

CROSS-REFERENCE TO RELATED APPLICATIONS

This application is a continuation of International Application No. PCT/CN2020/074549, filed on Feb. 7, 2020, which claims priority to International Patent Application No. PCT/CN2019/109608, filed on Sep. 30, 2019. The disclosures of the aforementioned applications are hereby incorporated by reference in their entireties.

TECHNICAL FIELD

This application relates to the communications field, and in particular, to a data transmission method and apparatus in the communications field.

BACKGROUND

A 5th generation (5G) mobile communications system uses high-frequency communication, that is, uses an ultra-high frequency band (>6 GHz) signal to transmit data. A main problem of the high-frequency communication is that energy of a signal sharply decreases as a transmission distance increases, resulting in a short transmission distance of the signal. To overcome this problem, an analog beam technology is used in the high-frequency communication, and a large-scale antenna array is used for processing, so that signal energy is concentrated in a relatively small range, to form a signal similar to an optical beam, and the signal is referred to as an analog beam (which is referred to as a beam for short), thereby extending a transmission distance.

A network device may generate different beams that point to different transmission directions. During downlink data transmission, the network device sends data to a terminal device by using a particular beam, and notifies the terminal device of information about a transmit beam used by the terminal device. In this way, the terminal device uses a correct receive beam (namely, a receive beam corresponding to the transmit beam) to receive the data sent by the network device. For example, the information about the transmit beam may be indicated by using a transmission configuration indicator (TCI) field in downlink control information (DCI), and each value of the TCI field corresponds to an index of one TCI-state (TCI-state), to uniquely identify the TCI-state. The TCI-state is used to determine the information about the transmit beam for data transmission. Therefore, determining the information about the transmit beam for data transmission may also be equivalent to determining a TCI-state for data transmission. How the terminal device determines the TCI-state used for data transmission and receives downlink data by using the determined TCI-state is a problem that urgently needs to be resolved.

SUMMARY

This application provides a data transmission method and apparatus, to determine a TCI-state used for data transmission and correctly receive downlink data, thereby improving data transmission efficiency.

According to a first aspect, a data transmission method is provided. The method includes: receiving a first physical downlink control channel (PDCCH), where the first PDCCH is used to schedule a first physical downlink shared channel (PDSCH); receiving a downlink signal by using a first transmission configuration indicator state (TCI-state); obtaining a time interval between the first PDCCH and the first PDSCH; and if the time interval is less than a preset threshold, obtaining the first PDSCH from the downlink signal.

According to the data transmission method in this embodiment of this application, a terminal device can determine, in a plurality of manners, a TCI-state used by a network device for data transmission, so that the terminal device determines a receive beam based on the TCI-state, and receives data sent by the network device, thereby improving data transmission efficiency.

With reference to the first aspect, in some implementations of the first aspect, the first TCI-state is a TCI-state included in a TCI-state group corresponding to a smallest or largest TCI field value in one or more TCI-state groups that include a TCI-state used by the first PDCCH, where the TCI-state group corresponds to one TCI field value, and the TCI-state group includes one TCI-state or two TCI-states.

In other words, there may be one TCI-state group including the TCI-state used by the first PDCCH, or there may be a plurality of TCI-state groups that include the TC-state used by the first PDCCH. If there is one TCI-state group including the TCI-state used by the first PDCCH, the first TCI-state is the TCI-state included in the TCI-state group. If there are a plurality of TCI-state groups that include the TCI-state used by the first PDCCH, the first TCI-state is a TCI-state included in a TCI-state group corresponding to a smallest or largest TCI field value in the plurality of TCI-state groups.

For example, the terminal device may use the TCI-state used by the first PDCCH as one of the first TCI-states. Then, the terminal device determines, in each active TCI-state group used for PDSCH transmission (where each TCI-state group corresponds to one TCI field value of a TCI field in DCI), all TCI-state groups that include one of the first TCI-states. Finally, the terminal device selects one TCI-state group (for example, the TCI-state group corresponding to the smallest or largest TCI field value) from these TCI-state groups, and uses all TCI-states included in the TCI-state group as first TCI-states used by the terminal device to receive the downlink signal. If the TCI-state group determined by the terminal device includes one TCI-state, the first TCI-state is the TCI-state. In other words, the terminal device receives the downlink signal by using the first TCI-state. If the TCI-state group determined by the terminal device includes two TCI-states, the first TCI-states are the two TCI-states. In other words, the terminal device receives the downlink signal by using the two first TCI-states.

With reference to the first aspect, in some implementations of the first aspect, the first TCI-state is a TCI-state included in a TCI-state group corresponding to a smallest or largest TCI field value in one or more TCI-state groups that include the TCI-state used by the first PDCCH and that include two TCI-states.

In other words, there may be one TCI-state group that includes two TCI-states and that includes the TCI-state used by the first PDCCH, or there may be a plurality of TCI-state groups that include two TCI-states and that include the TCI-state used by the first PDCCH. If there is one TCI-state group that includes two TCI-states and that includes the TCI-state used by the first PDCCH, the first TCI-state is the TCI-state included in the TCI-state group. If there are a plurality of TCI-state groups that include two TCI-states and that include the TCI-state used by the first PDCCH, the first TCI-state is a TCI-state included in a TCI-state group corresponding to a smallest or largest TCI field value in the plurality of TCI-state groups.

With reference to the first aspect, in some implementations of the first aspect, if there is no one or more TCI-state groups that include the TCI-state used by the first PDCCH, the first TCI-state is the TCI-state used by the first PDCCH.

This embodiment of this application provides a rollback mechanism, so that when the terminal device cannot find a TCI-state group that can meet a requirement, the terminal device may use one TCI-state as a unique first TCI-state.

With reference to the first aspect, in some implementations of the first aspect, when no activation signaling is received, the first TCI-state is the TCI-state used by the first PDCCH.

With reference to the first aspect, in some implementations of the first aspect, the first TCI-state is a TCI-state included in a TCI-state group corresponding to a smallest or largest TCI field value in one or more TCI-state groups that include an active TCI-state in a control resource set (CORESET) with a smallest or largest index in one or more latest received CORESETs, where the TCI-state group corresponds to one TCI field value, and the TCI-state group includes one TCI-state or two TCI-states.

In other words, one (for example, the CORESET with the smallest or largest index) of the one or more CORESETs that are latest received (for example, received in a latest slot) may also be referred to as a "target CORESET". There may be one or more latest received CORESETs. If the terminal device latest receives one CORESET, the target CORESET is the CORESET. If the terminal device latest receives a plurality of CORESETs, the target CORESET may be a CORESET with a smallest or largest index in the plurality of CORESETs. There may be one TCI-state group including an active TCI-state in the target CORESET, or there may be a plurality of TCI-state groups that include an active TCI-state in the target CORESET. If there is one TCI-state group including the active TCI-state in the target CORESET, the first TCI-state is the TCI-state included in the TCI-state group. If there are a plurality of TCI-state groups that include the active TCI-state in the target CORESET, the first TCI-state is a TCI-state included in a TCI-state group corresponding to a smallest or largest TCI field value in the plurality of TCI-state groups.

With reference to the first aspect, in some implementations of the first aspect, the first TCI-state is a TCI-state included in a TCI-state group corresponding to a smallest or largest TCI field value in one or more TCI-state groups that include the active TCI-state in the CORESET with the smallest or largest index in the one or more latest received CORESETs and that include two TCI-states.

In other words, there may be one TCI-state group that includes two TCI-states and that includes the active TCI-state in the target CORESET, or there may be a plurality of TCI-state groups that include two TCI-states and that include the active TCI-state in the target CORESET. If there is one TCI-state group that includes two TCI-states and that includes the active TCI-state in the target CORESET, the first TCI-state is the TCI-state included in the TCI-state group. If there are a plurality of TCI-state groups that include two TCI-states and that include the active TCI-state in the target CORESET, the first TCI-state is a TCI-state included in a TCI-state group corresponding to a smallest or largest TCI field value in the plurality of TCI-state groups that include the two TCI-states.

With reference to the first aspect, in some implementations of the first aspect, if there is no one or more TCI-state groups that include the active TCI-state in the CORESET with the smallest or largest index in the one or more latest received CORESETs, the first TCI-state is the active TCI-state in the CORESET with the smallest or largest index in the one or more latest received CORESETs.

With reference to the first aspect, in some implementations of the first aspect, when no activation signaling is received, the first TCI-state is the active TCI-state in the CORESET with the smallest or largest index in the one or more latest received CORESETs, where the activation signaling is used to activate a TCI-state used for PDSCH transmission.

With reference to the first aspect, in some implementations of the first aspect, the first TCI-states are two TCI-states used to latest transmit a second PDSCH, and the second PDSCH is transmitted by using the two TCI-states; or the first TCI-state is a TCI-state in a TCI-state group corresponding to a smallest or largest TCI field value in a plurality of TCI-state groups used for PDSCH transmission, and the TCI-state group includes two TCI-states; or the first TCI-states are two TCI-states used to transmit the first PDCCH; or the first TCI-states are two currently active TCI-states in a control resource set (CORESET) with a smallest or largest index in one or more CORESETs received in a latest slot.

Optionally, a time interval between the second PDSCH and a PDCCH that is used to schedule the second PDSCH is not less than the preset threshold. For example, before current transmission, the network device has performed PDSCH transmission with the terminal device for one or more times. Some PDSCHs are transmitted by using a single TCI-state, and some PDSCHs are transmitted by using two TCI-states. In the PDSCHs that are transmitted by using two TCI-states, scheduling time intervals of some PDSCHs are less than the preset threshold, and scheduling time intervals of some PDSCHs are not less than the preset threshold. In this case, the terminal device may receive and buffer a signal by using a TCI-state used by a PDSCH that is transmitted by latest using two TCI-states and whose scheduling time interval is not less than the preset threshold.

With reference to the first aspect, in some implementations of the first aspect, the first TCI-state is the TCI-state in the TCI-state group corresponding to the smallest or largest TCI field value in the plurality of TCI-state groups used for PDSCH transmission, and the TCI-state group includes the two TCI-states.

With reference to the first aspect, in some implementations of the first aspect, the first TCI-states are the two TCI-states used to transmit the first PDCCH.

With reference to the first aspect, in some implementations of the first aspect, the first TCI-states are the two currently active TCI-states in the CORESET (for example, the CORESET with the smallest or largest index) of the one or more CORESETs that are latest received (for example, received in the latest slot).

With reference to the first aspect, in some implementations of the first aspect, after determining the two first TCI-states by using the foregoing method, the terminal device may determine, depending on whether the two first TCI-states can be simultaneously received, whether to roll back to a transmission mode in which a single first TCI-state is used. For example, after determining the two first TCI-states, the terminal device finds that the two first TCI-states cannot be simultaneously received by the terminal device. In this case, the terminal device may use a unique first TCI-state. Optionally, the unique first TCI-state may be one first TCI-state or the other first TCI-state in the two first TCI-states. Optionally, the unique first TCI-state may alternatively be the active TCI-state in the CORESET with the smallest or largest index in the one or more CORESETs that are latest received (for example, received in the latest slot). Optionally, the unique first TCI-state may alternatively be the TCI-state used by the first PDCCH.

It should be understood that "the two first TCI-states cannot be simultaneously received" means that receive beams corresponding to the two first TCI-states are different. However, the terminal device has only one antenna panel, or only one antenna panel of the terminal device is enabled. Therefore, the terminal device cannot simultaneously generate two different receive beams for receiving.

With reference to the first aspect, in some implementations of the first aspect, the method further includes: if the time interval is greater than or equal to the preset threshold, and the first PDCCH does not carry information about a TCI-state, determining a second TCI-state, and receiving the first PDSCH by using the second TCI-state.

If the first PDCCH carries the information about the TCI-state, for example, a type of DCI carried in the first PDCCH is a DCI format 1_1, and a parameter tci-PresentIn-Dci in a CORESET corresponding to the first PDCCH is configured as "enabled", the terminal device may use two TCI-states indicated by the information about the TCI-state in the DCI as two second TCI-states used to transmit the first PDSCH.

If the first PDCCH does not carry the information about the TC-state, for example, the type of the DCI carried in the first PDCCH is a DC format 1_0, or the parameter tci-PresentInDci is not configured in the CORESET corresponding to the first PDCCH, there is no TCI field in the DCI, and the information about the TCI-state cannot be indicated. The terminal device may determine the second TCI-state by using any one of the following methods.

With reference to the first aspect, in some implementations of the first aspect, the second TCI-state is a TCI-state included in the TCI-state group corresponding to the smallest or largest TCI field value in the one or more TCI-state groups that include the TCI-state used by the first PDCCH, where the TCI-state group corresponds to one TCI field value, and the TCI-state group includes one TCI-state or two TCI-states.

In other words, there may be one TCI-state group including the TCI-state used by the first PDCCH, or there may be a plurality of TC-state groups that include the TCI-state used by the first PDCCH. If there is one TCI-state group including the TCI-state used by the first PDCCH, the second TCI-state is the TCI-state included in the TCI-state group. If there are a plurality of TCI-state groups that include the TCI-state used by the first PDCCH, the second TCI-state is a TCI-state included in a TCI-state group corresponding to a smallest or largest TCI field value in the plurality of TCI-state groups.

For example, the terminal device may use the TCI-state used by the first PDCCH as one of the second TCI-states. Then, the terminal device determines, in each active TCI-state group used for PDSCH transmission (where each TCI-state group corresponds to one TCI field value of a TCI field in DCI), all TCI-state groups that include one of the second TCI-states. Finally, the terminal device selects one TCI-state group (for example, the TCI-state group corresponding to the smallest or largest TCI field value) from these TCI-state groups, and uses all TCI-states included in the TCI-state group as second TCI-states used by the terminal device to receive the downlink signal. If the TCI-state group determined by the terminal device includes one TCI-state, the second TCI-state is the TCI-state. In other words, the terminal device receives the downlink signal by using the second TCI-state. If the TCI-state group determined by the terminal device includes two TCI-states, the second TCI-states are the two TCI-states. In other words, the terminal device receives the downlink signal by using the two second TCI-states.

With reference to the first aspect, in some implementations of the first aspect, the second TCI-state is a TCI-state included in the TCI-state group corresponding to the smallest or largest TCI field value in the one or more TCI-state groups that include the TCI-state used by the first PDCCH and that include two TCI-states.

In other words, there may be one TCI-state group that includes two TCI-states and that includes the TCI-state used by the first PDCCH, or there may be a plurality of TCI-state groups that include two TCI-states and that include the TCI-state used by the first PDCCH. If there is one TCI-state group that includes two TCI-states and that includes the TCI-state used by the first PDCCH, the second TCI-state is the TCI-state included in the TCI-state group. If there are a plurality of TCI-state groups that include two TCI-states and that include the TCI-state used by the first PDCCH, the second TCI-state is a TCI-state included in a TCI-state group corresponding to a smallest or largest TCI field value in the plurality of TCI-state groups that include the two TCI-states.

With reference to the first aspect, in some implementations of the first aspect, if there is no one or more TCI-state groups that include the TCI-state used by the first PDCCH, the second TCI-state is the TCI-state used by the first PDCCH.

This embodiment of this application provides a rollback mechanism, so that when the terminal device cannot find a TCI-state group that can meet a requirement, the terminal device may use one TCI-state as a unique second TCI-state.

With reference to the first aspect, in some implementations of the first aspect, when no activation signaling is received, the second TCI-state is the TCI-state used by the first PDCCH.

With reference to the first aspect, in some implementations of the first aspect, the second TCI-state is a TCI-state included in the TCI-state group corresponding to the smallest or largest TCI field value in the one or more TCI-state groups that include the active TCI-state in the CORESET with the smallest or largest index in the one or more latest received CORESETs, where the TCI-state group corresponds to one TCI field value, and the TCI-state group includes one TCI-state or two TCI-states.

One (for example, the CORESET with the smallest or largest index) of the one or more CORESETs that are latest received (for example, received in a latest slot) may also be referred to as a "target CORESET". There may be one or more latest received CORESETs. If one CORESET is latest received, the target CORESET is the CORESET. If a plurality of CORESETs are latest received, the target CORESET may be a CORESET with a smallest or largest index in the plurality of CORESETs.

In other words, there may be one TCI-state group including an active TCI-state in the target CORESET, or there may be a plurality of TCI-state groups that include an active TCI-state in the target CORESET. If there is one TCI-state group including the active TCI-state in the target CORESET, the second TCI-state is the TCI-state included in the TCI-state group. If there are a plurality of TCI-state groups that include the active TCI-state in the target CORESET, the second TCI-state is a TCI-state included in a TCI-state group corresponding to a smallest or largest TCI field value in the plurality of TCI-state groups.

With reference to the first aspect, in some implementations of the first aspect, the second TCI-state is a TCI-state included in the TCI-state group corresponding to the smallest or largest TCI field value in the one or more TCI-state groups that include the active TCI-state in the CORESET with the smallest or largest index in the one or more latest received CORESETs and that include two TCI-states.

In other words, there may be one TCI-state group that includes two TCI-states and that includes the active TCI-state in the target CORESET, or there may be a plurality of TCI-state groups that include two TCI-states and that include the active TCI-state in the target CORESET. If there is one TCI-state group that includes two TCI-states and that includes the active TCI-state in the target CORESET, the second TCI-state is the TCI-state included in the TCI-state group. If there are a plurality of TCI-state groups that include two TCI-states and that include the active TCI-state in the target CORESET, the second TCI-state is a TCI-state included in a TCI-state group corresponding to a smallest or largest TCI field value in the plurality of TCI-state groups that include the two TCI-states.

With reference to the first aspect, in some implementations of the first aspect, if there is no one or more TCI-state groups that include the active TCI-state in the CORESET with the smallest or largest index in the one or more latest received CORESETs, the second TCI-state is the active TCI-state in the CORESET with the smallest or largest index in the one or more latest received CORESETs.

With reference to the first aspect, in some implementations of the first aspect, when no activation signaling is received, the second TCI-state is the active TCI-state in the CORESET with the smallest or largest index in the one or more latest received CORESETs, where the activation signaling is used to activate a TCI-state used for PDSCH transmission.

With reference to the first aspect, in some implementations of the first aspect, the second TCI-states are two TCI-states used to latest transmit the second PDSCH, and the second PDSCH is transmitted by using the two TCI-states; or the second TCI-state is a TCI-state in the TCI-state group corresponding to the smallest or largest TCI field value in the plurality of TCI-state groups used for PDSCH transmission, and the TCI-state group includes the two TCI-states; or the second TCI-states are two TCI-states used to transmit the first PDCCH; or the second TCI-states are two currently active TCI-states in the CORESET with the smallest or largest index in the one or more CORESETs received in the latest slot.

Optionally, the time interval between the second PDSCH and a PDCCH that is used to schedule the second PDSCH is not less than the preset threshold. For example, before current transmission, the network device has performed PDSCH transmission with the terminal device for one or more times. Some PDSCHs are transmitted by using a single TCI-state, and some PDSCHs are transmitted by using two TCI-states. In the PDSCHs that are transmitted by using two TCI-states, scheduling time intervals of some PDSCHs are less than the preset threshold, and scheduling time intervals of some PDSCHs are not less than the preset threshold. In this case, the terminal device may receive and buffer a signal by using a TCI-state used by a PDSCH that is transmitted by latest using two TCI-states and whose scheduling time interval is not less than the preset threshold.

With reference to the first aspect, in some implementations of the first aspect, the second TCI-state is the TCI-state in the TCI-state group corresponding to the smallest or largest TCI field value in the plurality of TCI-state groups used for PDSCH transmission, and the TCI-state group includes the two TCI-states.

With reference to the first aspect, in some implementations of the first aspect, the second TCI-states are the two TCI-states used to transmit the first PDCCH.

With reference to the first aspect, in some implementations of the first aspect, the second TCI-states are the two currently active TCI-states in the CORESET (for example, the CORESET with the smallest or largest index) of the one or more CORESETs that are latest received (for example, received in the latest slot).

With reference to the first aspect, in some implementations of the first aspect, the method further includes: receiving first signaling, where the first signaling is used to activate one or more TCI-states for one CORESET, and the first signaling includes one or more of the following fields: a field used to indicate a quantity of active TCI-states, or a field used to indicate whether a quantity of active TCI-states is greater than or equal to 1.

The first signaling may be MAC-CE signaling, RRC signaling, or DCI signaling. This is not limited in this embodiment of this application. The first signaling may be sent by the network device to the terminal device before the network device sends the first PDCCH.

With reference to the first aspect, in some implementations of the first aspect, the method further includes: determining, based on a plurality of groups of currently active TCI-states used for PDSCH transmission, whether the network device transmits the first PDSCH by using two TCI-states; and if at least one TCI-state group includes two TCI-states in the plurality of groups of currently active TCI-states used for PDSCH transmission, determining that the network device sends the first PDSCH by using the two TCI-states.

According to a second aspect, another data transmission method is provided. The method includes: receiving a first physical downlink control channel (PDCCH), where the first PDCCH is used to schedule a first physical downlink shared channel (PDSCH); receiving a downlink signal by using a first transmission configuration indicator state (TCI-state); obtaining a time interval between the first PDCCH and the first PDSCH; and if the time interval is greater than or equal to a preset threshold, and the first PDCCH does not carry information about a TCI-state, determining a second TCI-state, and receiving the first PDSCH by using the second TCI-state.

With reference to the second aspect, in some implementations of the second aspect, the second TCI-state is a TCI-state included in a TCI-state group corresponding to a smallest or largest TCI field value in one or more TCI-state groups that include a TCI-state used by the first PDCCH; or the second TCI-state is a TCI-state included in a TCI-state group corresponding to a smallest or largest TCI field value in one or more TCI-state groups that include an active TCI-state in a CORESET with a smallest or largest index in one or more latest received CORESETs, where the TCI-state group corresponds to one TCI field value, and the TCI-state group includes one TCI-state or two TCI-states.

With reference to the second aspect, in some implementations of the second aspect, if there is no one or more TCI-state groups that include the TCI-state used by the first PDCCH, the second TCI-state is the TCI-state used by the first PDCCH; or if there is no one or more TCI-state groups that include the active TCI-state in the CORESET with the smallest or largest index in the one or more latest received CORESETs, the second TCI-state is the active TCI-state in the CORESET with the smallest or largest index in the one or more latest received CORESETs.

With reference to the second aspect, in some implementations of the second aspect, when no activation signaling is received, the second TCI-state is the TCI-state used by the first PDCCH; or the second TCI-state is the active TCI-state in the CORESET with the smallest or largest index in the one or more latest received CORESETs, where the activation signaling is used to activate a TCI-state used for PDSCH transmission.

With reference to the second aspect, in some implementations of the second aspect, the second TCI-states are two TCI-states used to latest transmit the second PDSCH, and the second PDSCH is transmitted by using the two TCI-states; or the second TCI-state is a TCI-state in the TCI-state group corresponding to the smallest or largest TCI field value in the plurality of TCI-state groups used for PDSCH transmission, and the TCI-state group includes the two TCI-states; or the second TCI-states are two TCI-states used to transmit the first PDCCH; or the second TCI-states are two currently active TCI-states in the CORESET with the smallest or largest index in the one or more CORESETs received in a latest slot.

According to a third aspect, another data transmission method is provided. The method includes: receiving N physical downlink control channels (PDCCH), where the N PDCCHs are respectively used to schedule N physical downlink shared channels (PDSCH), and N is an integer greater than 1; receiving a downlink signal by using N transmission configuration indicator states (TCI-states); and if a time interval between a first PDCCH in the N PDCCHs and a first PDSCH corresponding to the first PDCCH is less than a preset threshold, obtaining the first PDSCH from a downlink signal received by using a first TCI-state corresponding to the first PDCCH in the N TCI-states.

In this embodiment of this application, PDSCHs sent by two TRPs may be considered as two PDSCHs. Each PDSCH corresponds to one TCI-state. Therefore, a terminal device may separately determine a default TCI-state of each PDSCH. Therefore, subsequent content in this embodiment of this application is described for a single PDCCH and a single PDSCH scheduled by using the PDCCH. To be specific, a method for determining a TCI-state of a single PDSCH is discussed, and a method for determining a TCI-state of another PDSCH is the same as the method for determining the TCI-state of the single PDSCH.

With reference to the third aspect, in some implementations of the third aspect, the first TCI-state is a currently active TCI-state in a control resource set (CORESET) with a smallest or largest index in a group of first CORESETs that are received in a latest slot, where the first CORESET group is a CORESET group including CORESETs having a same index as a CORESET corresponding to the first PDCCH.

With reference to the third aspect, in some implementations of the third aspect, the index is an index related to a transmission station, CORESETs corresponding to a same transmission station use a same index, and CORESETs corresponding to different transmission stations use different indexes.

With reference to the third aspect, in some implementations of the third aspect, the receiving a downlink signal by using N transmission configuration indicator states (TCI-states) includes: receiving the downlink signal in a first time interval by using the first TCI-state, where the first time interval is a time interval including K consecutive symbols starting from the first symbol or the last symbol of the first PDCCH or the first symbol after the first PDCCH, and K is a quantity of symbols corresponding to the preset threshold.

With reference to the third aspect, in some implementations of the third aspect, the receiving a downlink signal by using N transmission configuration indicator states (TCI-states) includes: receiving the downlink signal in the first time interval by using the first TCI-state, and receiving the downlink signal in a second time interval by using a second TCI-state in the N TCI-states, where a transmission time of the first PDCCH is earlier than a transmission time of a second PDCCH, a time interval including K consecutive symbols starting from a first moment overlaps a time interval including K consecutive symbols starting from a second moment, the first time interval is a first half of a time interval including the first moment to a third moment, the second time interval is a second half of the time interval including the first moment to the third moment, the first moment is the first symbol or the last symbol of the first PDCCH or the first symbol after the first PDCCH, the second moment is the first symbol or the last symbol of the second PDCCH or the first symbol after the second PDCCH, and the third moment is a $K^{th}$ symbol after the second moment.

According to a fourth aspect, another data transmission method is provided. The method includes: receiving downlink control information (DCI), where the DCI is used to schedule a physical downlink shared channel (PDSCH); and receiving the PDSCH based on the DCI, where when a preset condition is met, the DCI and the PDSCH meet one or more of the following: a time interval between a receiving time of the DCI and a receiving time of the PDSCH is greater than or equal to a preset threshold; or the DCI includes a transmission configuration indicator (TCI) field value, and the preset condition includes one or more of the following: a cell corresponding to a physical downlink control channel (PDCCH) for transmitting the DCI is different from a cell corresponding to the PDSCH; a subcarrier spacing used by the DCI is different from a subcarrier spacing used by the PDSCH; a transmission configuration indicator state (TCI-state) used for PDSCH transmission is not activated in a cell corresponding to the PDSCH; a control resource set (CORESET) is not configured in a cell corresponding to the PDSCH transmission is performed in a cell corresponding to the DCI by using a frequency in a frequency range (FR) 1; or a TCI-state including quasi-co-location (QCL)-TypeD information is not configured in a cell corresponding to the DCI.

It should be understood that the foregoing "receiving the PDSCH based on the DCI" means determining a TCI-state based on the TCI field value in the DCI, to receive the PDSCH by using the TCI-state.

With reference to the fourth aspect, in some implementations of the fourth aspect, the preset condition includes: the cell corresponding to the PDCCH for transmitting the DCI is different from the cell corresponding to the PDSCH; the TCI-state used for PDSCH transmission is not activated in the cell corresponding to the PDSCH; and the subcarrier spacing used by the DCI is different from the subcarrier spacing used by the PDSCH.

With reference to the fourth aspect, in some implementations of the fourth aspect, the preset condition includes: the TCI-state used for PDSCH transmission is not activated in the cell corresponding to the PDSCH; and the subcarrier spacing used by the DC is different from the subcarrier spacing used by the PDSCH.

According to a fifth aspect, another data transmission method is provided. The method includes: receiving downlink control information (DCI), where the DC is used to schedule a physical downlink shared channel (PDSCH); and receiving the PDSCH by using a transmission configuration indicator state (TCI-state), where when a preset condition is met, the TCI-state is a TCI-state used by a physical downlink control channel (PDCCH) for transmitting the DCI, and the preset condition includes one or more of the following: a cell corresponding to the physical downlink control channel (PDCCH) for transmitting the DCI is different from a cell corresponding to the PDSCH; a time interval between a receiving time of the DCI and a receiving time of the PDSCH is greater than or equal to a preset threshold; the DCI does not include a TCI field value; transmission is performed in a cell corresponding to the DCI by using a frequency in a frequency range (FR) 2; a TCI-state including quasi-co-location (QCL)-TypeD information is configured in a cell corresponding to the DCI; a TCI-state used for PDSCH transmission is not activated in a cell corresponding to the PDSCH; or a control resource set (CORESET) is not configured in a cell corresponding to the PDSCH.

With reference to the fifth aspect, in some implementations of the fifth aspect, the preset condition includes: the cell corresponding to the PDCCH for transmitting the DCI is different from the cell corresponding to the PDSCH; the cell corresponding to the DCI performs transmission by using the frequency in the frequency range (FR) 2; the DCI does not include the TCI field value; and the time interval between the receiving time of the DCI and the receiving time of the PDSCH is greater than or equal to the preset threshold.

According to a sixth aspect, another data transmission method is provided. The method includes: receiving downlink control information (DCI), where the DCI is used to schedule a physical downlink shared channel (PDSCH); and receiving the PDSCH by using a transmission configuration indicator state (TCI-state), where when a preset condition is met, the TCI-state is an active TCI-state in a CORESET with a smallest index in at least one CORESET that is latest monitored by a terminal device in a currently active bandwidth part (BWP) of a cell corresponding to the DCI, and the preset condition includes one or more of the following: a cell corresponding to a physical downlink control channel (PDCCH) for transmitting the DCI is different from a cell corresponding to the PDSCH; a time interval between a receiving time of the DCI and a receiving time of the PDSCH is less than a preset threshold; the cell corresponding to the DCI performs transmission by using a frequency in a frequency range (FR) 2; a TCI-state including quasi-co-location (QCL)-TypeD information is configured in the cell corresponding to the DCI; a TCI-state used for PDSCH transmission is not activated in a cell corresponding to the PDSCH; or a control resource set (CORESET) is not configured in a cell corresponding to the PDSCH.

With reference to the sixth aspect, in some implementations of the sixth aspect, the preset condition includes: the cell corresponding to the PDCCH for transmitting the DCI is different from the cell corresponding to the PDSCH; the cell corresponding to the DCI performs transmission by using the frequency in the frequency range (FR) 2; the time interval between the receiving time of the DCI and the receiving time of the PDSCH is less than the preset threshold; and the TCI-state used for PDSCH transmission is not activated in the cell corresponding to the PDSCH.

According to a seventh aspect, another data transmission method is provided. The method includes: receiving first signaling, where the first signaling is used to activate a plurality of transmission configuration indicator state TCI state groups, and each of the plurality of TCI state groups includes one or two TCI states; and determining a mapping manner between each TC state and a TCI field value based on configuration information of a control resource set (CORESET) or indication information in the first signaling.

In this embodiment of this application, a network device may simultaneously activate, by using the first signaling, TCI-states used for transmission performed by two TRPs, to enable transmission of a plurality of TRPs. In a possible implementation, the first signaling may be MAC CE signaling.

With reference to the seventh aspect, in some implementations of the seventh aspect, the mapping manner includes a first mapping manner, and in the first mapping manner, in the plurality of TCI state groups, a $j^{th}$ TCI state in a TCI state group i indicates a $j^{th}$ TCI state corresponding to a TCI field value i, where i is an integer greater than or equal to 0, and j is a positive integer. Therefore, in the first mapping manner, one TCI field value corresponds to one or two TCI states.

With reference to the seventh aspect, in some implementations of the seventh aspect, the mapping manner includes a second mapping manner, and in the second mapping manner, in the plurality of TCI state groups, the $j^{th}$ TCI state in the TCI state group i indicates a TCI state corresponding to the TCI field value i in a PDCCH corresponding to a CORESET whose group index value is j−1, where i is an integer greater than or equal to 0, and j is a positive integer. Therefore, in the second mapping manner, one TCI field value corresponds to one TCI state.

With reference to the seventh aspect, in some implementations of the seventh aspect, each CORESET is associated with a group index value, and CORESETs having a same group index value form a group.

With reference to the seventh aspect, in some implementations of the seventh aspect, when group index values of each configured CORESET include two different values in total, the mapping manner is the second mapping manner; or when a group index value of each configured CORESET includes one value in total, the mapping manner is the first mapping manner.

With reference to the seventh aspect, in some implementations of the seventh aspect, when a value of a first field in the first signaling is 0, the mapping manner is the first mapping manner; or when a value of a first field in the first signaling is 1, the mapping manner is the second mapping manner.

With reference to the seventh aspect, in some implementations of the seventh aspect, when a value of a first field in the first signaling is 1, the mapping manner is the first mapping manner; or when a value of a first field in the first signaling is 0, the mapping manner is the second mapping manner.

With reference to the seventh aspect, in some implementations of the seventh aspect, the first field is a field including the first bit in the first signaling.

With reference to the seventh aspect, in some implementations of the seventh aspect, in the first signaling, a second field is included before a field corresponding to the last TCI state in the TCI state group i in the plurality of TCI state groups, and the second field is used to indicate whether a TCI state group i+1 exists in the plurality of TCI state groups, where i is an integer greater than or equal to 0.

With reference to the seventh aspect, in some implementations of the seventh aspect, before the receiving first signaling, the method further includes: sending a terminal capability parameter, where the terminal capability parameter includes one or more of the following:
   a first capability parameter, used to indicate an upper limit of a quantity of different TCI states corresponding to a CORESET associated with one group index value when a configured CORESET is associated with two different group index values:
a second capability parameter, used to indicate an upper limit of a quantity of different TCI states corresponding to a configured CORESET when the configured CORESET is associated with two different group index values;
a third capability parameter, used to indicate an upper limit of a quantity of different TCI states corresponding to a configured CORESET when the configured CORESET is associated with a same group index value;
a fourth capability parameter, used to indicate an upper limit of a quantity of different TCI states in TCI states indicated by the first signaling;
a fifth capability parameter, used to indicate an upper limit of a quantity of different TCI states in TCI states indicated by the first signaling when a configured CORESET is associated with two different group index values;
a sixth capability parameter, used to indicate an upper limit of a quantity of different TCI states in TCI states indicated by the first signaling when a configured CORESET is associated with a same group index value;
a seventh capability parameter, used to indicate an upper limit of a quantity of different TCI states in TCI states indicated by the first signaling when the first mapping manner is used; or
an eighth capability parameter, used to indicate an upper limit of a quantity of different TCI states in TCI states indicated by the first signaling when the second mapping manner is used.

In this embodiment of this application, the different capability parameters reflect terminal capabilities at different granularities. A terminal device may flexibly report all or some of the capability parameters based on an actual situation, so that a TCI state activated by the network device for the terminal device by using the first signaling meets a capability of the terminal device, thereby improving subsequent data transmission efficiency.

According to an eighth aspect, another data transmission method is provided. The method includes: determining first signaling, where the first signaling is used to activate a plurality of transmission configuration indicator state TCI state groups, each of the plurality of TCI state groups includes one or two TCI states, and a mapping manner between each TCI state and a TCI field value is determined based on configuration information of a control resource set (CORESET) or indication information in the first signaling; and sending the first signaling.

With reference to the eighth aspect, in some implementations of the eighth aspect, the mapping manner includes a first mapping manner, and in the first mapping manner in the plurality of TCI state groups, a $j^{th}$ TCI state in a TCI state group i indicates a $j^{th}$ TCI state corresponding to a TCI field value i, where i is an integer greater than or equal to 0, and j is a positive integer. Therefore, in the first mapping manner, one TCI field value corresponds to one or two TCI states.

With reference to the eighth aspect, in some implementations of the eighth aspect, the mapping manner includes a second mapping manner, and in the second mapping manner, in the plurality of TCI state groups, the $j^{th}$ TCI state in the TCI state group i indicates a TCI state corresponding to the TCI field value i in a PDCCH corresponding to a CORESET whose group index value is j−1, where i is an integer greater than or equal to 0, and j is a positive integer. Therefore, in the second mapping manner, one TCI field value corresponds to one TCI state.

With reference to the eighth aspect, in some implementations of the eighth aspect, each CORESET is associated with a group index value, and CORESETs having a same group index value form a group.

With reference to the eighth aspect, in some implementations of the eighth aspect, when group index values of each configured CORESET include two different values in total, the mapping manner is the second mapping manner; or when a group index value of each configured CORESET includes one value in total, the mapping manner is the first mapping manner.

With reference to the eighth aspect, in some implementations of the eighth aspect, when a value of a first field in the first signaling is 0, the mapping manner is the first mapping manner; or when a value of a first field in the first signaling is 1, the mapping manner is the second mapping manner.

With reference to the eighth aspect, in some implementations of the eighth aspect, when a value of a first field in the first signaling is 1, the mapping manner is the first mapping manner; or when a value of a first field in the first signaling is 0, the mapping manner is the second mapping manner.

With reference to the eighth aspect, in some implementations of the eighth aspect, the first field is a field including the first bit in the first signaling.

With reference to the eighth aspect, in some implementations of the eighth aspect, in the first signaling, a second field is included before a field corresponding to the last TCI state in the TCI state group i in the plurality of TCI state groups, and the second field is used to indicate whether a TCI state group i+1 exists in the plurality of TCI state groups, where i is an integer greater than or equal to 0.

With reference to the eighth aspect, in some implementations of the eighth aspect, before the determining first signaling, the method further includes: receiving a terminal capability parameter, where the terminal capability parameter includes one or more of the following:
a first capability parameter, used to indicate an upper limit of a quantity of different TCI states corresponding to a CORESET associated with one group index value when a configured CORESET is associated with two different group index values;
a second capability parameter, used to indicate an upper limit of a quantity of different TCI states corresponding to a configured CORESET when the configured CORESET is associated with two different group index values;
a third capability parameter, used to indicate an upper limit of a quantity of different TCI states corresponding to a configured CORESET when the configured CORESET is associated with a same group index value;
a fourth capability parameter, used to indicate an upper limit of a quantity of different TCI states in TCI states indicated by the first signaling;
a fifth capability parameter, used to indicate an upper limit of a quantity of different TCI states in TCI states indicated by the first signaling when a configured CORESET is associated with two different group index values;
a sixth capability parameter, used to indicate an upper limit of a quantity of different TCI states in TCI states indicated by the first signaling when a configured CORESET is associated with a same group index value;

a seventh capability parameter, used to indicate an upper limit of a quantity of different TCI states in TCI states indicated by the first signaling when the first mapping manner is used; or an eighth capability parameter, used to indicate an upper limit of a quantity of different TCI states in TCI states indicated by the first signaling when the second mapping manner is used.

According to a ninth aspect, a data transmission apparatus is provided. The apparatus is configured to perform the method in any possible implementation of the foregoing aspects. Specifically, the apparatus includes units configured to perform the method in any possible implementation of the foregoing aspects.

According to a tenth aspect, a data transmission apparatus is provided. The apparatus includes a processor. The processor is coupled to a memory, and may be configured to execute an instruction in the memory, to implement the method in any possible implementation of the foregoing aspects. Optionally, the data transmission apparatus further includes the memory. Optionally, the data transmission apparatus further includes a communications interface, and the processor is coupled to the communications interface.

In an implementation, the data transmission apparatus is a terminal device. When the data transmission apparatus is the terminal device, the communications interface may be a transceiver or an input/output interface.

In another implementation, the data transmission apparatus is a chip configured in a terminal device. When the data transmission apparatus is the chip configured in the terminal device, the communications interface may be an input/output interface.

According to an eleventh aspect, a processor is provided. The processor includes an input circuit, an output circuit, and a processing circuit. The processing circuit is configured to receive a signal through the input circuit, and transmit a signal through the output circuit, so that the processor performs the method in any possible implementation of the foregoing aspects.

In a specific implementation process, the processor may be a chip, the input circuit may be an input pin, the output circuit may be an output pin, and the processing circuit may be a transistor, a gate circuit, a trigger, various logic circuits, or the like. The input signal received by using the input circuit may be received and input by using, for example, but not limited to, a receiver, the signal output through the output circuit may be output to, for example, but not limited to, a transmitter and transmitted by using the transmitter, and the input circuit and the output circuit may be a same circuit, where the circuit is used as the input circuit and the output circuit at different moments. Specific implementations of the processor and the various circuits are not limited in this embodiment of this application.

According to a twelfth aspect, a processing apparatus is provided. The apparatus includes a processor and a memory. The processor is configured to: read an instruction stored in the memory, receive a signal through a receiver, and transmit a signal through a transmitter, to perform the method in any possible implementation of the foregoing aspects.

Optionally, there are one or more processors, and there are one or more memories.

Optionally, the memory may be integrated with the processor, or the memory and the processor are disposed separately.

In a specific implementation process, the memory may be a non-transitory (non-transitory) memory such as a read-only memory (ROM). The memory and the processor may be integrated on a same chip, or may be separately disposed on different chips. A type of the memory and a manner of disposing the memory and the processor are not limited in this embodiment of this application.

It should be understood that, for a related data exchange process, for example, an indication information sending process may be a process of outputting indication information from the processor, and a capability information receiving process may be a process of receiving input capability information by the processor. Specifically, data output by the processor may be output to the transmitter, and input data received by the processor may be from the receiver. The transmitter and the receiver may be collectively referred to as a transceiver.

The processing apparatus in the twelfth aspect may be a chip. The processor may be implemented by using hardware, or may be implemented by using software. When the processor is implemented by using the hardware, the processor may be a logic circuit, an integrated circuit, or the like; or when the processor is implemented by using the software, the processor may be a general purpose processor, and is implemented by reading software code stored in the memory. The memory may be integrated into the processor, may be located outside the processor, and may exist independently.

According to a thirteenth aspect, a computer program product is provided. The computer program product includes a computer program (which may also be referred to as code or an instruction). When the computer program is run, a computer is enabled to perform the method in any possible implementation of the foregoing aspects.

According to a fourteenth aspect, a computer-readable medium is provided. The computer-readable medium stores a computer program (which may also be referred to as code or an instruction). When the computer program is run on a computer, the computer is enabled to perform the method in any possible implementation of the foregoing aspects.

According to a fifteenth aspect, a communications system is provided. The communications system includes the foregoing terminal device and network device.

BRIEF DESCRIPTION OF DRAWINGS

FIG. 13 is a schematic diagram of a format of MAC CE signaling used to activate a TCI-state according to an embodiment of this application.

DESCRIPTION OF EMBODIMENTS

The following describes technical solutions in this application with reference to accompanying drawings.

The technical solutions in the embodiments of this application may be used in various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS) system, a worldwide interoperability for microwave access (WiMAX) communications system, and a 5th generation (5th generation, 5G) system or new radio (NR) system.

It should be further understood that the technical solutions in the embodiments of this application may be further applied to various communications systems based on a non-orthogonal multiple access technology, for example, a sparse code multiple access (SCMA) system. Certainly. SCMA may also be referred to another name in the communications field. Further, the technical solutions of the embodiments of this application may be applied to a multi-carrier transmission system using the non-orthogonal multiple access technology, for example, an orthogonal frequency division multiplexing (OFDM) system, a filter bank multi-carrier (FBMC) system, a generalized frequency division multiplexing (GFDM) system, or a filtered orthogonal frequency division multiplexing (F-OFDM) system using the non-orthogonal multiple access technology.

Figure 1:
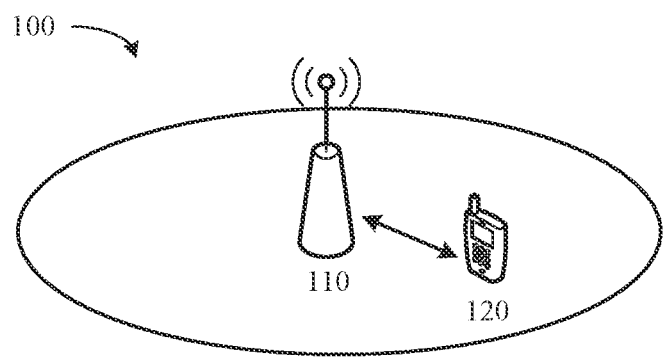
FIG. 1 is a schematic diagram of a communications system according to an embodiment of this application.

For ease of understanding the embodiments of this application, a communications system applicable to the embodiments of this application is described in detail with reference to FIG. 1. FIG. 1 is a schematic diagram of a communications system 100 applicable to an embodiment of this application. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 may communicate with the terminal device 120 through a radio link. A plurality of antennas may be configured for each communications device such as the network device 110 or the terminal device 120. The plurality of antennas may include at least one transmit antenna configured to send a signal and at least one receive antenna configured to receive a signal. In addition, the communications device may additionally include a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device 110 may communicate with the terminal device 120 by using a multi-antenna technology.

The terminal device in the embodiments of this application may communicate with one or more core networks through a radio access network (RAN). The terminal device may be referred to as an access terminal, user equipment (UE), a subscriber unit, a subscriber station, a mobile station, a mobile station, a remote station, or a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in a 5G network, a terminal device in a future evolved public land mobile network (PLMN), or the like.

The network device in the embodiments of this application may be a device configured to communicate with the terminal device. The network device may be a base transceiver station (BTS) in global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a radio controller in a scenario of a cloud radio access network (CRAN). Alternatively, the network device may be a relay station, an access point, a vehicle-mounted device, a wearable device, a network device in a 5G network, a network device in a future evolved PLMN, or the like. This is not limited in the embodiments of this application. For example, the network device may be a gNB or a transmission point (TRP or TP) in an NR system, one antenna panel or a group of (including a plurality of antenna panels) antenna panels of a base station in a 5G system, or a network node, for example, a baseband unit (BBU), or a distributed unit (DU), that constitutes a gNB or a transmission point.

In some deployments, the gNB may include a centralized unit (CU) and a DU. The gNB may further include a radio frequency unit (RRU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling such as RRC layer signaling may also be considered as being sent by the DU or by the DU and the CU. It may be understood that the network device may be a CU node, a DU node, or a device including a CU node and a DU node. In addition, the CU may be classified as a network device in an access network (RAN), or the CU may be classified as a network device in a core network (CN). This is not limited in this application.

The network device may also be a generic term of all devices on a network side. For example, when a plurality of TRPs are used to transmit data to a terminal device, the plurality of TRPs may be collectively referred to as network devices.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), or a memory (also referred to as a main memory). The operating system may be any one or more computer operating systems that implement service processing through a process (process). For example, the operating system is a Linux operating system, a Unix operating system, an Android operating system, an iOS operating system, a Windows operating system, or the like. The application layer includes applications, such as a browser, an address book, word processing software, and instant communications software. In addition, the embodiments of this application impose no special limitation on a specific structure of an execution body of a method provided in the embodiments of this application, provided that a program that records code of the method provided in the embodiments of this application can be run to perform communication according to the method provided in the embodiments of this application. For example, the method provided in the embodiments of this application may be performed by the terminal device or the network device, or may be performed by a function module that is in the terminal device or the network device and that can invoke and execute a program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable medium" may include but is not limited to a radio channel and various other media that can store, include, and/or carry an instruction and/or data.

The embodiments of this application may be applicable to an LTE system and a subsequent evolved system such as 5G, or other wireless communications systems using various radio access technologies, for example, systems using access technologies such as code division multiple access, frequency division multiple access, time division multiple access, orthogonal frequency division multiple access, and single carrier frequency division multiple access, and particularly applicable to a scenario in which channel information needs to be fed back and/or a two-stage precoding technology needs to be used, for example, a wireless network using a massive MIMO technology or a wireless network using a distributed antenna technology.

It should be understood that a multiple-input multiple-output (MIMO) technology is that a plurality of transmit antennas and receive antennas are respectively used at a transmit end device and a receive end device, to transmit and receive signals through the plurality of antennas respectively at the transmit end device and the receive end device, thereby improving communication quality. In the technology, spatial resources can be fully used, and multiple transmit multiple receive is implemented through the plurality of antennas, so that a system channel capacity can be multiplied without increasing a spectrum resource and an antenna transmit power.

For ease of understanding, the following first describes related terms in the embodiments of this application.

1. Beam

A beam in an NR protocol may be embodied as a spatial domain filter (spatial domain filter), or referred to as a spatial filter (spatial filter) or a spatial parameter (spatial parameter). A beam used to send a signal may be referred to as a transmit beam (Tx beam), or may be referred to as a spatial domain transmit filter (spatial domain transmission filter) or a spatial transmit parameter (spatial transmission parameter). A beam used to receive a signal may be referred to as a receive beam (Rx beam), or may be referred to as a spatial domain receive filter (spatial domain receive filter) or a spatial receive parameter (spatial RX parameter).

The transmit beam may refer to distribution of signal strength that is of a signal after the signal is transmitted through an antenna and that is formed in different directions in space, and the receive beam may refer to distribution of signal strength that is of a radio signal received from an antenna and that is in different directions in space.

There is a pairing relationship between the transmit beam and the receive beam. The pairing relationship between the transmit beam and the receive beam may also be referred to as a pairing relationship between the spatial transmit filter and the spatial receive filter. A relatively large beamforming gain may be obtained by transmitting a signal between the transmit beam and the receive beam that have the beam pairing relationship.

In an implementation, a transmit end may send a reference signal through beam sweeping, and a receive end may also receive the reference signal through beam sweeping. Specifically, the transmit end may form different directional beams in space through beamforming, and may perform polling on a plurality of different directional beams, to transmit a reference signal through the different directional beams, so that a power for transmitting the reference signal can reach a maximum value in a direction directed by a transmit beam. The receive end may also form different directional beams in space through beamforming, and may perform polling on a plurality of different directional beams, to receive a reference signal through the different directional beams, so that a power for receiving the reference signal at a receive end can reach a maximum value in a direction directed by a receive beam.

By traversing each transmit beam and receive beam, the receive end may perform channel measurement based on the received reference signal, and report, through channel state information (CSI) to the transmit end, a result obtained through measurement. For example, the receive end may report, to the transmit end, a part of reference signal resources with relatively large reference signal received powers (RSRP), and for example, report an identifier of the reference signal resource, so that the transmit end sends and receives a signal by using a beam pairing relationship with relatively good channel quality during data or signaling transmission.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like.

The beam usually corresponds to a resource. For example, when beam measurement is performed, the network device measures different beams through different resources. The terminal device feeds back measured resource quality, and the network device learns of quality of a corresponding beam. During data transmission, beam information is also indicated through a resource corresponding to the beam information. For example, the network device indicates information about a PDSCH beam to the terminal device through a resource in a TCI of DCI.

Optionally, a plurality of beams that have same or similar communication features are considered as one beam. One beam may include one or more antenna ports, configured to transmit a data channel, a control channel, a sounding signal, and the like. The one or more antenna ports forming the beam may also be considered as one antenna port set.

In the embodiments of this application, unless otherwise specified, the beam is a transmit beam of the network device. During beam measurement, each beam of the network device corresponds to one resource. Therefore, an index of the resource may be used to uniquely identify the beam corresponding to the resource.

2. Resource

During beam measurement, a beam corresponding to a resource may be uniquely identified through an index of the resource. The resource may be an uplink signal resource, or may be a downlink signal resource. The uplink signal includes but is not limited to a sounding reference signal (SRS) and a demodulation reference signal (DMRS). The downlink signal includes but is not limited to: a channel state information reference signal (CSI-RS), a cell-specific reference signal (CS-RS), a UE specific reference signal (UE-specific RS), a demodulation reference signal (DMRS), and a synchronization signal/physical broadcast channel block (SS/PBCH block). The SS/PBCH block may be referred to as a synchronization signal block (SSB) for short.

The resource may be configured by using radio resource control (RRC) signaling. In a configuration structure, one resource is one data structure, and includes a related parameter of an uplink/downlink signal corresponding to the resource, for example, a type of the uplink/downlink signal, a resource granularity that carries the uplink/downlink signal, a sending time and a sending periodicity of the uplink/downlink signal, and a quantity of ports used to send the uplink/downlink signal. Each resource of the uplink/downlink signal has a unique index, to identify a resource of the downlink signal. It may be understood that the index of the resource may also be referred to as an identifier of the resource. This is not limited in the embodiments of this application.

3. TCI-State

The TCI-state may also be denoted as a TCI state. In other words, a TCI-state is equivalent to a TCI state in this application. The TCI-state is configured by the network device for each terminal device by using a TCI. The TCI-state includes an index tci-StateId of the TCI-state and two pieces of QCL-Info. Each piece of QCL-Info includes one cell field and one BWP-d, and the cell field and the BWP-Id respectively indicate a bandwidth part (BWP) of a cell (cell) in which the TCI-state is used. In other words, different QCL-Info may be configured for different cells or different BWPs of a same cell. The QCL-Info further includes a reference signal referenceSignal field, used to indicate a reference signal resource with which a quasi-co-location (QCL) relationship is formed. Therefore, the TCI-state may also be denoted as a QCL assumption.

The term "beam" is usually not directly used in a protocol, and the beam is usually replaced by another term. For example, during both data transmission and channel measurement, a beam corresponds to a reference signal resource, and one beam corresponds to one reference signal resource. Therefore, "a reference signal resource with which a QCL relationship is formed" described in the embodiments of this application essentially means a beam with which a QCL relationship is formed. The QCL relationship means that two reference signal resources (or two antenna ports) have some same spatial parameters, and the antenna ports are in a one-to-one correspondence with the reference signal resources. Specifically, which spatial parameters are the same depends on a type of the QCL-Info, namely, another field QCL-Type of the QCL-Info. QCL-Type has four values: {typeA, typeB, typeC, typeD}. TypeD is used as an example. TypeD indicates that the two reference signal resources have same spatial receive parameter information, that is, the two beams have a same receive beam. A maximum of one of the two pieces of QCL-Info included in the TCI-state can be of TypeD.

The following uses an example to describe in detail how the network device indicates, based on the release 15 (R15) protocol, receive beam information of a data transmission beam to the terminal device by using the TCI-state, where the receive beam information includes configuration, activation, and indication of the TCI-state.

(1) TCI-state configuration: The network device configures a plurality of TCI-states for the terminal device by using RRC signaling. Each of these TCI-states includes one piece of QCL-Info of typeD. Alternatively, the network device may configure a TCI-state that does not include QCL-info of typeD. However, the TCI-state is not used to indicate a data transmission beam. Therefore, details are not further described herein.

(2) TCI-state activation: A TCI field in DCI has three bits, and corresponds to eight field values. Each field value may indicate one TCI-state, that is, may indicate a maximum of one of eight TCI-states. However, it is specified in a protocol that the network device may configure a maximum of 128 TCI-states for the terminal device. Therefore, eight of the 128 TCI-states corresponding to the eight TCI field values are indicated by the network device by using signaling (for example, medium access control-control element (MAC-CE) signaling). Specifically, after configuring a plurality of TCI-states, the network device activates eight of the TCI-states by using the MAC-CE signaling. The eight TCI states are in a one-to-one correspondence with the eight values of the TCI field in the DCI. In other words, the eight TCI-states corresponding to the eight values of the TCI field in the DCI are determined by using the MAC-CE signaling. In the MAC-CE signaling used to activate the TCI, a size of each field corresponding to each TCI-state is 1 bit; and when a value is 1, it indicates that the TCI-state is activated, and when the value is 0, it indicates that the TCI-state is not activated. Theoretically, one MAC-CE may have eight active fields whose values are 1, and values of other active fields are all 0. TCI-states corresponding to the eight fields whose values are 1 are eight TCI-states corresponding to the eight values of the TCI field in the DCI. For example, a smallest value 000 of the TCI field corresponds to an active TCI-state with a smallest index in the MAC CE. The rest may be deduced by analogy. The values and the TCI-states are in a one-to-one correspondence. It should be understood that there are many types of MAC-CEs. In addition to the MAC-CE used to activate the TCI-state, there are many MAC-CEs used for other purposes. This application relates only to a MAC-CE used to activate a TCI-state/TCI-state combination. Therefore, unless otherwise specified, the MAC-CE in this application is such a MAC-CE.

(3) TCI-state indication: The network device indicates a specific TCI-state by using the TCI field in the DCI. For example, when the value of the TCI field in the DCI sent by the network device to the terminal device is 000, it indicates a TCI-state that corresponds to 000 and that is used by the data transmission beam. referenceSignal included in the QCL-Info whose type is typeD in the TCI-state is a channel state information reference signal (CSI-RS) whose index is #1, indicating that a beam used for data transmission has a same receive beam as a beam corresponding to the CSI-RS whose index is #1. The receive beam corresponding to the CSI-RS whose index is #1 may be determined through a beam measurement procedure, and is known to the terminal device. Therefore, the terminal device may determine, based on a specific value of the TCI field, the receive beam corresponding to the data transmission beam, to receive data by using the corresponding receive beam.

Because a beam has specific spatial directivity, the network device may generate different beams that point to different transmission directions. During downlink data transmission, the network device sends data to the terminal device by using a particular beam, and notifies the terminal device of information about a transmit beam used by the terminal device. In this way, the terminal device uses a correct receive beam (that is, a receive beam corresponding to the transmit beam) to receive the data sent by the network device. As described above, in the R15 protocol, related information about the transmit beam may be indicated by using the transmission configuration indicator (TCI) field in the downlink control information (DCI). A size of the TC field is three bits, which may specifically indicate eight different values. Each value of the TCI field corresponds to an index of one TCI-state, to uniquely identify the TCI-state. The TCI-state includes several parameters described above, and the related information about the transmit beam may be determined by using these parameters. For example, the TCI-state includes a reference signal resource, and the reference signal resource is used to indicate the information about the transmit beam (there is a correspondence between the reference signal resource and the beam). It should be understood that, because the beam information is represented by using the TCI-state, determining the transmit beam information for data transmission may be equivalent to determining the TCI-state for data transmission.

When performing data transmission, the network device may perform transmission by using a single beam, or may perform transmission by using a plurality of beams or a plurality of TRPs at the same time. When the network device transmits data by using a single beam, the network device uses a single TCI-state, and the terminal device may determine the single TCI-state. When the network device transmits data by using a plurality of beams or a plurality of TRPs, the network device uses a plurality of TCI-states (each beam or each TRP corresponds to one TCI-state), and the terminal device may determine the plurality of TCI-states. It should be understood that, for ease of description in this specification, an example in which two TRPs respectively use two TCI-states to transmit data is used for description subsequently. However, a data transmission method provided in this application is also applicable to a case in which more than two TCI-states are determined, and details are not subsequently described.

It should be noted that, in this application, because downlink data is carried and sent on a physical downlink shared channel (PDSCH), the downlink data may also be equivalently referred to as the PDSCH. Because the downlink control information is carried and sent on a physical downlink control channel (PDCCH), the downlink control information may be equivalently referred to as the PDCCH.

In addition, in this application, the beam, the TRP, and the TCI-state are equivalent. Transmitting the PDSCH by using a single beam, TRP, or TCI-state means the same. When a plurality of TRPs are used, the network device generally refers to an overall including the plurality of TRPs.

Before the method provided in the embodiments of this application is described, the following descriptions are first provided.

First, in the embodiments of this application, "predefined" may be implemented in a manner in which corresponding code, a table, or other related indication information is prestored in a device (for example, including the terminal device and the network device). A specific implementation of the foregoing "predefined" is not limited in this application.

Second, in the embodiments shown below, terms and English acronyms and abbreviations, such as downlink control information (DCI), a medium access control-control element (MAC-CE), radio resource control (RRC), a physical downlink control channel (PDCCH), a physical downlink shared channel (PDSCH), and a channel state information reference signal (CSI-RS), are examples provided for ease of description, and shall not constitute any limitation on this application. This application does not exclude a possibility of defining another term that can implement a same or similar function in an existing or a future protocol.

Third, "first", "second", and various numbers in the following embodiments are merely used for differentiation for ease of description, and are not used to limit the scope of the embodiments of this application. For example, different PDCCHs, different TCI-states, or the like are distinguished.

Fourth, a "protocol" in the embodiments of this application may be a standard protocol in the communications field, for example, may include an LTE protocol, an NR protocol, and a related protocol applied to a future communications system. This is not limited in this application.

Fifth, "at least one" means one or more, and "a plurality of" means two or more. The term "and/or" describes an association relationship for describing associated objects and represents that three relationships may exist. For example, A and/or B may represent the following cases. Only A exists, both A and B exist, and only B exists, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one of a, b, and c may indicate a, b, c, a and b, a and c, b and c, or a, b, and c, where a, b, and c may be singular or plural.

The following describes in detail the data transmission method and apparatus provided in this application with reference to the accompanying drawings. It should be understood that the technical solutions of this application may be applied to a wireless communications system, for example, the communications system 100 shown in FIG. 1. There may be a wireless communication connection relationship between two data transmission apparatuses in the wireless communications system. One of the two data transmission apparatuses may correspond to the terminal device 120 shown in FIG. 1, for example, the terminal device shown in FIG. 1, or may be a chip configured in the terminal device. The other of the two data transmission apparatuses may correspond to the network device 110 shown in FIG. 1, for example, the network device shown in FIG. 1, or may be a chip configured in the network device.

Without loss of generality, the following uses an interaction process between the terminal device and the network device as an example to describe in detail the data transmission method provided in the embodiments of this application.

Figure 2:
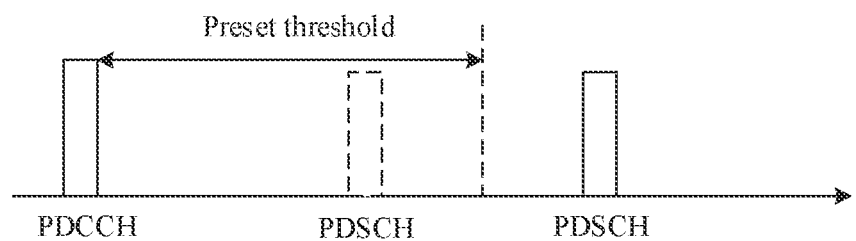
FIG. 2 is a schematic diagram of a relationship between a PDCCH and a PDSCH according to an embodiment of this application.

FIG. 2 is a schematic diagram of a relationship between a PDCCH and a PDSCH according to an embodiment of this application. The PDCCH is used to schedule the PDSCH, and a specific time interval is required between the PDCCH and the PDSCH scheduled by using the PDCCH, so that the terminal device receives and processes the PDCCH, to determine a TCI-state of the PDSCH based on the PDCCH. A time required by the terminal device to receive and process the PDCCH is reported by the terminal device to the network device, and is referred to as a preset threshold (for example, a parameter timeDurationForQCL) in this application. For example, the terminal device may report the parameter timeDurationForQCL to the network device, and a value of the parameter is the time required by the terminal device to receive and process the PDCCH.

As shown in FIG. 2, when the time interval between the PDCCH and the PDSCH scheduled by using the PDCCH is not less than the preset threshold, the terminal device can complete receiving and processing of the PDCCH before receiving the PDSCH, to determine the TCI-state of the PDSCH based on the PDCCH. When the time interval between the PDCCH and the PDSCH scheduled by using the PDCCH is less than the preset threshold, the terminal device cannot determine the TCI-state of the PDSCH based on the PDCCH, because the terminal device has not completed processing of the PDCCH when the PDSCH is sent. To successfully receive the PDSCH, it is specified in a protocol that a default TCI-state (default TCI-state) is used in this case, and the terminal device may complete receiving of the PDSCH by using the default TCI-state. After the default TCI-state is agreed in the protocol, the network device and the terminal device may send and receive data based on the default TCI-state. For example, when the network device sends a PDSCH, if a time interval between the PDSCH and a PDCCH corresponding to the PDSCH is less than the preset threshold, the network device sends the PDSCH by using the default TCI-state. Before the terminal device completes processing of the PDCCH, because the terminal device is uncertain about whether the network device sends the PDSCH in a process of receiving the PDCCH, to avoid missing the PDSCH, the terminal device may use a receive beam corresponding to the default TCI-state to receive all signals within a period of time (where the period of time that starts from a symbol on which the PDCCH is located and whose duration is the preset threshold) and buffer the signals. After completing receiving processing of the PDCCH, the terminal device determines the time interval between the PDSCH scheduled by using the PDCCH and the PDCCH. If the time interval is less than the preset threshold, the terminal device may determine that the PDSCH is included in the buffered signal, and determine the PDSCH from the buffered signal based on a parameter (for example, time-frequency resource information of the PDSCH) indicated by the PDCCH. If the time interval is not less than the preset threshold, the terminal device may discard the buffered signal, and receive the PDSCH based on the TCI-state indicated in the PDCCH.

The following describes in detail the data transmission method in the embodiments of this application for different data transmission scenarios.

In the embodiments of this application, the TCI-state is used as an example for description. However, it should be understood that, in this application, TCI-state may also be denoted as a QCL assumption. For example, a first TCI-state in the following embodiment may be replaced with a first QCL assumption. For another example, a QCL assumption used for the first PDCCH in the following embodiment is a QCL assumption used for transmission of the first PDCCH in a CORESET corresponding to the first PDCCH. In this application, a latest received CORESET (for example, a CORESET received in a latest slot) may also be understood as a CORESET associated with a search space (search space) that is latest monitored (for example, monitored in the latest slot).

Figure 3:
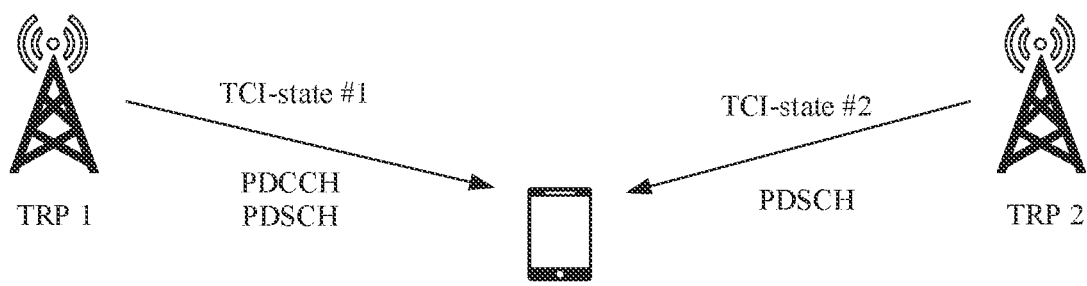
FIG. 3 is a schematic diagram of a data transmission scenario according to an embodiment of this application.

FIG. 3 is a schematic diagram of a data transmission scenario according to an embodiment of this application. The data transmission scenario is a multi-TRP transmission scenario based on a single PDCCH. To be specific, the network device sends a PDSCH to the terminal device through a plurality of TRPs. A same PDSCH may be sent by all the TRPs. For example, all the TRPs send some content or all content of the same PDSCH. A quantity of PDSCHs sent by the plurality of TRPs is not limited in this embodiment of this application. Each TRP sends the PDSCH by using one TCI-state. Therefore, the terminal device can correctly receive the PDSCH only after determining a plurality of TCI-states. The network device may send the PDCCH to the terminal device through a single TRP (by using a single TCI-state), or may send the PDCCH through a plurality of TRPs (by using a plurality of TCI-states). This is not limited in this embodiment of this application. For ease of description, FIG. 3 shows two TRPs (in other words, the terminal device may determine two TCI-states). Specifically, a TRP 1 sends, to the terminal device, a PDCCH used to schedule a PDSCH of the TRP 1 and a PDSCH of a TRP 2, the TRP 1 sends the PDSCH to the terminal device by using a TCI-state #1, and the TRP 2 sends the PDSCH to the terminal device by using a TCI-state #2. The terminal device can correctly receive the PDSCH only after determining the TCI-state #1 and the TCI-state #2.

Figure 4:
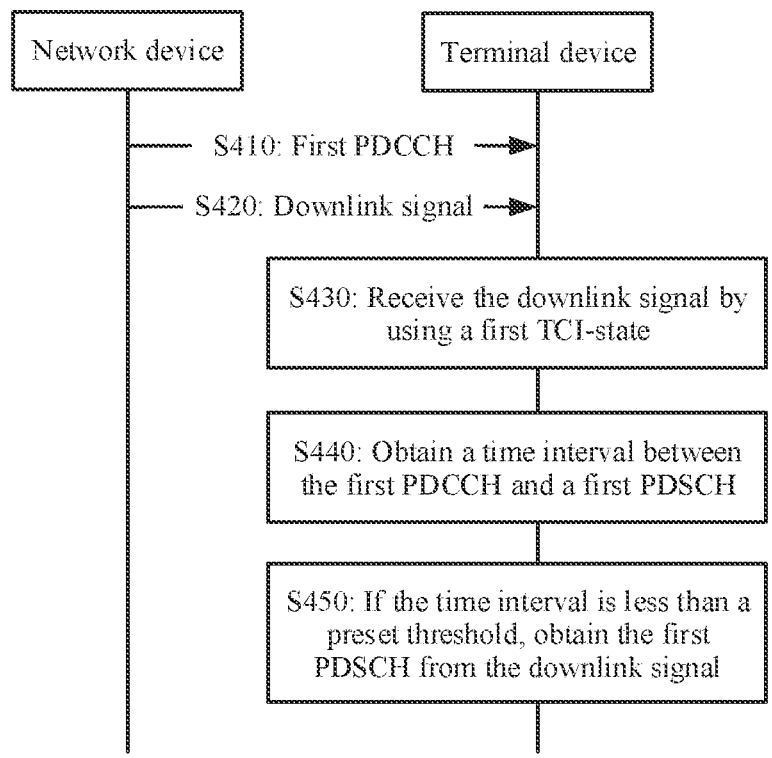
FIG. 4 is a schematic flowchart of a data transmission method according to an embodiment of this application.

For the scenario shown in FIG. 3, FIG. 4 is a schematic flowchart of a data transmission method according to an embodiment of this application. The method includes the following steps.

S410: A network device sends a first physical downlink control channel (PDCCH) to a terminal device, and correspondingly the terminal device receives the first PDCCH from the network device, where the first PDCCH is used to schedule a first physical downlink shared channel (PDSCH). The first PDCCH may include a transmission parameter for the first PDSCH sent by one or two TRPs, for example, a time-frequency resource for transmitting the first PDSCH or a TCI-state of the first PDSCH.

For example, the network device may send, to the terminal device, the first PDCCH used to schedule the first PDSCH. As described above, when sending the first PDSCH, the network device may determine a time interval between the first PDSCH and the first PDCCH that is used to schedule the first PDSCH. If the time interval between the first PDSCH and the first PDCCH is less than a preset threshold, the network device sends the first PDSCH by using a default TCI-state. If the time interval between the first PDSCH and the first PDCCH is greater than or equal to the preset threshold, the network device may send the first PDSCH by using the default TCI-state, or may send the first PDSCH by using another TCI-state, include information indicating the TCI-state in the first PDCCH, and notify the terminal device of the information.

S420: The network device sends a downlink signal to the terminal device, and S430: the terminal device receives the downlink signal from the network device by using a first transmission configuration indicator state (TCI-state). In this embodiment of this application, the first TCI-state may be one TCI-state, or may be two TCI-states.

Before the terminal device completes processing of the first PDCCH, because the terminal device is uncertain about whether the network device sends the first PDSCH in a process of receiving the first PDCCH, to avoid missing the first PDSCH, the terminal device may use a receive beam corresponding to the first TCI-state (which may also be referred to as the default TCI-state) to receive all downlink signals within a period of time that starts from a symbol on which the PDCCH is located and whose duration is the preset threshold and buffer the downlink signals until receiving and processing of the first PDCCH are completed.

It should be understood that, before receiving and buffering the downlink signals, the terminal device may first determine whether the network device performs data transmission by using one TCI-state or two TCI-states, to determine whether to buffer the downlink signals by using one TCI-state or two TCI-states.

In an optional embodiment, the method further includes: The terminal device may determine, based on a plurality of groups of currently active TCI-states used for PDSCH transmission, whether the network device transmits the first PDSCH by using two TCI-states, to determine whether to receive the downlink signal by using two first TCI-states, where each TCI-state group includes one TCI-state or two TCI-states, and one TCI-state group corresponds to one TCI field value in DCI. If at least one TCI-state group includes two TCI-states in the plurality of groups of currently active TCI-states used for PDSCH transmission, the terminal device determines that the network device sends the first PDSCH by using the two TCI-states, to receive the downlink signal by using the two first TCI-states. Otherwise, the terminal device determines that the network device sends the first PDSCH by using one TCI-state, to receive the downlink signal by using one first TCI-state.

In an optional embodiment, the method further includes: The terminal device may determine, based on a plurality of groups of currently active TCI-states used for PDSCH transmission, whether the network device transmits the first PDSCH by using two TCI-states, to determine whether to receive the downlink signal by using two first TCI-states, where each TCI-state group includes one TCI-state or two TCI-states, and one TCI-state group corresponds to one TCI field value in DCI. If each of the plurality of groups of currently active TCI-states used for PDSCH transmission includes two TCI-states, the terminal device determines that the network device sends the first PDSCH by using the two TC-states, to receive the downlink signal by using the two first TCI-states. Otherwise, the terminal device determines that the network device sends the first PDSCH by using one TCI-state, to receive the downlink signal by using one first TCI-state.

In this embodiment of this application, the terminal device may determine, based on an activation status of the TCI-state of the first PDSCH, whether the network device performs data transmission by using a single TCI-state or two TCI-states. For example, if the network device activates one or more TCI-state groups by using one piece of activation signaling (for example, MAC-CE signaling), and at least one TCI-state group includes two TCI-states, or each TCI-state group includes two TCI-states (in other words, one or more TCI field values in a TCI field in the DCI all correspond to two TCI-states), it indicates that the network device may perform simultaneous transmission by using two TCI-states. In this case, the terminal device determines to buffer the downlink signal by using one default TCI-state or two default TCI-states. Otherwise, the terminal device determines to buffer the downlink signal by using one default TCI-state.

Optionally, whether the terminal device can perform receiving by using the two first TCI-states may be reported by the terminal device to the network device in a capability reporting process. In other words, when terminal capability information indicates that transmission of the PDSCH by using the two default TCI-states is supported, the PDSCH is received by using the two first TCI-states; when the terminal capability information indicates that transmission of the PDSCH by using the two default TCI-states is not supported, the PDSCH is received by using one first TCI-state.

S440: The terminal device obtains a time interval between the first PDCCH and the first PDSCH.

The time interval between the first PDCCH and the first PDSCH in this embodiment of this application may also be referred to as a scheduling time interval of the first PDSCH, a scheduling offset of the first PDSCH, or another name.

S450: If the time interval is less than the preset threshold, the terminal device obtains the first PDSCH from the downlink signal. The first PDSCH may be a part of a PDSCH, or may be a whole PDSCH. This is not limited in this embodiment of this application. It should be understood that, that the first PDSCH is a part of a PDSCH means that the downlink signal received and buffered by the terminal device includes a part of a PDSCH, that is, a part of the first PDSCH. In other words, if the first PDSCH is a part of a PDSCH, it indicates that one part of a transmission time of the first PDSCH is within the preset threshold, and the other part of the transmission time of the first PDSCH is beyond the preset threshold.

After completing receiving and processing of the first PDCCH, the terminal device may determine the time interval between the first PDSCH scheduled by using the first PDCCH and the first PDCCH. If the time interval is less than the preset threshold, the terminal device may determine that the first PDSCH is included in the buffered downlink signal, and obtain the first PDSCH from the buffered downlink signal based on a parameter (for example, time-frequency resource information of the PDSCH) indicated by the PDCCH.

It should be understood that the preset threshold indicates a time required by the terminal device to receive and process the PDCCH and prepare a receive beam of the PDSCH (in other words, it may take a specific time to switch to the receive beam of the PDSCH). For example, the terminal device may report the preset threshold to the network device through a terminal capability parameter (for example, timeDurationForQCL). A name of the terminal capability parameter is not limited to timeDurationForQCL in this application. That the time interval between the first PDCCH and the second PDSCH is less than the preset threshold indicates that the transmission time of the first PDSCH is before completion of receiving of the first PDCCH. The condition "the time interval between the first PDCCH and the first PDSCH scheduled by using the first PDCCH is less than the preset threshold" may also be replaced with a condition in another form, provided that the condition can indicate that the transmission time of the first PDSCH is before completion of receiving of the first PDCCH. Similarly, the condition "the time interval between the first PDCCH and the first PDSCH scheduled by using the first PDCCH is not less than the preset threshold" may also be replaced with a condition in another form, provided that the condition can indicate that the transmission time of the first PDSCH is after completion of receiving of the first PDCCH.

The condition "the time interval between the first PDCCH and the first PDSCH scheduled by using the first PDCCH is less than the preset threshold" may also be replaced with "the time interval between the first PDCCH and the first PDSCH scheduled by using the first PDCCH is less than or equal to the preset threshold". Correspondingly, the condition "the time interval between the first PDCCH and the first PDSCH scheduled by using the first PDCCH is greater than or equal to the preset threshold" may also be replaced with "the time interval between the first PDCCH and the first PDSCH scheduled by using the first PDCCH is greater than the preset threshold". In other words, the "equal to" case may be grouped together with the "less than" case, or may be grouped together with the "greater than" case. This is not limited in this embodiment of this application. It should be understood that the time interval between the PDSCH and the PDCCH corresponding to the PDSCH may be specifically a time interval (gap) or a time offset (offset) between the first symbol of the PDCCH and the first symbol of the PDSCH. Alternatively, the time interval between the PDSCH and the PDCCH corresponding to the PDSCH may be specifically a time interval (gap) or a time offset (offset) between the last symbol of the PDCCH and the first symbol of the PDSCH. This is not limited in this embodiment of this application.

In this embodiment of this application, the TCI-state group is a group of TC-states that are activated by using activation signaling and that are used for PDSCH transmission. Each TCI-state group corresponds to one field value of the TCI field in the DCI, and may include one or more TCI-states. For example, the TCI field in the DCI has eight values, and may correspond to eight TCI-state groups. The eight TCI-state groups are indicated by using the activation signaling sent by the network device to the terminal device. The network device may use one TCI-state group each time to perform PDSCH transmission.

In this embodiment of this application, the terminal device determines the first TCI-state or the two first TCI-states, to receive the downlink signal. To be specific, when the time interval between the first PDSCH and the first PDCCH is less than the preset threshold (for example, TimeDurationForQCL), the terminal device may receive the first PDSCH by using the first TCI-state or the two first TCI-states.

The first TCI-state in this embodiment of this application may be determined in any one of the following plurality of manners.

Manner 1: The terminal device uses a TCI-state used by the first PDCCH as one of the first TCI-states, and then determines the foregoing first TCI-state based on the one of the first TCI-states.

In a first possible implementation, the first TCI-state is a TCI-state included in one (for example, a TCI-state group corresponding to a smallest or largest TCI field value) of one or more TCI-state groups that include the TCI-state used by the first PDCCH.

In other words, there may be one TCI-state group including the TCI-state used by the first PDCCH, or there may be a plurality of TCI-state groups that include the TCI-state used by the first PDCCH. If there is one TCI-state group including the TCI-state used by the first PDCCH, the first TCI-state is the TCI-state included in the TCI-state group. If there are a plurality of TCI-state groups that include the TCI-state used by the first PDCCH, the first TCI-state is a TCI-state included in a TCI-state group corresponding to a smallest or largest TCI field value in the plurality of TCI-state groups.

For example, the terminal device may use the TCI-state used by the first PDCCH as one of the first TCI-states. Then, the terminal device determines, in at least one active TCI-state group used for PDSCH transmission (where each TCI-state group corresponds to one TCI field value of a TCI field in DCI), all TCI-state groups that include one of the first TCI-states. Finally, the terminal device selects one TCI-state group (for example, the TCI-state group corresponding to the smallest or largest TCI field value) from these TCI-state groups, and uses all TCI-states included in the TCI-state group as the first TCI-state used by the terminal device to receive the downlink signal. If the TCI-state group determined by the terminal device includes one TCI-state, the first TCI-state is the TCI-state. In other words, the terminal device receives the downlink signal by using the first TCI-state. If the TCI-state group determined by the terminal device includes two TCI-states, the first TCI-states are the two TCI-states. In other words, the terminal device receives the downlink signal by using the two first TCI-states.

In a second possible implementation, the first TCI-state is a TCI-state included in one (for example, a TCI-state group corresponding to a smallest or largest TCI field value) of one or more TCI-state groups that include the TCI-state used by the first PDCCH and that include two TCI-states.

In other words, there may be one TCI-state group that includes two TCI-states and that includes the TCI-state used by the first PDCCH, or there may be a plurality of TCI-state groups that include two TCI-states and that include the TCI-state used by the first PDCCH. If there is one TCI-state group that includes two TCI-states and that includes the TCI-state used by the first PDCCH, the first TCI-state is the TCI-state included in the TCI-state group. If there are a plurality of TCI-state groups that include two TCI-states and that include the TCI-state used by the first PDCCH, the first TCI-state is a TCI-state included in a TCI-state group corresponding to a smallest or largest TCI field value in the plurality of TCI-state groups that include the two TCI-states.

For example, the terminal device may use the TCI-state used by the first PDCCH as one of the first TCI-states. Then, the terminal device determines, in at least one active TCI-state group used for PDSCH transmission (where each TCI-state group corresponds to one TCI field value of a TCI field in DCI), all TCI-state groups that include one of the first TCI-states and that include two TCI-states. Finally, the terminal device selects one TCI-state group (for example, the TCI-state group corresponding to the smallest or largest TCI field value, or a TCI-state group in which a second TCI-state has a smallest or largest index) from these TCI-state groups, and uses all TCI-states included in the TCI-state group as the first TCI-state. It should be understood that the second TC-state is a TCI-state other than the TCI-state used by the first PDCCH in a TC-state group including two TCI-states. According to the method in this embodiment of this application, it can be ensured that the TCI-state group determined by the terminal device definitely includes two TCI-states, so that the downlink signal is received by using the two TC-states.

In a third possible implementation, if there is no one or more TCI-state groups that include the TCI-state used by the first PDCCH, the first TCI-state is the TCI-state used by the first PDCCH.

For example, the terminal device may first determine the two first TCI-states in the second possible implementation. If the two first TCI-states cannot be determined in the second possible implementation, in other words, there is no TCI-state group that includes the TCI-state used by the first PDCCH and two TCI-states, the terminal device may determine a unique first TCI-state. In other words, the terminal device determines, in at least one TCI-state group that includes two TCI-states, a TCI-state group including the TCI-state used by the first PDCCH. If there is no such TCI-state group, the terminal device may determine the TCI-state used by the first PDCCH as the unique first TCI-state, or determine, in at least one TC-state group that includes one TCI-state, a TCI-state group including the TCI-state used by the first PDCCH.

It should be understood that the foregoing "smallest or largest" is an example for description, and this embodiment of this application is not limited thereto. In another possible implementation, the second to last smallest, the second to last largest, the third to last smallest, the third to last largest, or the like may also be used. In this embodiment, "smallest or largest" is used as an example for description, but this embodiment is not limited thereto.

As described above, the network device sends one piece of MAC-CE signaling to the terminal device to activate the TCI-state, the MAC-CE may activate eight TCI-states, and the eight TCI-states are respectively in a one-to-one correspondence with eight TCI field values in ascending order of indexes. In this way, each TCI field value corresponds to one TCI-state. During PDSCH transmission based on a plurality of TCI-states, the network device sends a PDSCH by using two TCI-states. Therefore, each TCI field value corresponds to two TCI-states. Similarly, the network device may activate a plurality of TCI-state groups by using MAC-CE signaling. Each TCI-state group includes one TCI-state or two TCI-states, and each TCI-state group corresponds to one TCI field value. For example, a correspondence between the eight TCI field values and the eight TCI-state groups are shown in the following Table 1.

TABLE 1

Table of a correspondence between
TCI fields and TCI-state groups

| TCI field value (codepoint) | TCI-state group |
|---|---|
| 0 | #2, #3 |
| 1 | #4, #6 |
| 2 | #2, #6 |
| 3 | #4, #3 |
| 4 | #2 |
| 5 | #3 |
| 6 | #4 |
| 7 | #5 |

2, #3, #6, and the like in Table 1 are all identifiers of TCI-states, and are used to uniquely identify the TCI-states. #2 indicates a TCI-state identified by #2. For ease of description, #2, #3, and #6 are used for description subsequently.

As shown in Table 1, it is assumed that the TCI-state used by the first PDCCH is #2. If the first possible implementation of the manner 1 is used, three TCI-state groups {#2, #3}, {#2, #6}, and {#2} meet a condition. If a TCI-state group corresponding to a smallest TCI field value is used, the terminal device may use {#2, #3}, that is, the TCI-state #2 and the TCI-state #3, as two first TCI-states. If a TCI-state group corresponding to a largest TCI field value is used, the terminal device may use {#2}, that is, the TCI-state #2, as the unique first TCI-state. If the second possible implementation of the manner 1 is used, two TCI-state groups {#2, #3} and {#2, #6} meet a condition. If a TCI-state group corresponding to a smallest TCI field value is used, the terminal device may use {#2, #3}, that is, the TCI-state #2 and the TCI-state #3, as two first TCI-states. If a TCI-state group corresponding to a largest TCI field value is used, the terminal device may use {#2, #6}, that is, the TCI-state #2 and the TCI-state #6, as two first TCI-states.

Manner 2: The terminal device uses an active TCI-state in one (for example, a CORESET with a smallest or largest index) of one or more CORESETs that are latest received (for example, received in a latest slot) as one of the first TCI-states, and then determines the foregoing first TCI-state based on the one of the first TCI-states.

One (for example, the CORESET with the smallest or largest index) of the one or more CORESETs that are latest received (for example, received in the latest slot) may also be referred to as a "target CORESET". There may be one or more latest received CORESETs. If the terminal device latest receives one CORESET, the target CORESET is the CORESET. If the terminal device latest receives a plurality of CORESETs, the target CORESET may be a CORESET with a smallest or largest index in the plurality of CORESETs. It should be understood that the latest received CORESET (for example, the CORESET received in the latest slot) may also be understood as a CORESET associated with a search space (search space) that is latest monitored (for example, monitored in the latest slot).

In a first possible implementation, the first TCI-state is a TCI-state included in one (for example, a TCI-state group corresponding to a smallest or largest TCI field value) of one or more TCI-state groups that include an active TCI-state in a CORESET (for example, a CORESET with a smallest or largest index) in one or more latest received CORESETs.

In other words, there may be one TCI-state group including an active TCI-state in the target CORESET, or there may be a plurality of TCI-state groups that include an active TCI-state in the target CORESET. If there is one TCI-state group including the active TCI-state in the target CORESET, the first TCI-state is the TCI-state included in the TCI-state group. If there are a plurality of TCI-state groups that include the active TCI-state in the target CORESET, the first TCI-state is a TCI-state included in a TCI-state group corresponding to a smallest or largest TCI field value in the plurality of TCI-state groups.

For example, the terminal device may use an active TCI-state in one (for example, a CORESET with a smallest or largest index) of one or more CORESETs that are latest received (for example, received in a latest slot) as one of the first TCI-states. Then, the terminal device determines, in at least one active TCI-state group used for PDSCH transmission (where each TCI-state group corresponds to one TCI field value of a TCI field in DCI), one or more TCI-state groups that include one of the first TCI-states. Finally, the terminal device selects one TCI-state group (for example, the TCI-state group corresponding to the smallest or largest TCI field value) from these TCI-state groups, and uses all TCI-states included in the TCI-state group as the first TCI-state used by the terminal device to receive the downlink signal. If the TCI-state group determined by the terminal device includes one TCI-state, the first TCI-state is the TCI-state. In other words, the terminal device receives the downlink signal by using the first TCI-state. If the TCI-state group determined by the terminal device includes two TCI-states, the first TCI-states are the two TCI-states. In other words, the terminal device receives the downlink signal by using the two first TCI-states.

In a second possible implementation, the first TCI-state is a TCI-state included in one (for example, a TCI-state group corresponding to a smallest or largest TCI field value) of one or more TCI-state groups that include an active TCI-state in a CORESET (for example, a CORESET with a smallest or largest index) in one or more latest received CORESETs and that include two TCI-states.

In other words, there may be one TCI-state group that includes two TCI-states and that includes the active TCI-state in the target CORESET, or there may be a plurality of TCI-state groups that include two TCI-states and that include the active TCI-state in the target CORESET. If there is one TCI-state group that includes two TCI-states and that includes the active TCI-state in the target CORESET, the first TCI-state is the TCI-state included in the TCI-state group. If there are a plurality of TCI-state groups that include two TCI-states and that include the active TCI-state in the target CORESET, the first TCI-state is a TCI-state included in a TCI-state group corresponding to a smallest or largest TCI field value in the plurality of TCI-state groups that include the two TCI-states.

For example, the terminal device may use an active TCI-state in one (for example, a CORESET with a smallest or largest index) of one or more CORESETs that are latest received (for example, received in a latest slot) as one of the first TCI-states. Then, the terminal device determines, in at least one active TCI-state group used for PDSCH transmission (where each TCI-state group corresponds to one TCI field value of a TCI field in DCI), one or more TCI-state groups that include one of the first TCI-states and that include two TCI-states. Finally, the terminal device selects one TCI-state group (for example, the TCI-state group corresponding to the smallest or largest TCI field value, or a TCI-state group in which a second TCI-state has a smallest or largest index) from these TCI-state groups, and uses all TCI-states included in the TCI-state group as the first TCI-state. It should be understood that the second TCI-state is a TCI-state, other than the active TCI-state in the CORESET (for example, the CORESET with the smallest or largest index) in the one or more CORESETs that are latest received (for example, received in the latest slot), in the TCI-state group that includes two TCI-states. According to the method in this embodiment of this application, it can be ensured that the TCI-state group determined by the terminal device definitely includes two TCI-states, so that the downlink signal is received by using the two TCI-states.

In a third possible implementation, if there is no TCI-state group including the active TCI-state in the CORESET (for example, the CORESET with the smallest or largest index) in the one or more latest received CORESETs, the first TCI-state is the active TCI-state in the CORESET (for example, the CORESET with the smallest or largest index) in the latest received CORESETs.

For example, the terminal device may first determine the two first TCI-states in the second possible implementation. If the two first TCI-states cannot be determined in the second possible implementation, that is, there is no TCI-state group that includes the active TCI-state in the CORESET (for example, the CORESET with the smallest or largest index) in all the CORESETs that are latest received (for example, received in the latest slot) and includes two TCI-states, the terminal device may determine the unique first TCI-state. To be specific, the terminal device determines, in at least one TCI-state group that includes two TCI-states, a TCI-state group including the active TCI-state in the CORESET (for example, the CORESET with the smallest or largest index) in all the CORESETs that are latest received (for example, received in the latest slot). If there is no such TCI-state group, the terminal device may determine, as the unique first TCI-state, the active TCI-state in the CORESET (for example, the CORESET with the smallest or largest index) in all the CORESETs that are latest received (for example, received in the latest slot), in other words, determine, in one or more TCI-state groups that include one TCI-state, the TCI-state group including the active TCI-state in the CORESET (for example, the CORESET with the smallest or largest index) in all the CORESETs that are latest received (for example, received in the latest slot).

In the manner 1 and the manner 2, the terminal device determines one TCI-state group in at least one active TCI-state group used for PDSCH transmission. Activation signaling needs to be first received to activate a TCI-state used for PDSCH transmission. To be specific, the terminal device uses the manner 1 or the manner 2 only when the terminal device has received the activation signaling and has activated the TCI-state used for PDSCH transmission. Otherwise, the terminal device may use the TCI-state used by the first PDCCH as the unique first TCI-state. Alternatively, the terminal device may use, as the unique first TCI-state, the active TCI-state in the CORESET (for example, the CORESET with the smallest or largest index) in all the CORESETs that are latest received (for example, received in the latest slot).

For example, with reference to the foregoing condition, a specific implementation method of the manner 1 may be expressed as follows: If the TCI-state used for PDSCH transmission has been activated, and the TCI-state used by the first PDCCH is included in one or more active TCI-state groups (where each TCI-state group corresponds to one field value of the TCI field in the DCI), all TCI-states included in the TCI-state group corresponding to the smallest or largest TCI field value are used as the first TCI-states; otherwise, the TCI-state used by the first PDCCH is used as the first TCI-state.

For example, with reference to the foregoing condition, a specific implementation method of the manner 2 may be expressed as follows: If the TCI-state used for PDSCH transmission has been activated, and in all the CORESETs that are latest received (for example, received in the latest slot), the active TCI-state in the CORESET with the smallest or largest index is included in the one or more active TCI-state groups (where each TCI-state group corresponds to one field value of the TCI field in the DCI), all TCI-states included in the TCI-state group corresponding to the smallest or largest TCI field value are used as the first TCI-states; otherwise, the active TCI-state in the CORESET with the smallest or largest index in all the CORESETs that are latest received (for example, received in the latest slot) is used as the first TCI-state.

For another example, a specific implementation method of the manner 2 may be expressed as follows: After the TCI-state used for PDSCH transmission has been activated, if in all the CORESETs that are latest received (for example, received in the latest slot), the active TCI-state in the CORESET with the smallest or largest index is included in the one or more active TCI-state groups (where each TCI-state group corresponds to one field value of the TCI field in the DCI), all TCI-states included in the TCI-state group corresponding to the smallest or largest TC field value are used as the first TCI-states; otherwise, the active TCI-state in the CORESET with the smallest or largest index in all the CORESETs that are latest received (for example, received in a latest slot) is used as the first TCI-state.

It should be understood that the foregoing "smallest or largest" is an example for description, and this embodiment of this application is not limited thereto. In another possible implementation, the second to last smallest, the second to last largest, the third to last smallest, the third to last largest, or the like may also be used. In this embodiment, "smallest or largest" is used as an example for description, but this embodiment is not limited thereto.

Manner 3: The first TCI-states are two TCI-states used to latest transmit the second PDSCH, and the second PDSCH is transmitted by using two TCI-states.

Alternatively, the first TCI-states are two TCI-states used to latest transmit the second PDSCH, the second PDSCH is transmitted by using two TCI-states, and the two TCI-states are indicated through DCI.

Alternatively, the first TCI-states are two TCI-states used to latest transmit the second PDSCH, the second PDSCH is transmitted by using two TCI-states, and the scheduling time interval is not less than the preset threshold.

For example, before current transmission, the network device has performed PDSCH transmission with the terminal device for one or more times. Some PDSCHs are transmitted by using a single TCI-state, and some PDSCHs are transmitted by using two TCI-states. In this case, the terminal device may receive and buffer the downlink signal by using two TCI-states of a PDSCH that is transmitted by latest using the two TCI-states. In other words, the second PDSCH may be the PDSCH that is transmitted by latest using the two TCI-states.

Optionally, alternatively, the terminal device may use two TCI-states used by a PDSCH that is transmitted by latest using the two TCI-states and whose scheduling time interval is not less than the preset threshold. For example, before current transmission, the network device has performed PDSCH transmission with the terminal device for one or more times. Some PDSCHs are transmitted by using a single TCI-state, and some PDSCHs are transmitted by using two TCI-states. In the PDSCHs that are transmitted by using two TCI-states, scheduling time intervals of some PDSCHs are less than the preset threshold, and scheduling time intervals of some PDSCHs are not less than the preset threshold. In this case, the terminal device may receive and buffer a signal by using a TCI-state used by a PDSCH that is transmitted by latest using two TCI-states and whose scheduling time interval is not less than the preset threshold. The second PDSCH may further be the PDSCH that is transmitted by latest using two TCI-states and whose scheduling time interval is not less than the preset threshold.

Optionally, when the scheduling time interval of the second PDSCH is not less than the preset threshold, there may be the following two cases for determining a TCI-state of the second PDSCH.

Case 1: The second PDSCH uses a DCI format (format) 1_1, and a parameter tci-PresentInDci in a CORESET corresponding to the first PDCCH is configured as "enabled". In this case, two TCI-states of the second PDSCH are indicated by using a TCI field in the DCI.

Case 2: The second PDSCH uses a DCI format 1_0, or a parameter tci-PresentInDci in a CORESET corresponding to the first PDCCH is not configured. In this case, the two TCI-states of the second PDSCH are determined in another manner, for example, by using the TCI-state of the PDCCH by default. A specific method to be used is not limited herein.

For PDSCHs corresponding to the foregoing two cases, the terminal device may use the two TCI-states that are of the latest transmitted PDSCH and that are in the PDSCH corresponding to the case 1 or may use the two TCI-states that are of the latest transmitted PDSCH and that are in the PDSCH corresponding to the case 2. Specifically, the terminal device may perform transmission by using the two TCI-states of the PDSCH that is transmitted by latest using the two TCI-states indicated by the TCI field in the DCI (that is, determined in a manner corresponding to the case 1), or by using the two TCI-states of the PDSCH that is transmitted by latest using the two TCI-states determined in a manner corresponding to the case 2.

Manner 4: The first TCI-state is a TCI-state in one (for example, a TCI-state group corresponding to a smallest or largest TCI field value) of a plurality of TCI-state groups used for PDSCH transmission. The TCI-state group includes two TCI-states.

It should be understood that the foregoing "smallest or largest" is an example for description, and this embodiment of this application is not limited thereto. In another possible implementation, the second to last smallest, the second to last largest, the third to last smallest, the third to last largest, or the like may also be used. In this embodiment, "smallest or largest" is used as an example for description, but this embodiment is not limited thereto.

In this manner, the terminal device may use the TCI-state group corresponding to the smallest or largest TCI field value (codepoint) in a plurality of groups of currently active TCI-states used for PDSCH transmission. In other words, the terminal device may use the TCI-state group corresponding to the smallest or largest TCI field value in at least one TCI-state group that corresponds to all current TCI field values. Alternatively, the terminal device may use a TCI-state group corresponding to a TCI field value '000', or use a TCI-state group corresponding to a TCI field value '111'.

For example, in the table of the correspondence between TCI fields and TCI-states shown in Table 1, if the TCI-state with the smallest TCI field value is used, the two first TCI-states are respectively #2 and #3. If the TCI-state with the largest TCI field value is used, the two first TCI-states are respectively #5 and #7.

Manner 5: The first TCI-states are two TCI-states used to transmit the first PDCCH.

The network device may send the PDCCH to the terminal device through a single TRP (by using a single TCI-state), or may send the PDCCH through a plurality of TRPs (by using a plurality of TCI-states). When the network device sends the first PDCCH to the terminal device by using two TCI-states, the two first TCI-states may be the two TCI-states used to transmit the first PDCCH.

Manner 6: The first TCI-states are two currently active TCI-states in a control resource set (CORESET) (for example, a CORESET with a smallest or largest index) in at least one CORESET that is latest monitored (for example, monitored in a latest slot).

Optionally, for any one or more of the manner 1 to the manner 6, the following prerequisite may be added: ATCI-state used for PDSCH transmission has been activated, or a TCI-state used for PDSCH transmission has been activated in an active bandwidth part (active BWP), or a TCI-state used for PDSCH transmission has been activated in an active BWP of a serving cell.

The serving cell is a cell corresponding to PDSCH transmission. In other words, the terminal device can determine the first TCI-state in one of the manner 1 to the manner 6 only when the TCI-state used for PDSCH transmission has been activated. Otherwise, the terminal device uses only one TCI-state as the first TCI-state or the terminal device does not receive the PDSCH. Specifically, the terminal device may determine the first TCI-state by using an SSB for initial access. In other words, the first TCI-state and the SSB are in QCL. Alternatively, the terminal device may use, as the first TCI-state, a TCI-state of a CORESET with a smallest or largest index in at least one configured or latest monitored CORESET. Alternatively, the terminal device may use a TCI-state of DCI for scheduling the PDSCH as the first TCI-state.

For example, with reference to the foregoing condition, a specific implementation method of the manner 4 may be represented as follows: If the TCI-state used for PDSCH transmission has been activated (for example, the TCI-state used for PDSCH transmission has been activated in the active BWP), and at least one TCI field value corresponds to two TCI-states, the first TCI-states are two TCI-states corresponding to a smallest or largest field value in TCI field values corresponding to the two TCI-states. It should be understood that only two TCI-states are used as an example for description in this embodiment, and the two TCI-states may also be replaced with more TCI-states. This is not limited herein. If the TCI-state used for PDSCH transmission has not been activated (for example, the TCI-state used for PDSCH transmission has not been activated in the active BWP), one TCI-state is used as the first TCI-state or the PDSCH is not received. For example, the first TCI-state is determined by using an SSB for initial access. In other words, the first TCI-state and the SSB are in QCL. Alternatively, a TCI-state of a CORESET with a smallest or largest index in at least one configured or latest monitored CORESET is used as the first TCI-state. Alternatively, a TCI-state of DCI for scheduling the PDSCH is used as the first TCI-state. If the TCI-state used for PDSCH transmission is activated (for example, the TCI-state used for PDSCH transmission has been activated in the active BWP), but each TCI field value corresponds to a single TCI-state, one TCI-state is used as the first TCI-state. For example, the first TCI-state is determined by using an SSB for initial access. In other words, the first TCI-state and the SSB are in QCL. Alternatively, a TCI-state of a CORESET with a smallest or largest index in at least one configured or latest monitored CORESET is used as the first TCI-state. Alternatively, a TCI-state of DCI for scheduling the PDSCH is used as the first TCI-state. Alternatively, a TCI-state with a smallest index in configured/active PDSCH TCI-states is used as the first TCI-state. Alternatively, a TCI-state corresponding to a smallest or largest TC field value in active PDSCH TCI-states is used as the first TCI-state.

It should be understood that the foregoing "smallest or largest" is an example for description, and this embodiment of this application is not limited thereto. In another possible implementation, the terminal device may also use the second to last smallest, the second to last largest, the third to last smallest, the third to last largest, or the like. In this embodiment, "smallest or largest" is used as an example for description, but this embodiment is not limited thereto.

In this manner, the terminal device may use two active TCI-states in the CORESET with the smallest or largest index in the at least one CORESET that is latest monitored (for example, monitored in a latest slot). In other words, in a previous period of time, the terminal device monitors a CORESET in one or more slots. In this case, the terminal device may select two active TCI-states in a CORESET with a smallest or largest index in a latest monitored slot.

It should be understood that there may be a case in which no TCI-state group includes one of the foregoing first TCI-states. Therefore, in a possible implementation, if there is no TCI-state group that includes one of the foregoing first TCI-states, the terminal device may select a second TCI-state in the TCI-state group with the smallest TCI field value as another first TCI-state. If the TCI-state group with the smallest TCI field value includes one TCI-state, the terminal device may use the TCI-state as the another first TCI-state.

In another possible implementation, if there is no TCI-state group that includes one of the foregoing first TCI-states, the terminal device uses a TCI-state with a smallest ID in all active TCI-states as the another first TCI-state. Alternatively, the terminal device uses a second TCI-state with a smallest or largest ID in all one or more active TCI-state groups as the another first TCI-state. One TCI-state group includes two TCI-states, and the second TCI-state is the second TCI-state in a TCI-state group. For example, two TCI-state groups {#2, #3} and {#4, #5} that include two TCI-states are activated, and the two TCI-state groups correspond to two second TCI-states #3 and #5. If the second TCI-state with the smallest ID is used, the terminal device may use the TCI-state #3 as another TCI-state.

In another possible implementation, if there is no TCI-state group that includes one of the foregoing first TCI-states, the terminal device may determine the two first TCI-states in any one of the manner 3 to the manner 6. In other words, execution conditions for determining the two TCI-states in the manner 1 or the manner 2 are not satisfied, and the manner is rolled back to another manner. For example, if there is no TCI-state group that includes one of the foregoing first TCI-states in at least one currently active TCI-state group, the two first TCI-states form one (for example, one TCI-state group corresponding to a smallest or largest TCI field value) of the plurality of groups of currently active TCI-states used for PDSCH transmission.

The following provides a rollback mechanism, that is, a processing method of the terminal device when the two first TCI-states cannot be found by using the foregoing method (the method for determining the two TCI-states in the manner 1 to the manner 6). Specifically, when the two first TCI-states cannot be determined by using the foregoing method, the terminal device may use one TCI-state as a unique first TCI-state. For example, in the manner 1 and the manner 2, when the terminal device cannot find a TCI-state group that can meet a requirement, one TCI-state may be used as a unique TCI-state. The TCI-state may be the TCI-state used by the first PDCCH, or may be the active TCI-state in the CORESET with the smallest or largest index in all the CORESETs that are latest received (for example, received in the latest slot).

For example, when the manner 1 is used, the TCI-state used by the first PDCCH is a TCI-state #8. According to Table 1, because there is no TCI-state group that includes the TCI-state #8, the TCI-state #8 is used as the unique first TCI-state.

For another example, when the manner 2 is used, the active TCI-state in the CORESET with the smallest index in all the CORESETs that are latest received (for example, received in the latest slot) is the TCI-state #8. According to Table 1, because there is no TCI-state group that includes the TCI-state #8, the TCI-state #8 is used as the unique first TCI-state.

In another possible implementation, after determining the two first TCI-states by using the foregoing method, the terminal device may determine, depending on whether the two first TCI-states can be simultaneously received, whether to roll back to a transmission mode in which a single first TCI-state is used. For example, after determining the two first TCI-states in the manner 1 or the manner 2, the terminal device finds that the two first TCI-states cannot be simultaneously received by the terminal device. In this case, the terminal device may use a unique first TCI-state. Optionally, the unique first TCI-state may be one first TCI-state or the other first TCI-state in the two first TCI-states. Optionally, the unique first TCI-state may alternatively be the active TCI-state in the CORESET with the smallest or largest index in the at least one CORESET that is latest received (for example, received in a latest slot). Optionally, the unique first TCI-state may alternatively be a TCI-state used by the first PDCCH.

It should be understood that "the two first TCI-states cannot be simultaneously received" means that receive beams corresponding to the two first TCI-states are different. However, the terminal device has only one antenna panel, or only one antenna panel is enabled. Therefore, the terminal device cannot simultaneously generate two different receive beams for receiving.

In addition, to ensure that the two used TCI-states can be received at the same time, when the TCI-state of the PDSCH is activated, it needs to be ensured that the two TCI-states corresponding to a same TCI field value can be received at the same time. That is, the foregoing constraint is imposed when the TCI-state of the PDSCH is activated.

In an optional embodiment, the network device may include usage of a plurality of active TCI-states in activation signaling (for example, a MAC-CE) of the TCI-state of the PDSCH. For example, the network device may indicate that the plurality of active TCI-states are applicable to simultaneous sending or time-sharing sending. In other words, the plurality of active TCI-state groups may be used for simultaneous sending, or may be used for time-sharing sending, or may be used for both simultaneous sending and time-sharing sending. This is not limited in this embodiment of this application. In this case, in the manner 1 to the manner 6, the network device and the terminal device can determine the foregoing two first TCI-states only from a TCI-state group used for simultaneous sending.

For example, for single-DCI multi-TRP transmission, when a scheduling offset of a PDSCH is less than a threshold timeDurationForQCL, if a default TCI-state (for example, an active TCI-state in a CORESET with a smallest ID in at least one CORESET that corresponds to a search space monitored in a latest slot after the activation signaling of the TCI-state is received) in the R15 protocol is included in a TCI-state group corresponding to one or more TCI field values, UE may assume that a DMRS port of the PDSCH uses a QCL parameter indicated by a TCI-state group corresponding to a smallest TCI field value in one or more TCI field values including the default TCI-state of the R15 protocol. Otherwise, the UE may assume that the DMRS port of the PDSCH uses a QCL parameter indicated by the default TCI-state in the R15 protocol.

In an optional embodiment, the method further includes: if the time interval is greater than or equal to the preset threshold, and the first PDCCH does not carry information about a TCI-state, determining a second TCI-state, and receiving the first PDSCH by using the second TCI-state.

After completing receiving and processing of the first PDCCH, the terminal device may determine information about the first PDSCH, for example, a scheduling time interval, a time-frequency resource used to transmit the first PDSCH, and a used TCI-state. If the terminal device finds, based on scheduling information in the first PDCCH, that the time interval between the scheduled first PDSCH and the first PDCCH is greater than or equal to the preset threshold, it indicates that the buffered downlink signal does not include the first PDSCH. Therefore, the terminal device may discard the buffered downlink signal, and receive the first PDSCH based on information about the time-frequency resource of the first PDSCH carried in the first PDCCH and the second TCI-state. In other words, if the time interval between the first PDSCH and the first PDCCH is greater than or equal to the preset threshold, the terminal device may determine the TCI-state of the first PDSCH based on the first PDCCH. Specifically, there may be the following two cases, and a corresponding method is used in each case.

Case 1: The first PDCCH carries the information about the TCI-state, for example, the type of the DCI carried in the first PDCCH is a DCI format 1_1, and a parameter tci-PresentInDci in a CORESET corresponding to the first PDCCH is configured as "enabled". In this case, the terminal device may use two TCI-states indicated by the information about the TCI-state in DCI as the two second TCI-states used to transmit the first PDSCH. "The information about the TCI-state in DCI" may also be replaced with "the information about the TCI-state in the first PDCCH". In other words, if the time interval between the first PDCCH and the first PDSCH scheduled by using the first PDCCH is greater than the preset threshold, the type of the DCI carried in the first PDCCH is a DCI format 1_1, and the parameter tci-PresentInDci in the CORESET corresponding to the first PDCCH is configured as "enabled", the two TCI-states indicated in the DCI are used as the two second TCI-states used to transmit the first PDSCH.

Case 2: The first PDCCH does not carry the information about the TCI-state, for example, the type of the DCI carried in the first PDCCH is a DCI format 10, or the parameter tci-PresentInDci is not configured in the CORESET corresponding to the first PDCCH. In this case, there is no TCI field in the DCI, and the information about the TCI-state cannot be indicated. The terminal device may determine the second TCI-state by using any one of the following methods. In other words, if a time interval between the DCI and the first PDSCH scheduled by using the DCI is greater than the preset threshold, and the DCI type is the DCI format 1_0 or the parameter tci-PresentInDci is not configured in the CORESET corresponding to the first PDCCH, the second TCI-state may be determined in any one of the following plurality of manners.

Manner 1: The terminal device uses a TCI-state used by the first PDCCH as one of the second TCI-states, and then determines the foregoing second TCI-state based on the one of the second TCI-states.

In a first possible implementation, the second TCI-state is a TCI-state included in one (for example, a TCI-state group corresponding to a smallest or largest TCI field value) of one or more TCI-state groups that include the TCI-state used by the first PDCCH.

In other words, there may be one TCI-state group including the TCI-state used by the first PDCCH, or there may be a plurality of TCI-state groups that include the TCI-state used by the first PDCCH. If there is one TCI-state group including the TCI-state used by the first PDCCH, the second TCI-state is the TCI-state included in the TCI-state group. If there are a plurality of TCI-state groups that include the TCI-state used by the first PDCCH, the second TCI-state is a TCI-state included in a TCI-state group corresponding to a smallest or largest TCI field value in the plurality of TCI-state groups.

For example, the terminal device may use the TCI-state used by the first PDCCH as one of the second TCI-states. Then, the terminal device determines, in at least one active TCI-state group used for PDSCH transmission (where each TCI-state group corresponds to one TCI field value of a TCI field in DCI), all TCI-state groups that include one of the second TCI-states. Finally, the terminal device selects one TCI-state group (for example, the TCI-state group corresponding to the smallest or largest TCI field value) from these TCI-state groups, and uses all TCI-states included in the TCI-state group as the second TCI-state used by the terminal device to receive the downlink signal. If the TCI-state group determined by the terminal device includes one TCI-state, the second TCI-state is the TCI-state. In other words, the terminal device receives the downlink signal by using the second TCI-state. If the TCI-state group determined by the terminal device includes two TCI-states, the second TCI-states are the two TCI-states. In other words, the terminal device receives the downlink signal by using the two second TCI-states.

In a second possible implementation, the second TCI-state is a TCI-state included in one (a TCI-state group corresponding to a smallest or largest TCI field value) of one or more TCI-state groups that include the TCI-state used by the first PDCCH and that include two TCI-states.

In other words, there may be one TCI-state group that includes two TCI-states and that includes the TCI-state used by the first PDCCH, or there may be a plurality of TCI-state groups that include two TCI-states and that include the TCI-state used by the first PDCCH. If there is one TCI-state group that includes two TCI-states and that includes the TCI-state used by the first PDCCH, the second TCI-state is the TCI-state included in the TCI-state group. If there are a plurality of TCI-state groups that include two TCI-states and that include the TCI-state used by the first PDCCH, the second TCI-state is a TCI-state included in a TCI-state group corresponding to a smallest or largest TCI field value in the plurality of TCI-state groups that include the two TCI-states.

For example, the terminal device may use the TCI-state used by the first PDCCH as one of the second TCI-states. Then, the terminal device determines, in at least one active TCI-state group used for PDSCH transmission (where each TCI-state group corresponds to one TCI field value of a TCI field in DCI), all TCI-state groups that include one of the second TCI-states and that include two TCI-states. Finally, the terminal device selects one TCI-state group (for example, the TCI-state group corresponding to the smallest or largest TCI field value, or a TCI-state group in which a second TCI-state has a smallest or largest index) from these TCI-state groups, and uses all TCI-states included in the TCI-state group as the second TCI-state. It should be understood that the second TCI-state is a TCI-state other than the TCI-state used by the first PDCCH in a TCI-state group including two TCI-states. According to the method in this embodiment of this application, it can be ensured that the TCI-state group determined by the terminal device definitely includes two TCI-states, so that the downlink signal is received by using the two TCI-states.

In a third possible implementation, if there is no one or more TCI-state groups that include the TCI-state used by the first PDCCH, the second TCI-state is the TCI-state used by the first PDCCH.

For example, the terminal device may first determine the two second TCI-states in the second possible implementation. If the two second TCI-states cannot be determined in the second possible implementation, in other words, there is no TCI-state group that includes the TCI-state used by the first PDCCH and two TCI-states, the terminal device may determine a unique second TCI-state. In other words, the terminal device determines, in at least one TCI-state group that includes two TCI-states, a TCI-state group including the TCI-state used by the first PDCCH. If there is no such TCI-state group, the terminal device may determine the TCI-state used by the first PDCCH as the unique second TCI-state, or determine, in at least one TCI-state group that includes one TCI-state, a TCI-state group including the TCI-state used by the first PDCCH.

Manner 2: The terminal device uses an active TCI-state in one (for example, a CORESET with a smallest or largest index) of one or more CORESETs that are latest received (for example, received in a latest slot) as one of the second TCI-states, and then determines the foregoing second TCI-state based on the one of the second TCI-states.

One (for example, the CORESET with the smallest or largest index) of the one or more CORESETs that are latest received (for example, received in the latest slot) may also be referred to as a "target CORESET". There may be one or more latest received CORESETs. If the terminal device latest receives one CORESET, the target CORESET is the CORESET. If the terminal device latest receives a plurality of CORESETs, the target CORESET may be a CORESET with a smallest or largest index in the plurality of CORESETs. It should be understood that the latest received CORESET (for example, a CORESET received in a latest slot) may also be understood as a CORESET associated with a search space (search space) that is latest monitored (for example, monitored in a latest slot).

In a first possible implementation, the second TCI-state is a TCI-state included in one (for example, a TCI-state group corresponding to a smallest or largest TCI field value) of one or more TCI-state groups that include an active TCI-state in a CORESET (for example, a CORESET with a smallest or largest index) in one or more latest received CORESETs.

In other words, there may be one TCI-state group including an active TCI-state in the target CORESET, or there may be a plurality of TCI-state groups that include an active TCI-state in the target CORESET. If there is one TCI-state group including the active TCI-state in the target CORESET, the second TCI-state is the TCI-state included in the TCI-state group. If there are a plurality of TCI-state groups that include the active TCI-state in the target CORESET, the second TCI-state is a TCI-state included in a TCI-state group corresponding to a smallest or largest TC field value in the plurality of TCI-state groups.

For example, the terminal device may use an active TCI-state in one (for example, a CORESET with a smallest or largest index) of one or more CORESETs that are latest received (for example, received in a latest slot) as one of the second TCI-states. Then, the terminal device determines, in at least one active TCI-state group used for PDSCH transmission (where each TCI-state group corresponds to one TCI field value of a TCI field in DCI), one or more TCI-state groups that include one of the second TCI-states. Finally, the terminal device selects one TCI-state group (for example, the TCI-state group corresponding to the smallest or largest TCI field value) from these TCI-state groups, and uses all TCI-states included in the TCI-state group as the second TCI-state used by the terminal device to receive the downlink signal. If the TCI-state group determined by the terminal device includes one TCI-state, the second TCI-state is the TCI-state. In other words, the terminal device receives the downlink signal by using the second TCI-state. If the TCI-state group determined by the terminal device includes two TCI-states, the second TCI-states are the two TCI-states. In other words, the terminal device receives the downlink signal by using the two second TCI-states.

In a second possible implementation, the second TCI-state is a TCI-state included in one (for example, a TCI-state group corresponding to a smallest or largest TCI field value) of one or more TCI-state groups that include an active TCI-state in a CORESET (for example, a CORESET with a smallest or largest index) in one or more latest received CORESETs and that include two TCI-states.

In other words, there may be one TCI-state group that includes two TCI-states and that includes the active TCI-state in the target CORESET, or there may be a plurality of TCI-state groups that include two TCI-states and that include the active TCI-state in the target CORESET. If there is one TCI-state group that includes two TCI-states and that includes the active TCI-state in the target CORESET, the second TCI-state is the TCI-state included in the TCI-state group. If there are a plurality of TCI-state groups that include two TCI-states and that include the active TCI-state in the target CORESET, the second TCI-state is a TCI-state included in a TCI-state group corresponding to a smallest or largest TCI field value in the plurality of TCI-state groups that include the two TCI-states.

For example, the terminal device may use an active TCI-state in one (for example, a CORESET with a smallest or largest index) of one or more CORESETs that are latest received (for example, received in a latest slot) as one of the second TCI-states. Then, the terminal device determines, in at least one active TCI-state group used for PDSCH transmission (where each TCI-state group corresponds to one TCI field value of a TCI field in DCI), one or more TCI-state groups that include one of the second TCI-states and that include two TCI-states. Finally, the terminal device selects one TCI-state group (for example, the TCI-state group corresponding to the smallest or largest TCI field value, or a TCI-state group in which a second TCI-state has a smallest or largest index) from these TCI-state groups, and uses all TCI-states included in the TCI-state group as the second TCI-state. It should be understood that the second TCI-state is a TCI-state, other than the active TCI-state in the CORESET (for example, the CORESET with the smallest or largest index) in the one or more CORESETs that are latest received (for example, received in the latest slot), in the TCI-state group that includes two TCI-states. According to the method in this embodiment of this application, it can be ensured that the TCI-state group determined by the terminal device definitely includes two TCI-states, so that the downlink signal is received by using the two TCI-states.

In a third possible implementation, if there is no TCI-state group including the active TCI-state in the CORESET (for example, the CORESET with the smallest or largest index) in the one or more latest received CORESETs, the second TCI-state is the active TCI-state in the CORESET (for example, the CORESET with the smallest or largest index) in the latest received CORESETs.

For example, the terminal device may first determine the two second TCI-states in the second possible implementation. If the two second TCI-states cannot be determined in the second possible implementation, that is, there is no TCI-state group that includes the active TCI-state in the CORESET (for example, the CORESET with the smallest or largest index) in all the CORESETs that are latest received (for example, received in the latest slot) and includes two TCI-states, the terminal device may determine the unique second TCI-state. To be specific, the terminal device determines, in at least one TCI-state group that includes two TCI-states, a TCI-state group including the active TCI-state in the CORESET (for example, the CORESET with the smallest or largest index) in all the CORESETs that are latest received (for example, received in the latest slot). If there is no such TCI-state group, the terminal device may determine, as the unique second TCI-state, the active TCI-state in the CORESET (for example, the CORESET with the smallest or largest index) in all the CORESETs that are latest received (for example, received in the latest slot), in other words, determine, in one or more TCI-state groups that include one TCI-state, the TCI-state group including the active TCI-state in the CORESET (for example, the CORESET with the smallest or largest index) in all the CORESETs that are latest received (for example, received in the latest slot).

In the manner 1 and the manner 2, the terminal device determines one TCI-state group in at least one active TCI-state group used for PDSCH transmission. Activation signaling needs to be first received to activate a TCI-state used for PDSCH transmission. To be specific, the terminal device uses the manner 1 or the manner 2 only when the terminal device has received the activation signaling and has activated the TCI-state used for PDSCH transmission. Otherwise, the terminal device may use the TCI-state used by the first PDCCH as the unique second TCI-state. Alternatively, the terminal device may use, as the unique second TCI-state, the active TCI-state in the CORESET (for example, the CORESET with the smallest or largest index) in all the CORESETs that are latest received (for example, received in the latest slot).

For example, with reference to the foregoing condition, a specific implementation method of the manner 1 may be expressed as follows: If the TCI-state used for PDSCH transmission has been activated, and the TCI-state used by the first PDCCH is included in one or more active TCI-state groups (where each TCI-state group corresponds to one field value of the TCI field in the DCI), all TCI-states included in the TCI-state group corresponding to the smallest or largest TCI field value are used as the second TCI-states; otherwise, the TCI-state used by the first PDCCH is used as the second TCI-state.

For example, with reference to the foregoing condition, a specific implementation method of the manner 2 may be expressed as follows: If the TCI-state used for PDSCH transmission has been activated, and in all the CORESETs that are latest received (for example, received in the latest slot), the active TCI-state in the CORESET with the smallest or largest index is included in the one or more active TCI-state groups (where each TCI-state group corresponds to one field value of the TCI field in the DC), all TC-states included in the TCI-state group corresponding to the smallest or largest TCI field value are used as the second TCI-states; otherwise, the active TCI-state in the CORESET with the smallest or largest index in all the CORESETs that are latest received (for example, received in the latest slot) is used as the second TCI-state.

For another example, a specific implementation method of the manner 2 may be expressed as follows: After the TCI-state used for PDSCH transmission has been activated, if in all the CORESETs that are latest received (for example, received in the latest slot), the active TCI-state in the CORESET with the smallest or largest index is included in the one or more active TCI-state groups (where each TCI-state group corresponds to one field value of the TCI field in the DCI), all TCI-states included in the TCI-state group corresponding to the smallest or largest TC field value are used as the second TCI-states; otherwise, the active TCI-state in the CORESET with the smallest or largest index in all the CORESETs that are latest received (for example, received in the latest slot) is used as the second TC-state.

Manner 3: The second TCI-states are two TCI-states used to latest transmit the second PDSCH, and the second PDSCH is transmitted by using two TCI-states.

Alternatively, the second TC-states are two TCI-states used to latest transmit the second PDSCH, the second PDSCH is transmitted by using two TCI-states, and the two TCI-states are indicated through DCI.

Alternatively, the second TCI-states are two TCI-states used to latest transmit the second PDSCH, the second PDSCH is transmitted by using two TCI-states, and the scheduling time interval is not less than the preset threshold.

Manner 4: The second TCI-state is a TCI-state in one (for example, a TC-state group corresponding to a smallest or largest TCI field value) of a plurality of TCI-state groups used for PDSCH transmission. The TCI-state group includes two TCI-states.

Manner 5: The second TCI-states are two TCI-states used to transmit the first PDCCH.

Manner 6: The second TCI-states are two currently active TCI-states in one (for example, a control resource set (CORESET) with a smallest or largest index) of CORESETs that are latest monitored (for example, monitored in a latest slot).

The manner 1 to the manner 6 that are used to determine the second TCI-state are the same as the manner 1 to the manner 6 that are used to determine the first TCI-state, and details are not described herein again.

Optionally, for any one or more of the manner 1 to the manner 6, the following prerequisite may be added: ATCI-state used for PDSCH transmission has been activated, or a TCI-state used for PDSCH transmission has been activated in an active bandwidth part (active BWP), or a TCI-state used for PDSCH transmission has been activated in an active BWP of a serving cell.

The serving cell is a cell corresponding to PDSCH transmission. In other words, the terminal device can determine the second TCI-state in one of the manner 1 to the manner 6 only when the TCI-state used for PDSCH transmission has been activated. Otherwise, the terminal device uses only one TCI-state as the second TCI-state or the terminal device does not receive the PDSCH. Specifically, the terminal device may determine the second TCI-state by using an SSB for initial access. In other words, the second TCI-state and the SSB are in QCL. Alternatively, the terminal device may use, as the second TCI-state, a TCI-state of a CORESET with a smallest or largest index in at least one configured or latest monitored CORESET. Alternatively, the terminal device may use a TCI-state of DCI for scheduling the PDSCH as the second TCI-state.

For example, with reference to the foregoing condition, a specific implementation method of the manner 4 may be represented as follows: If the TCI-state used for PDSCH transmission has been activated (for example, the TCI-state used for PDSCH transmission has been activated in the active BWP), and at least one TCI field value corresponds to two TCI-states, the second TCI-states are two TCI-states corresponding to a smallest or largest field value in TCI field values corresponding to the two TCI-states. It should be understood that only two TCI-states are used as an example for description in this embodiment, and the two TCI-states may also be replaced with more TCI-states. This is not limited herein. If the TCI-state used for PDSCH transmission has not been activated (for example, the TCI-state used for PDSCH transmission has not been activated in the active BWP), one TCI-state is used as the second TCI-state or the PDSCH is not received. For example, the second TCI-state is determined by using an SSB for initial access. In other words, the second TCI-state and the SSB are in QCL. Alternatively, a TCI-state of a CORESET with a smallest or largest index in at least one configured or latest monitored CORESET is used as the second TCI-state. Alternatively, a TCI-state of DCI for scheduling the PDSCH is used as the second TCI-state. If the TCI-state used for PDSCH transmission is activated (for example, the TCI-state used for PDSCH transmission has been activated in the active BWP), but each TCI field value corresponds to a single TCI-state, one TCI-state is used as the second TCI-state. For example, the second TCI-state is determined by using an SSB for initial access. In other words, the second TCI-state and the SSB are in QCL. Alternatively, a TCI-state of a CORESET with a smallest or largest index in at least one configured or latest monitored CORESET is used as the second TCI-state. Alternatively, a TCI-state of DCI for scheduling the PDSCH is used as the second TCI-state. Alternatively, a TCI-state with a smallest index in configured/active PDSCH TCI-states is used as the second TCI-state. Alternatively, a TCI-state corresponding to a smallest or largest TCI field value in active PDSCH TCI-states is used as the second TCI-state.

Similarly, there may be a case in which no TCI-state group includes one of the foregoing second TCI-states. Therefore, in a possible implementation, if there is no TCI-state group that includes one of the foregoing second TCI-states, the terminal device may select a second TCI-state in the TCI-state group with the smallest TCI field value as another second TCI-state. If the TCI-state group with the smallest TCI field value includes one TC-state, the terminal device may use the TCI-state as the another second TC-state.

In another possible implementation, if there is no TCI-state group that includes one of the foregoing second TCI-states, the terminal device uses a TCI-state with a smallest ID in all active TCI-states as the another second TCI-state. Alternatively, the terminal device uses a second TCI-state with a smallest or largest ID in all one or more active TCI-state groups as the another second TCI-state. One TCI-state group includes two TCI-states, and the second TCI-state is the second TCI-state in a TCI-state group. For example, two TCI-state groups {#2, #3} and {#4, #5} that include two TCI-states are activated, and the two TCI-state groups correspond to two second TCI-states #3 and #5. If the second TCI-state with the smallest ID is used, the terminal device may use the TCI-state #3 as another TCI-state.

In another possible implementation, if there is no TCI-state group that includes one of the foregoing second TCI-states, the terminal device may determine the two second TCI-states in any one of the manner 3 to the manner 6. In other words, execution conditions for determining the two TCI-states in the manner 1 or the manner 2 are not satisfied, and the manner is rolled back to another manner. For example, if there is no TCI-state group that includes one of the foregoing second TCI-states in at least one currently active TCI-state group, the two second TCI-states form one (for example, one TCI-state group corresponding to a smallest or largest TCI field value) of the plurality of groups of currently active TCI-states used for PDSCH transmission.

The following provides a rollback mechanism, that is, a processing method of the terminal device when the two second TCI-states cannot be found by using the foregoing method (the method for determining the two TCI-states in the manner 1 to the manner 6). Specifically, when the two second TCI-states cannot be determined by using the foregoing method, the terminal device may use one TCI-state as a unique TCI-state. For example, in the manner 1 and the manner 2, when the terminal device cannot find a TCI-state group that can meet a requirement, one TCI-state may be used as a unique TCI-state. The TCI-state may be the TCI-state used by the first PDCCH, or may be the active TCI-state in the CORESET with the smallest or largest index in all the CORESETs that are latest received (for example, received in the latest slot).

For example, when the manner 1 is used, the TCI-state used by the first PDCCH is a TCI-state #8. According to Table 1, because there is no TCI-state group that includes the TCI-state #8, the TCI-state #8 is used as the unique second TCI-state.

For another example, when the manner 2 is used, the active TCI-state in the CORESET with the smallest index in all the CORESETs that are latest received (for example, received in the latest slot) is the TCI-state #8. According to Table 1, because there is no TCI-state group that includes the TCI-state #8, the TCI-state #8 is used as the unique second TCI-state. [02%] In another possible implementation, after determining the two second TCI-states by using the foregoing method, the terminal device may determine, depending on whether the two second TCI-states can be simultaneously received, whether to roll back to a transmission mode in which a single second TCI-state is used. For example, after determining the two second TCI-states in the manner 1 or the manner 2, the terminal device finds that the two second TCI-states cannot be simultaneously received by the terminal device. In this case, the terminal device may use a unique second TCI-state. Optionally, the unique second TCI-state may be one second TCI-state or the other second TCI-state in the two second TCI-states. Optionally, the unique second TCI-state may alternatively be the active TCI-state in the CORESET with the smallest or largest index in the at least one CORESET that is latest received (for example, received in a latest slot). Optionally, the unique second TCI-state may alternatively be a TCI-state used by the first PDCCH.

The specific method for determining the unique second TCI-state is the same as a method for determining the unique first TCI-state, and details are not described herein again.

After determining, in the foregoing manner, one second TCI-state or two second TCI-states used to transmit the first PDSCH, the terminal device may receive the first PDSCH based on the TCI-state or the two TCI-states. Specifically, the terminal device may determine information about a transmit beam based on a reference signal included in the TCI-state or the two TCI-states, to determine a corresponding receive beam, and receive, by using the receive beam, the first PDSCH sent on one transmit beam or two transmit beams.

In the foregoing method, the preset threshold may be used for both high-frequency transmission and low-frequency transmission. In other words, transmission is performed by using a frequency range 2 (FR 2) and a frequency range 1 (FR 1). In this case, regardless of whether transmission is performed in the FR 1 or the FR 2, the TCI-state of the first PDSCH may be determined by using the foregoing method. To be specific, when the time interval between the first PDCCH and the first PDSCH is less than the preset threshold, the terminal device may receive the PDSCH by using the first TCI-state determined by using the foregoing method. When the time interval between the first PDCCH and the first PDSCH is greater than or equal to the preset threshold, and the DCI carried in the first PDCCH does not include the information about the TCI-state, the terminal device may receive the PDSCH by using the second TCI-state determined by using the foregoing method. When the time interval between the first PDCCH and the first PDSCH is greater than or equal to the preset threshold, and the DCI carried in the first PDCCH includes the information about the TCI-state, the terminal device may receive the PDSCH by using the TCI-state indicated by the first PDCCH.

In the foregoing method, the preset threshold may be used only for high-frequency transmission. In other words, transmission is performed by using a frequency in the FR 2 or a TCI-state including QCL-typeD is configured. In this case, the TCI-state of the first PDSCH is determined by using the foregoing method. To be specific, when the time interval between the first PDCCH and the first PDSCH is less than the preset threshold, the terminal device may receive the PDSCH by using the first TCI-state determined by using the foregoing method. When the time interval between the first PDCCH and the first PDSCH is greater than or equal to the preset threshold, and the DCI does not include the information about the TCI-state, the terminal device may receive the PDSCH by using the second TCI-state determined by using the foregoing method. When the time interval between the first PDCCH and the first PDSCH is greater than or equal to the preset threshold, and the DCI includes the information about the TCI-state, the terminal device may receive the PDSCH by using the TCI-state indicated by the first PDCCH. When transmission is performed by using the FR 1, whether the time interval between the first PDCCH and the first PDSCH is less than the preset threshold does not need to be distinguished, the following method may be used. To be specific, when the DCI carried in the first PDCCH does not include the information about the TCI-state, the terminal device may receive the PDSCH by using the second TCI-state determined by using the foregoing method. When the DCI carried in the first PDCCH includes the information about the TCI-state, the terminal device may receive the PDSCH by using the TCI-state indicated by the first PDCCH.

It should be understood that, that the PDSCH is transmitted by using a frequency in the FR 2 is equivalent to that a TCI-state including quasi-co-location (QCL)-TypeD information is configured for a serving cell that schedules the PDSCH. The two descriptions are not limited in this application.

That the DCI includes the TCI-state may be understood as that a DCI format is DCI 1_1, and a value of the parameter tci-PresentInDCI in the CORESET corresponding to the first PDCCH is configured as "enabled". That the DCI does not include the TCI-state may be understood as that a DCI format is DCI 1_0, or the parameter tci-PresentInDCI in the CORESET corresponding to the first PDCCH is not configured.

It should be understood that tci-PresentInDci is a configuration parameter, and indicates whether the DCI carries the information about the TCI-state. A name of the parameter is not limited to tci-PresentInDci in this application. The parameter tci-PresentInDci is configured as "enabled", indicating that the DCI carries the information about the TCI-state. The condition that the parameter tci-PresentInDci is configured as "enabled" may be replaced with a condition in another form, provided that the condition can indicate that the DCI carries the information about the TCI-state. Likewise, the condition that the parameter tci-PresentInDci is not configured may be replaced with a condition in another form, provided that the condition can indicate that the DCI does not carry the information about the TCI-state. This is not limited in this embodiment of this application.

It should be further understood that, that the DC type is a DC format 1_1 indicates that the DCI includes a TCI field. The condition that the DCI type is a DCI format 1_1 may also be replaced with a condition in another form, provided that the condition can indicate that the DCI includes a TCI field. Similarly, the condition that the DCI type is a DCI format 1_0 may also be replaced with a condition in another form, provided that the condition can indicate that the DCI includes no TCI field.

In an optional embodiment, the method further includes: receiving first signaling, where the first signaling is used to activate one or more TCI-states for one CORESET, and the first signaling includes one or more of the following fields: a field used to indicate a quantity of active TCI-states, or a field used to indicate whether a quantity of active TCI-states is greater than or equal to 1.

In this embodiment of this application, because data transmission is performed based on a plurality of TCI-states, the PDCCH may be transmitted by using the plurality of TCI-states. In this case, each CORESET may activate one or more TCI-states. The network device may send first signaling to the terminal device, to activate one or more TCI-states for one CORESET. The first signaling may include a field (which may be referred to as a quantity indication field for short) used to indicate a quantity of active TCI-states, and/or a field used to indicate whether the quantity of active TCI-states is greater than or equal to 1. The first signaling may be MAC-CE signaling, RRC signaling, or DCI signaling. This is not limited in this embodiment of this application. The first signaling may be sent by the network device to the terminal device before the network device sends the first PDCCH.

Figure 5:
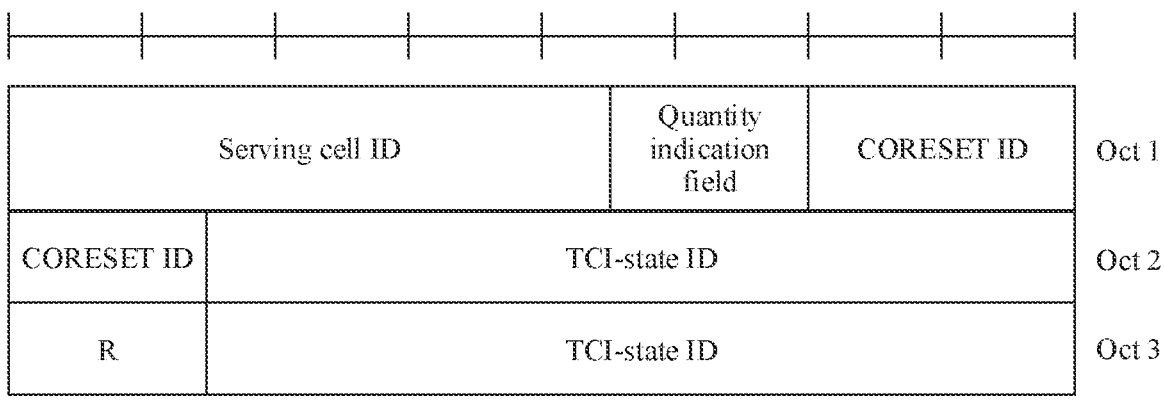
FIG. 5 is a schematic diagram of a format of signaling used to activate a TCI-state according to an embodiment of this application.

FIG. 5 is a schematic diagram of a format of first signaling according to an embodiment of this application. As shown in FIG. 5, the first signaling includes the following fields.

A serving cell (serving cell) ID field: The serving cell ID field is used to indicate an identifier of a serving cell.

Quantity indication field: The quantity indication field is a field used to indicate a quantity of active TCI-states, or a field used to indicate whether a quantity of active TCI-states is greater than or equal to 1. In other words, the field may be used to indicate the quantity of TCI-states activated by using the first signaling, or the TCI-state quantity indication field may be used to indicate whether one or more TCI-states are activated by using the first signaling. For example, the quantity indication field is 1 bit, a field value of 0 indicates that a single TCI-state is activated, and a field value of 1 indicates that a plurality of TCI-states are activated. Optionally, the quantity indication field may be located before or after the serving cell ID field. This is not limited in this embodiment of this application.

CORESET ID field: The CORESET ID field is used to indicate an identifier of a CORESET.

TCI-state ID field: The TCI-state ID field is used to indicate an identifier of a TCI-state.

R represents a reserved bit, and Oct represents an octet.

According to the data transmission method in this embodiment of this application, the terminal device can determine, in a plurality of manners, a TCI-state used by the network device for data transmission, so that the terminal device determines a receive beam based on the TCI-state, and receives data sent by the network device, thereby improving data transmission efficiency.

Figure 6:
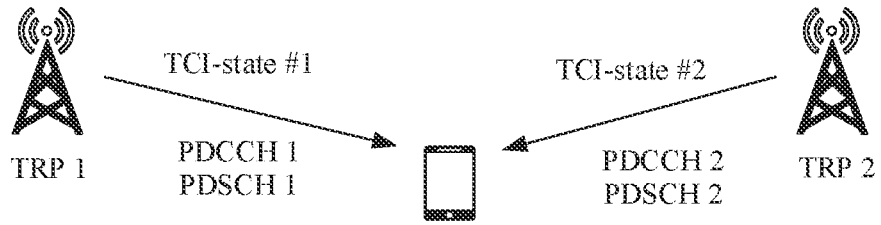
FIG. 6 is a schematic diagram of another data transmission scenario according to an embodiment of this application.

FIG. 6 is a schematic diagram of another data transmission scenario according to an embodiment of this application. The data transmission scenario is a multi-TRP transmission scenario based on a plurality of PDCCHs. To be specific, the network device sends PDSCHs to the terminal device through a plurality of TRPs. The PDSCHs sent by all the TRPs are independent PDSCHs. Each TRP sends the PDSCH by using one TCI-state. Therefore, the terminal device can correctly receive the PDSCH corresponding to each TCI-state only after determining a plurality of TCI-states. For ease of description, FIG. 6 shows two TRPs (that is, the terminal device may determine two TC-states). Specifically, a TRP 1 sends a PDCCH 1 to the terminal device, to schedule a PDSCH 1 transmitted by the TRP 1, and a TRP 2 sends a PDCCH 2 to the terminal device, to schedule a PDSCH 2 transmitted by the TRP 2. The TRP 1 sends the PDSCH 1 to the terminal device by using a TCI-state #1, and the TRP 2 sends the PDSCH 2 to the terminal device by using a TCI-state #2. The PDSCH 1 and the PDSCH 2 are two independent PDSCHs. The terminal device can correctly receive the PDSCH 1 and the PDSCH 2 only after determining the TCI-state #1 and the TCI-state #2.

Figure 7:
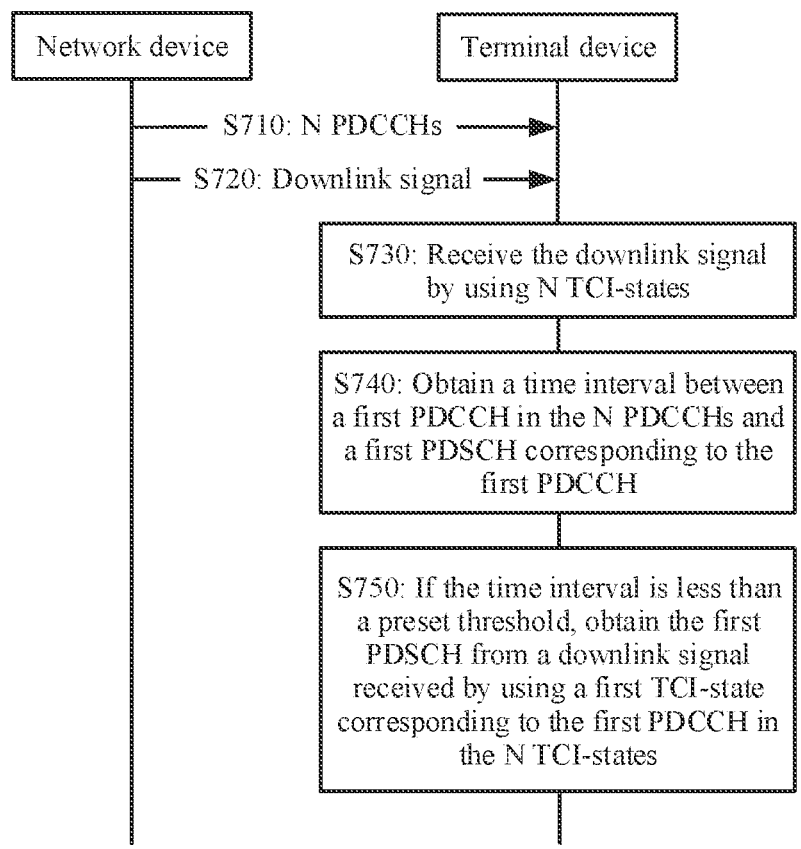
FIG. 7 is a schematic flowchart of another data transmission method according to an embodiment of this application.

For the scenario shown in FIG. 6, FIG. 7 is a schematic flowchart of a data transmission method according to an embodiment of this application. The method includes the following steps.

S710: The network device sends N physical downlink control channels (PDCCH) to the terminal device, and correspondingly, the terminal device receives the N physical downlink control channels (PDCCH) from the network device, where the N PDCCHs are respectively used to schedule N physical downlink shared channels (PDSCH), and N is an integer greater than 1. Each of the N PDCCHs includes a transmission parameter of a PDSCH sent by a TRP corresponding to the PDCCH. For example, the transmission parameter is a time-frequency resource for transmitting the PDSCH and a TCI-state of the PDSCH. In the scenario shown in FIG. 6, N=2. For ease of understanding, N=2 is used as an example for description subsequently.

For example, the network device may send, to the terminal device through two TRPs, two PDCCHs used to schedule two PDSCHs. As described above, when sending the two PDSCHs, the network device may determine a time interval between each PDCCH and a PDSCH scheduled by using the PDSCH. If the time interval between the PDCCH and the PDSCH scheduled by using the PDCCH is less than a preset threshold, the network device sends the PDSCH by using a default TCI-state. If the time interval between the PDCCH and the PDSCH scheduled by using the PDCCH is greater than or equal to the preset threshold, the network device may send the PDSCH by using the default TCI-state, or may send the PDSCH by using another TCI-state, include information indicating the TCI-state in the PDCCH, and notify the terminal device of the information.

S720: The network device sends a downlink signal to the terminal device, and S730: the terminal device receives the downlink signal from the network device by using two transmission configuration indicator states (TCI-states).

For either of the two PDCCHs, before the terminal device completes processing of the PDCCH, because the terminal device is uncertain about whether the network device sends the PDSCH scheduled by using the PDCCH in a process of receiving the PDCCH, to avoid missing the PDSCH, the terminal device uses a receive beam corresponding to a first TCI-state (which may also be referred to as the default TCI-state) to receive all downlink signals within a period of time that starts from a symbol on which the PDCCH is located and whose duration is the preset threshold and buffer the downlink signals until receiving and processing of the PDCCH are completed.

S740: The terminal device obtains a time interval between a first PDCCH in the two PDCCHs and a first PDSCH corresponding to the first PDCCH.

The time interval between the first PDCCH and the first PDSCH in this embodiment of this application may also be referred to as a scheduling time interval of the first PDSCH, a scheduling offset (offset) of the first PDSCH, or another name.

S750: If the time interval is less than the preset threshold, the terminal device obtains the first PDSCH from a downlink signal received by using a first TCI-state corresponding to the first PDCCH in the used two TCI-states.

After completing receiving and processing of the first PDCCH, the terminal device may determine the time interval between the first PDSCH scheduled by using the first PDCCH and the first PDCCH. If the time interval is less than the preset threshold, the terminal device may determine that the first PDSCH is included in the buffered downlink signal, and obtain the first PDSCH from the buffered downlink signal based on a parameter (for example, time-frequency resource information of the PDSCH) indicated by the PDCCH.

In this embodiment of this application. PDSCHs sent by two TRPs may be considered as two PDSCHs. Each PDSCH corresponds to one TCI-state. Therefore, the terminal device may separately determine a default TCI-state of each PDSCH. Therefore, subsequent content in this embodiment of this application is described for a single PDCCH and a single PDSCH scheduled by using the PDCCH. To be specific, a method for determining a TCI-state of a single PDSCH is discussed, and a method for determining a TCI-state of another PDSCH is the same as the method for determining the TCI-state of the single PDSCH.

It should be further understood that the preset threshold (timeDurationForQCL) indicates a time required by the terminal device to receive and process the PDCCH and prepare a receive beam of the PDSCH (in other words, it may take a specific time to switch to the receive beam of the PDSCH). A name of the preset threshold is not limited to timeDurationForQCL in this application. That the time interval between the first PDCCH and the second PDSCH is less than the preset threshold indicates that the transmission time of the first PDSCH is before completion of receiving of the first PDCCH. The condition "the time interval between the first PDCCH and the first PDSCH scheduled by using the first PDCCH is less than the preset threshold" may also be replaced with a condition in another form, provided that the condition can indicate that the transmission time of the first PDSCH is before completion of receiving of the first PDCCH. Similarly, the condition "the time interval between the first PDCCH and the first PDSCH scheduled by using the first PDCCH is not less than the preset threshold" may also be replaced with a condition in another form, provided that the condition can indicate that the transmission time of the first PDSCH is after completion of receiving of the first PDCCH.

The condition "the time interval between the first PDCCH and the first PDSCH scheduled by using the first PDCCH is less than the preset threshold" may also be replaced with "the time interval between the first PDCCH and the first PDSCH scheduled by using the first PDCCH is less than or equal to the preset threshold". Correspondingly, the condition "the time interval between the first PDCCH and the first PDSCH scheduled by using the first PDCCH is greater than or equal to the preset threshold" may also be replaced with "the time interval between the first PDCCH and the first PDSCH scheduled by using the first PDCCH is greater than the preset threshold". In other words, the "equal to" case may be grouped together with the "less than" case, or may be grouped together with the "greater than" case. This is not limited in this embodiment of this application.

In an optional embodiment, the first TCI-state is a currently active TCI-state in a control resource set (CORESET) (for example, a CORESET with a smallest or largest index) in a group of first CORESETs that are latest received (for example, received in a latest slot), and the first CORESET group is a CORESET group including CORESETs having a same index as a CORESET corresponding to the first PDCCH. The same index herein may also be referred to as a same group index (or a same group index value), and is used to group CORESETs.

For example, for PDSCH transmission based on a plurality of pieces of DCI, for each PDSCH, if a scheduling offset of the PDSCH is less than a threshold timeDurationForQCL, UE may assume that a DMRS port of the PDSCH uses a QCL parameter of an active TCI-state in a CORESET with a smallest ID in one or more CORESETs corresponding to a search space monitored in a latest slot. The one or more CORESETs have a same HigherLayerIndexPerCORESETvalue.

It should be understood that the foregoing "smallest or largest" is an example for description, and this embodiment of this application is not limited thereto. In another possible implementation, the second to last smallest, the second to last largest, the third to last smallest, the third to last largest, or the like may also be used. In this embodiment, "smallest or largest" is used as an example for description, but this embodiment is not limited thereto.

When the time interval between the first PDSCH and the first PDCCH is less than the preset threshold, the first TCI-state may be a currently active TCI-state in a CORESET with a smallest or largest index in a CORESET group to which the CORESET corresponding to the first PDCCH belongs. The CORESET group refers to CORESETs associated with a same index (which may also be referred to as a particular index value). It should be understood that each CORESET is associated with a particular index value (for example, 0 or 1). The CORESETs associated with the same index value may be considered as a group. For example, all CORESETs associated with the index value of 0 may be considered as a group of CORESETs, and all CORESETs associated with the index value of 1 may be considered as another group of CORESETs. In other words, all CORESETs configured by the network device may be divided into a plurality of groups. When a PDCCH corresponding to a group of CORESETs is used to schedule a PDSCH, a currently active TCI-state in a CORESET with a smallest or largest index in the CORESET group is used as a default beam of the PDSCH. The "particular index value" may be an index value related to a transmission station. CORESETs corresponding to a same transmission station use a same index value, and CORESETs corresponding to different transmission stations use different index values.

In an optional embodiment, each CORESET in the first CORESET group is associated with an index, the CORESETs in the first CORESET group have a same index, and the index of the CORESET in the first CORESET group is different from an index of a CORESET in another CORESET group.

In this embodiment of this application, the terminal device may determine two TCI-states of the two PDSCHs in the foregoing manner, and further receive and buffer data by using the two TCI-states. For example, the first TCI-state of the first PDSCH scheduled by using the first PDCCH is determined, and a second TCI-state of the second PDSCH scheduled by using a second PDCCH is determined. For either of the foregoing TCI-states, a buffer time interval may be determined, and the terminal device may receive and buffer data in the buffer time interval by using the TCI-state. The buffer time interval refers to K consecutive symbols starting from the first symbol of a PDCCH corresponding to the TCI-state, or K consecutive symbols starting from the last symbol of a PDCCH corresponding to the TCI-state, or K consecutive symbols starting from the first symbol after a PDCCH corresponding to the TCI-state. K is a quantity of symbols corresponding to the preset threshold. It should be understood that K may be a value specified in a protocol, a value indicated by the network device to the terminal device, or a value reported by the terminal device to the network device. For example, K may be a value of the preset threshold (TimeDurationForQCL).

There are the following two cases in which data is buffered by using the foregoing two TCI-states depends on a capability of the terminal device.

Case 1: Buffer time intervals corresponding to the two TCI-states do not overlap, or the terminal device may perform receiving by simultaneously using the two TCI-states.

Case 2: Buffer symbol ranges corresponding to the two TCI-states overlap, and the terminal device cannot perform receiving by simultaneously using the two TCI-states.

Whether the terminal device can perform receiving by using a plurality of TCI-states may be reported by the terminal device to the network device in a capability reporting process.

In an optional embodiment, the terminal device may report, to the network device in a terminal capability reporting process, whether the terminal device supports the mechanism of transmitting the PDSCH by using the first TCI-state, that is, determines a default TCI-state for each CORESET group as a default TCI-state of a PDSCH scheduled by using a PDCCH corresponding to the CORESET group. When the terminal device supports the mechanism, the first TCI-state (namely, the default TCI-state) in this embodiment of this application is used to transmit the PDSCH. Otherwise, the method in this embodiment of this application is not used.

Optionally, the terminal device may send terminal capability information to the network device, and the terminal capability information may indicate whether it is supported that each CORESET group corresponds to one first TCI-state. In other words, when a receiving time interval between DCI and a PDSCH corresponding to the DCI is less than the preset threshold, one CORESET group corresponds to one TCI-state. When each CORESET group corresponds to one first TCI-state, when the receiving time interval between the DCI and the PDSCH corresponding to the DCI is less than the preset threshold, the network device may send the PDSCH by using the first TCI-state of the CORESET group corresponding to the DCI. Correspondingly, the terminal device may receive the PDSCH by using the first TCI-state of the CORESET group corresponding to the DCI.

Optionally, the terminal device may send the terminal capability information to the network device, and the terminal capability information may indicate whether it is supported that each group index value corresponds to one first TCI state. In other words, when the receiving time interval between the DCI and the PDSCH corresponding to the DCI is less than the preset threshold, one group index value corresponds to one TCI-state. When each group index value corresponds to one first TCI state, when the receiving time interval between the DCI and the PDSCH corresponding to the DCI is less than the preset threshold, the network device may send the PDSCH by using the first TCI-state corresponding to the group index value of the CORESET group corresponding to the DCI. Correspondingly, the terminal device may receive the PDSCH by using the first TCI-state corresponding to the group index value of the CORESET group corresponding to the DCI.

In the case 1, the receiving a downlink signal by using N transmission configuration indicator states (TCI-states) includes: receiving the downlink signal in a first time interval by using the first TCI-state, where the first time interval is a time interval including K consecutive symbols starting from the first symbol or the last symbol of the first PDCCH or the first symbol after the first PDCCH. In other words, the first time interval is a buffer time interval corresponding to the first TCI-state.

Similarly, for the second PDCCH, the downlink signal may be received in a second time interval by using the second TCI-state, where the second time interval is a time interval including K consecutive symbols starting from the first symbol or the last symbol of the second PDCCH or the first symbol after the first PDCCH. In other words, the second time interval is a buffer time interval corresponding to the second TCI-state. A method for determining the second TCI-state is the same as the method for determining the first TCI-state, and details are not described herein again.

Figure 8:
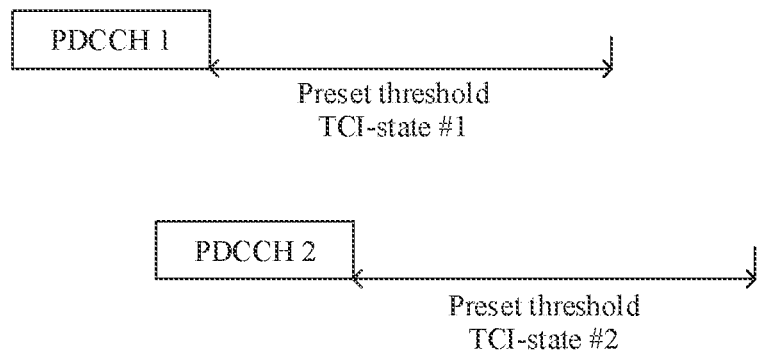
FIG. 8 is a schematic diagram of buffering a downlink signal by using two TCI-states according to an embodiment of this application.

FIG. 8 is a schematic diagram (corresponding to the case 1) of buffering a downlink signal by using two TCI-states according to an embodiment of this application. In FIG. 8, a time interval including K consecutive symbols starting from the first symbol after a PDCCH 1 is a first time interval. The terminal device may receive a buffered downlink signal in the first time interval by using a TCI-state #1, and the downlink signal may include a PDSCH 1 scheduled by using the PDCCH 1. A time interval including K consecutive symbols starting from the first symbol after a PDCCH 2 is a second time interval. The terminal device may receive a buffered downlink signal in the second time interval by using a TCI-state #2, and the downlink signal may include a PDSCH 2 scheduled by using the PDCCH 2.

In the case 2, the receiving a downlink signal by using N transmission configuration indicator states (TCI-states) includes: receiving the downlink signal in the first time interval by using the first TCI-state; and receiving the downlink signal in a second time interval by using a second TCI-state in the N TCI-states, where a transmission time of the first PDCCH is earlier than a transmission time of a second PDCCH, a time interval including K consecutive symbols starting from a first moment overlaps a time interval including K consecutive symbols starting from a second moment, the first time interval is a first half of a time interval including the first moment to a third moment, the second time interval is a second half of the time interval including the first moment to the third moment, the first moment is the first symbol or the last symbol of the first PDCCH or the first symbol after the first PDCCH, the second moment is the first symbol or the last symbol of the second PDCCH or the first symbol after the second PDCCH, and the third moment is a $K^{th}$ symbol after the second moment.

Because the terminal device cannot perform receiving by simultaneously using the two TCI-states, the terminal device may buffer a signal by using the two TCI-states at different time. In a possible implementation, the terminal device may equally divide all symbols corresponding to a union set of a buffered symbol range of the first TCI-state and a buffered symbol range of the second TCI-state into two halves (including a first half and a second half). The first half corresponds to the first TCI-state, and the second half corresponds to the second TCI-state. In other words, the terminal device may receive and buffer a downlink signal on a symbol in the first half by using the first TCI-state, and receive and buffer a signal on a symbol in the second half by using the second TCI-state. If a total quantity of symbols is an odd number, and the symbols cannot be equally divided, optionally, one or more symbols may be added to the symbols in the first half. For example, a quantity of symbols in the first half may be determined in a manner of dividing the total quantity of symbols by 2 and then rounding up a quotient, and a remaining symbol is used as the symbol in the second half. Optionally, one or more symbols may be subtracted from the symbols in the first half. For example, a quantity of symbols in the first half may be determined in a manner of dividing the total quantity of symbols by 2 and then rounding down a quotient, and a remaining symbol is used as the symbol in the second half.

Figure 9:
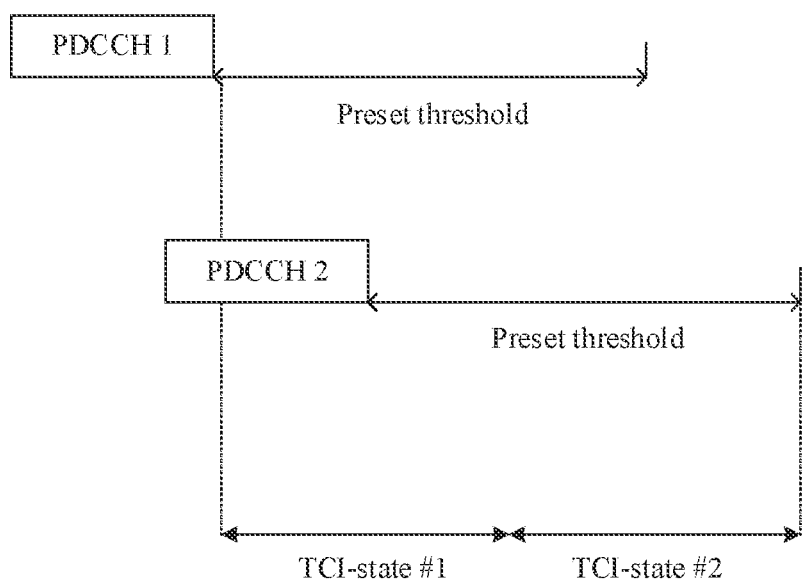
FIG. 9 is another schematic diagram of buffering a downlink signal by using two TCI-states according to an embodiment of this application.

FIG. 9 is another schematic diagram (corresponding to the case 2) of buffering a downlink signal by using two TCI-states according to an embodiment of this application. In FIG. 9, a union set of a buffer time interval of a PDCCH 1 and a buffer time interval of a PDCCH 2 is equally divided into two halves, and the first time interval is a first half. The terminal device may receive a buffered downlink signal in the first time interval by using a TCI-state #1, and the downlink signal may include a PDSCH 1 scheduled by using the PDCCH 1. The second time interval is a second half. The terminal device may receive a buffered downlink signal in the second time interval by using a TCI-state #2, and the downlink signal may include a PDSCH 2 scheduled by using the PDCCH 2.

In another possible implementation, the terminal device may equally divide overlapping symbols. Symbols in the first half belong to a former buffered symbol range, and symbols in the second half belong to a latter buffered symbol range.

Optionally, if a time interval that is of a TCI-state and that is determined by using the foregoing method crosses a plurality of slots, symbols in a first slot may be used, or symbols in a last slot may be used, or symbols in a slot with a largest quantity of symbols may be used. This is not limited in this embodiment of this application. For example, a first time interval that is of a first TCI-state and that is determined by using the foregoing method crosses two slots and occupies symbols {11, 12, 13, 0, 1, 2, 3, 4, 5, 6}. {11, 12, 13} are three symbols in a former slot, and {0, 1, 2, 3, 4, 5, 6} are seven symbols in a latter slot. When the terminal device buffers downlink data by using the first TCI-state, if the terminal device uses the symbols in the first slot, the symbols {11, 12, 13} may be used. If the terminal device uses the symbols in the last slot, the symbols {0, 1, 2, 3, 4, 5, 6} may be used. If the terminal device uses the symbols in the slot with the largest quantity of symbols, the symbols {0, 1, 2, 3, 4, 5, 6} may be used.

In an optional embodiment, the method further includes: If the time interval is greater than or equal to the preset threshold, it indicates that there is no PDSCH in the buffered downlink signal, and the terminal device may discard the buffered downlink signal, determine a third TCI-state, and receive the first PDSCH by using the third TCI-state. Specifically, when the first PDCCH carries information about the TCI-state, the third TCI-state is determined based on the first PDCCH. When the first PDCCH does not carry the information about the TCI-state, the third TCI-state may be a default TCI-state, or the terminal device determines the third TCI-state in another manner, for example, determines the TCI-state corresponding to the first PDCCH as the third TCI-state.

Descriptions are provided below in two cases.

Case 1: A type of DCI carried in the first PDCCH is a DCI format 1_1, and a parameter tci-PresentInDci in a CORESET corresponding to the first PDCCH is configured as "enabled". In this case, the terminal device may use a TCI-state indicated in the DCI as the TCI-state of the first PDSCH.

Case 2: The type of the DCI carried in the first PDCCH is a DCI format 1_0, or the parameter tci-PresentInDci is not configured in the CORESET corresponding to the first PDCCH. In this case, there is no TCI field in the DCI, and the information about the TCI-state cannot be indicated. The terminal device may use the TCI-state of the first PDCCH as the TCI-state of the first PDSCH.

After determining, in the foregoing manner, the two TCI-states used to transmit the two PDSCHs, the terminal device may receive the two PDSCHs based on the two TCI-states. Specifically, the terminal device may determine information about a transmit beam based on a reference signal included in the two TCI-states, to determine a corresponding receive beam, and receive, by using the receive beam, the two PDSCHs sent on two transmit beams.

According to the data transmission method in this embodiment of this application, the terminal device can determine, in a plurality of manners, a TCI-state used by the network device for data transmission, so that the terminal device determines a receive beam based on the TCI-state, and receives data sent by the network device, thereby improving data transmission efficiency.

Figure 10:
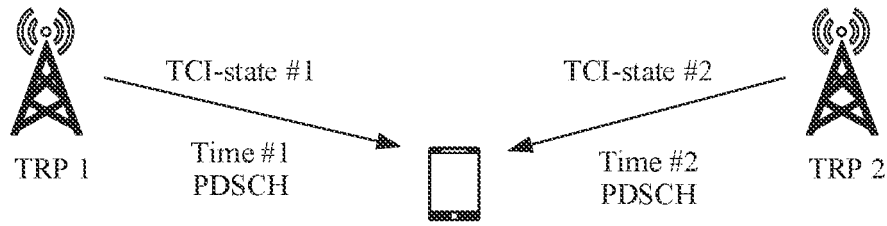
FIG. 10 is a schematic diagram of another data transmission scenario according to an embodiment of this application.

FIG. 10 is a schematic diagram of another data transmission scenario according to an embodiment of this application. The data transmission scenario is based on a multi-TRP transmission scenario. The network device repeatedly sends a same PDSCH to the terminal device at different time through a plurality of TRPs. In other words, all the TRPs send the same PDSCH. This transmission manner can improve reliability of data transmission. Each TRP sends the PDSCH by using one TCI-state. Therefore, the terminal device can correctly receive the PDSCH only after determining a plurality of TCI-states. The network device may send the PDCCH to the terminal device through a single TRP (by using a single TCI-state), or may send the PDCCH through a plurality of TRPs (by using a plurality of TCI-states). This is not limited in this embodiment of this application. For ease of description, FIG. 10 shows two TRPs (in other words, the terminal device may determine two TCI-states). Specifically, a TRP 1 sends, to the terminal device, a PDCCH used to schedule a PDSCH of the TRP 1 and a PDSCH of a TRP 2, the TRP 1 sends a PDSCH to the terminal device in a first time period (Time #1) by using a TCI-state #1, and the TRP 2 sends the PDSCH to the terminal device in a second time period (Time #2) by using a TCI-state #2. The first time period is different from the second time period. In this way, the terminal device can correctly receive a PDSCH 1 that is transmitted twice only after determining the TCI-state #1 and the TCI-state #2.

A scenario shown in FIG. 10 is similar to that in FIG. 3, and a difference lies in that a time period in which each TRP sends a PDSCH is not limited in the scenario in FIG. 3, but that each TRP sends a same PDSCH in different time periods is limited in the scenario in FIG. 10.

The data transmission method in the scenario shown in FIG. 10 may include the following steps.

Step 1: The network device sends a PDCCH to the terminal device, where the PDCCH carries one piece of DCI. The DCI carries all TCI-states corresponding to a plurality of times of transmission of the PDSCH. Alternatively, the network device may send a plurality of PDCCHs to the terminal device, where the plurality of PDCCHs all carry same DCI. The DCI carries all TCI-states corresponding to a plurality of times of transmission of the PDSCH. Correspondingly, the terminal device receives and processes the PDCCH.

Step 2: Buffer data. To avoid missing a PDSCH whose scheduling time interval is less than a preset threshold, the terminal device receives a signal by using a default TCI-state and buffers the signal until receiving and processing of the PDCCH are completed. Because the network device sends the PDSCH by using a plurality of TCI-states, a plurality of default TCI-states may be determined. To be specific, when the time interval between the PDCCH and the PDSCH scheduled by using the PDCCH is less than the preset threshold, the terminal device may determine the plurality of TCI-states. A specific determining method is the same as the method 400. Details are not described herein again.

It should be noted that, in this embodiment of this application, because there are a plurality of PDSCHs (even a plurality of PDCCHs), the time interval in the condition "when the time interval between the PDCCH and the PDSCH scheduled by using the PDCCH is less than the preset threshold" may be expressed as any one of the following manners:

(1) a time interval between the PDCCH and the first PDSCH;

(2) a time offset between the first symbol or the last symbol of the PDCCH or the first symbol after the PDCCH and the first symbol of the first PDSCH:

(3) a time interval between the PDCCH and the last PDSCH; and (4) a time offset between the first symbol or the last symbol of the PDCCH or the first symbol after the PDCCH and the last symbol of the first PDSCH.

It should be understood that the first PDSCH is a PDSCH that is first sent in terms of time, and the last PDSCH is a PDSCH that is last sent in terms of time.

In addition, if there are a plurality of PDCCHs, the PDCCH in the foregoing description may be specifically any one of the plurality of PDCCHs, for example, the first PDCCH or the last PDCCH. Similarly, the first PDSCH is a PDSCH that is first sent in terms of time, and the last PDSCH is a PDSCH that is last sent in terms of time.

Step 3: Receive and process the data. After completing receiving and processing of the PDCCH, the terminal device may determine information about the PDSCH, for example, a scheduling time interval, a time-frequency resource used for transmission, and a TCI-state. If finding, based on scheduling information in the PDCCH, that the scheduling time interval of the scheduled PDSCH is less than the preset threshold, the terminal device may obtain, based on information that is about the time-frequency resource of the PDSCH and that is carried in the PDCCH, the PDSCH from a downlink signal buffered in the previous step. If the scheduling time interval of the PDSCH scheduled by using the PDCCH is not less than the preset threshold, it indicates that there is no PDSCH in the buffered downlink signal. Therefore, the terminal device may discard the buffered signal, and determine two TCI-states of the PDSCH based on the PDCCH, to receive the PDSCH.

Descriptions are provided below in two cases.

Case 1: A type of DCI carried in the PDCCH is a DCI format 1_1, and a parameter tci-PresentInDci in a CORESET corresponding to the PDCCH is configured as "enabled". In this case, the terminal device may use two TCI-states indicated in the DCI as the two TCI-states of the PDSCH.

In this embodiment of this application, in addition to determining the two TCI-states, the terminal device may further determine a quantity M of times of repeated transmission of the PDSCH. In a possible implementation, the network device may limit that all times of transmission of the PDSCH are performed in a same slot. In this case, the quantity M of times of transmission of the PDSCH may be determined based on a quantity of downlink symbols that can be used for PDSCH transmission in the slot. For example, in the slot, there are X downlink symbols that can be used for PDSCH transmission. Y downlink symbols are used for each PDSCH transmission, and the quantity of times of repeated transmission of the PDSCH is $M=\lfloor X/Y \rfloor$, that is, X is divided by Y, and a quotient is rounded down. The downlink symbols that can be used for PDSCH transmission in the slot may be specifically all downlink symbols corresponding to the first symbol of the first PDSCH to the last symbol in the slot. It should be understood that, if a specific symbol interval is required between PDSCHs, a quantity of symbols corresponding to these interval symbols may be further removed.

Further, the network device may limit the quantity of times of repeated transmission of the PDSCH to an integer multiple of 2. For example, it is assumed that $S=\lfloor X/Y \rfloor$ is the quantity that is of times of transmission of the PDSCH and that can be supported by the terminal device. $P=\lfloor S/2 \rfloor$ is calculated, that is, it is obtained through calculation that the quantity that is of times of transmission of the PDSCH and that can be supported is P times of 2, and then $M=2\times P$ is obtained. For example, if S=7, P=3 may be obtained. Therefore, M=6.

Optionally, a threshold may be used to limit the quantity M. When a calculated value of M is greater than the threshold, the threshold is also used. When the calculated value of M is less than the threshold, the calculated value may be used.

Optionally, a threshold may be used to limit the quantity P. When a calculated value of P is greater than the threshold, the threshold is also used. When the calculated value of P is less than the threshold, the calculated value may be used.

It should be understood that the rounding down operation may also be replaced with a rounding up or rounding off operation. This is not limited in this embodiment of this application.

Case 2: The type of the DCI carried in the PDCCH is a DCI format 1_0, or the parameter tci-PresentInDci is not configured in the CORESET corresponding to the first PDCCH. In this case, there is no TCI field in the DCI, and information about the TCI-state cannot be indicated. The terminal device may determine two TCI-states. A specific determining method is the same as the method 400, and details are not described herein again.

After determining the two TCI-states used for PDSCH transmission, the terminal device may receive the PDSCH based on the two TCI-states. Specifically, the terminal device determines information about a transmit beam based on a reference signal included in the two TCI-states, to determine a corresponding receive beam, and receive the PDSCH sent on two transmit beams.

According to the data transmission method in this embodiment of this application, the network device sends the same PDSCH to the terminal device in different time periods, and the terminal device can determine, in a plurality of manners, a plurality of TCI-states used by the network device for data transmission, so that the terminal device determines a receive beam based on the plurality of TCI-states, and receives data sent by the network device. This not only improves data transmission efficiency, but also improves data transmission reliability.

An embodiment of this application further provides a data transmission method, including the following three steps.

Step 1: A network device sends downlink control information (DCI), where the DCI is used to schedule a PDSCH. Correspondingly, a terminal device receives the DCI.

Step 2: The network device sends the PDSCH in a first cell by using a first TCI-state. Correspondingly, the terminal device receives the PDSCH based on the first TCI-state.

Optionally, the first TCI-state may also be represented as a first QCL assumption, and is used to represent a parameter related to PDSCH transmission, such as time-frequency offset information or receive beam information. For example, the first TCI-state may include QCL-info whose type is typeA/typeB/typeC, and the QCL-info is used to indicate time-frequency offset information for PDSCH transmission. Specifically, the QCL-info includes a reference signal resource, indicating that a time-frequency offset for PDSCH transmission is the same as the reference signal resource. For another example, the first TCI-state may include QCL-info whose type is typeD (which may also be referred to as that the first TCI-state includes quasi-co-location (QCL)-TypeD information), and the QCL-info is used to indicate receive beam information for PDSCH transmission. Specifically, the QCL-info includes a reference signal resource, indicating that a receive beam for PDSCH transmission is the same as the reference signal resource.

It should be understood that the first cell may be a primary cell (Pcell), a primary cell (primary secondary cell, Pscell) in a secondary cell group, a secondary cell (Scell), a PUCCH-Scell (a secondary cell for which a PUCCH is configured) in a master cell group (MCG), a PUCCH-Scell in a secondary cell group (SCG), or an Scell other than a PUCCH-Scell in an SCG. This is not limited in this embodiment of this application.

In step 1, the terminal device may determine the first TCI-state by using a plurality of different methods. The following first describes a method that may be used by the terminal device.

Method 1: The terminal device may determine the first TCI-state based on the DCI for scheduling the PDSCH. In other words, the DCI for scheduling the PDSCH includes a TCI field, and the terminal device may determine the first TCI-state based on the TCI field in the DCI.

In an optional embodiment, the TCI-state indicated in the DCI is activated by using signaling (for example, MAC CE signaling). For example, a plurality of groups of TCI-states (also referred to as a plurality of TCI-state groups) may be activated by using the MAC CE signaling, each TCI-state group may include one or two TCI-states, and each TCI-state group is associated with one TCI field value of the TCI field in the DCI. For example, the TCI field values 0 to 7 are respectively associated with TCI-state groups: {1, 2}, {3, 4}, {5, 6}, {7, 8}, {1}, {2}, {3}, and {4}.

Method 2: The terminal device may use the TCI-state of the DCI for scheduling the PDSCH as the first TCI-state.

In other words, a TCI-state used by the DCI for scheduling the PDSCH is the same as a TCI-state used for PDSCH transmission. In other words, the PDSCH and a PDCCH corresponding to the PDSCH satisfy a QCL relationship, and the QCL relationship may be specifically a QCL relationship of a type typeA/typeB/typeC/typeD.

Method 3: The terminal device may use a TCI-state of a CORESET in a CORESET group of the DCI for scheduling the PDSCH as the first TCI-state, for example, a currently active TCI-state in the CORESET.

A CORESET that is specifically used may be a CORESET with a smallest or largest index in the CORESET group, or may be a CORESET with a smallest or largest index in one or more CORESETs that are latest monitored (for example, monitored in a latest slot) by the terminal device. The one or more CORESETs are CORESETs in the CORESET group. A CORESET group corresponding to the DCI is a CORESET group including CORESETs that have a same first index (for example, CORESETPoolIndex) value as a CORESET corresponding to the DCI. The first index is used to group configured CORESETs, and a value of the first index may be 0 or 1. The configured CORESETs may be divided into two groups, and CORESETs having a same first index value are used as one group. It should be understood that, if the first index values of all the CORESETs are the same (for example, all the first index values are configured as 0 or 1), or none of the first index values of all the CORESETs is configured, there is only one CORESET group in total.

Method 4: The terminal device may determine the first TCI-state by using a first resource of a second cell, that is, use the first resource as a QCL resource in the first TCI-state.

The QCL resource is a reference resource used for QCL indication. The QCL resource may be specifically a QCL resource of a type typeA/typeB/typeC/typeD, that is, a reference signal resource included in QCL-info of the type typeA/typeB/typeC/typeD.

Optionally, when the QCL resource in the first TCI-state is determined by using the first resource, it may be limited that only resources of a same QCL type are used. For example, if the first resource is a QCL resource of the type typeA in a TCI-state, the first resource can be used only as a resource of the type typeA in the first TCI-state. Similarly, if the first resource is a QCL resource of the type typeB/typeC/typeD in a TCI-state, the first resource can be used only as a resource of the type typeB/typeC/typeD in the first TCI-state.

Optionally, when the QCL resource in the first TCI-state is determined by using the first resource, it may not be limited that only resources of a same QCL type are used. For example, if the first resource is a QCL resource of the type typeA in a TCI-state, the first resource not only may be used as a resource of the type typeA in the first TCI-state, but also may be used as a resource of the type typeD in the first TCI-state. For another example, when a QCL resource in another TCI-state is used as the first resource to determine a QCL resource in the first TCI-state, if there is no QCL resource of the type typeD in the TCI-state, a QCL resource of the type typeA may be used as the QCL resource of the type typeD in the first TCI-state. It should be understood that, in the foregoing example, although only the types typeA and typeD are described, the foregoing method is also applicable to other types. To be specific, typeA in the foregoing example may be replaced with typeB, typeC, or typeD, and typeD in the foregoing example may be replaced with typeA, typeB, or typeC. This is not limited in this embodiment of this application.

In this method, the second cell may be the first cell, a scheduling cell of the first cell, a Pcell or a Pscell corresponding to the first cell, a primary cell (Pcell) in an MCG corresponding to the first cell, a primary cell PScell in an SCG corresponding to the first cell, a PUCCH-scell in an MCG corresponding to the first cell, or a PUCCH-scell in an SCG corresponding to the first cell. It should be understood that the network device may configure a cell group (cell group) for the terminal device, and each cell group includes one Pcell (or a Pscell) and a plurality of Scells. For one Scell, a Pcell corresponding to the Scell is a Pcell that belongs to a same cell group as the Scell.

Optionally, the terminal device may further determine, based on a condition, which cell the second cell is. For example, if a CORESET is configured for the first cell, and/or the first cell activates a TCI-state of the PDSCH, the terminal device may determine the first cell as the second cell. If no CORESET is configured for the first cell (for example, no CORESET is configured for a currently active BWP of the first cell), and/or no TCI-state of the PDSCH is activated for the first cell (for example, no TCI-state of the PDSCH is activated for a currently active BWP of the first cell), the terminal device may determine one of cells other than the first cell as the second cell.

For ease of understanding, the following first explains and describes the first resource. The first resource may be an SSB, for example, an SSB used during initial access. Alternatively, the first resource may be a QCL resource of a CORESET with a smallest or largest index in at least one CORESET that is configured in the second cell/that is monitored in a latest slot, or may be a QCL resource of a CORESET with a smallest or largest index in at least one CORESET that is configured in an active (active) BWP of the second cell/that is monitored in a latest slot. The QCL resource of the CORESET is a QCL resource in a currently active TCI-state of the CORESET. Alternatively, the first resource may be a QCL resource of a CORESET with a smallest or largest index in a group of CORESETs that are configured in the second cell/that are monitored in a latest slot and that correspond to the PDSCH, or may be a QCL resource of a CORESET with a smallest or largest index in a group of CORESETs that are configured in an active BWP of the second cell/that are monitored in a latest slot and that correspond to the PDSCH. Alternatively, the first resource may be a QCL resource of one TCI-state/a plurality of (for example, two) TCI-states with a smallest/largest index in configured/currently active PDSCH TCI-states in an active BWP of the second cell, or a QCL resource of one TCI-state/a plurality of (for example, two) TCI-states corresponding to a smallest/largest TCI field value in configured/currently active PDSCH TCI-states in an active BWP of the second cell. Alternatively, the first resource may be a QCL resource of a TCI-state corresponding to one TCI-state/a plurality of (for example, two) smallest/largest TCI field values in TCI field values corresponding to a single TCI-state in an active BWP of the second cell. Alternatively, the first resource may be a QCL resource of a plurality of TCI-states corresponding to a smallest/largest TCI field value in TCI field values corresponding to a plurality of (for example, two) TCI-states. If each TCI field value corresponds to a single TCI-state, only a QCL resource of the single TCI-state, for example, a QCL resource determined in any one of the foregoing several methods, is used.

Optionally, when specific conditions are met, the terminal device may determine the first TCI-state by using the foregoing method. The following describes in detail the conditions that are met.

Condition 1: PDSCH transmission of the first cell is scheduled by the second cell (which may also be replaced with that the first cell is an Scell), and no TCI-state used for PDSCH transmission is activated in the first cell.

Optionally, the condition 1 may further be a further combination of the foregoing condition and one or more of the following conditions. The combination may be a union set of conditions, for example, a condition a and a condition b, or may be an intersection set of conditions, for example, a condition a or a condition b.

1. A subcarrier spacing used by the first cell is the same as a subcarrier spacing used by the second cell.
2. A subcarrier spacing used by the first cell is different from a subcarrier spacing used by the second cell.
3. The network device configures no CORESET group for the terminal device in the second cell.
4. The network device configures one CORESET group for the terminal device in the second cell.
5. Transmission is performed in the second cell by using a frequency in an FR 2 (which may also be replaced with that a TCI-state including QCL-info of a type typeD is configured in the second cell).
6. Transmission is performed in a cell by using a frequency in an FR 1 (which may also be replaced with that no TCI-state including QCL-info of a type typeD is configured in the second cell).

When the condition 1 (for example, PDSCH transmission of the first cell is scheduled by the second cell (which may also be replaced with that the first cell is an Scell) is met, no TCI-state used for PDSCH transmission is activated in the first cell, and the subcarrier spacing used by the first cell is different from the subcarrier spacing used by the second cell), the PDSCH transmission meets one or more of the following constraints.

1. A time interval between the PDSCH and the PDCCH corresponding to the PDSCH (for example, a time interval between the last symbol of the PDCCH and the first symbol of the PDSCH) is greater than or equal to a preset threshold timeDurationForQCL. The preset threshold timeDurationForQCL indicates a time required by the terminal device to receive and process the PDCCH and prepare a receive beam of the PDSCH (in other words, it may take a specific time to switch to the receive beam of the PDSCH). It should be understood that a name of the preset threshold is not limited to timeDurationForQCL in this embodiment of this application.
2. The PDCCH includes a TCI field (for example, the type of the DCI carried in the PDCCH is a DCI format 1-1 and an RRC parameter tci-PresentInDCI is configured as "enabled"), or the PDCCH indicates QCL information of the PDSCH (for example, QCL information of typeD).

When the condition 1 is met, the terminal device determines the first TCI-state by using one of the method 1 to the method 4.

In another implementation, when the condition 1 is met, it is limited that data transmission cannot be performed. To be specific, it may be specified in a protocol that in a case corresponding to the condition 1, the network device cannot send data to the terminal device, and the terminal device does not receive data from the network device. For example, it is specified in a protocol that, when the first cell or PDSCH transmission of the first cell is scheduled by the second cell, no TCI-state used for PDSCH transmission is activated in the first cell, and the subcarrier spacing used by the first cell is different from the subcarrier spacing used by the second cell, the network device does not transmit data to the terminal device. In other words, for an Scell or a cell scheduled by another cell, if a subcarrier spacing used by the cell is different from a subcarrier spacing of a cell scheduled by the cell, the terminal device does not receive data from the cell before a TCI-state of a PDSCH of the cell is activated, and the terminal device does not receive data from the cell until the TCI-state of the PDSCH of the cell is activated.

Condition 2: PDSCH transmission of the first cell is scheduled by the second cell (which may also be replaced with that the first cell is an Scell), and transmission is performed in the second cell by using a frequency in an FR 2 (which may also be replaced with that a TCI-state including QCL-info of a type typeD is configured in the second cell).

Optionally, the condition 2 may further be a further combination of the foregoing condition and one or more of the following conditions. The combination may be a union set of conditions, for example, a condition a and a condition b, or may be an intersection set of conditions, for example, a condition a or a condition b.
1. A subcarrier spacing used by the first cell is the same as a subcarrier spacing used by the second cell.
2. A subcarrier spacing used by the first cell is different from a subcarrier spacing used by the second cell.
3. A time interval between the DCI for scheduling the PDSCH and the PDSCH is less than a preset threshold timeDurationForQCL. The preset threshold timeDurationForQCL indicates a time required by the terminal device to receive and process the PDCCH and prepare a receive beam of the PDSCH (in other words, it may take a specific time to switch to the receive beam of the PDSCH). It should be understood that a name of the preset threshold is not limited to timeDurationForQCL in this embodiment of this application.
4. A time interval between the DCI for scheduling the PDSCH and the PDSCH is greater than or equal to a preset threshold timeDurationForQCL.
5. The DCI for scheduling the PDSCH includes a TCI field (for example, a type of the DCI is a DCI format 1-1, and an RRC parameter tci-PresentInDCI is configured as "enabled").
6. The DCI for scheduling the PDSCH does not include a TCI field (for example, a type of the DCI is a DC format 1-0, or no RRC parameter tci-PresentInDCI is configured).
7. The network device configures no CORESET for the terminal device in the second cell.
8. The network device configures one CORESET for the terminal device in the second cell.
9. No TCI-state used for PDSCH transmission is activated in the second cell.
10. A TCI-state used for PDSCH transmission is activated in the second cell.

When the condition 2 is met, the terminal device determines the first TCI-state by using one of the method 1 to the method 4 according to a situation.

For example, when the condition 2 (PDSCH transmission of the first cell is scheduled by the second cell (which may also be replaced with that the first cell is an Scell), and transmission is performed in the second cell by using a frequency in an FR 2 (which may also be replaced with that a TCI-state including QCL-info of a type typeD is configured in the second cell), the time interval between the DCI for scheduling the PDSCH and the PDSCH is less than the preset threshold timeDurationForQCL, and the network device configures no CORESET for the terminal device in the second cell/or no TCI-state used for PDSCH transmission is activated in the second cell) is met, the method 4 (for example, the TCI-state of the CORESET with the smallest index in the one or more CORESETs that are configured by the terminal device in the active BWP of the second cell/that are latest monitored is used as the first TCI-state) is used.

For another example, when the condition 2 (PDSCH transmission of the first cell is scheduled by the second cell (which may also be replaced with that the first cell is an Scell), and transmission is performed in the second cell by using a frequency in an FR 2 (which may also be replaced with that a TCI-state including QCL-info of a type typeD is configured in the second cell), the DCI for scheduling the PDSCH does not include a TCI field, and the time interval between the DCI for scheduling the PDSCH and the PDSCH is greater than or equal to the preset threshold timeDurationForQCL) is met, the method 2 (for example, the TCI-state of the PDCCH for scheduling the PDSCH is used as the first TCI-state) is used.

Condition 3: PDSCH transmission of the first cell is scheduled by the second cell (which may also be replaced with that the first cell is an Scell), and transmission is performed in the second cell by using a frequency in an FR 1 (which may also be replaced with that no TCI-state including QCL-info of a type typeD is configured in the second cell).

Optionally, the condition 3 may further be a further combination of the foregoing condition and one or more of the following conditions. The combination may be a union set of conditions, for example, a condition a and a condition b, or may be an intersection set of conditions, for example, a condition a or a condition b.
1. A subcarrier spacing used by the first cell is the same as a subcarrier spacing used by the second cell.
2. A subcarrier spacing used by the first cell is different from a subcarrier spacing used by the second cell.
3. The network device configures no CORESET for the terminal device in the second cell.
4. The network device configures one CORESET for the terminal device in the second cell.
5. No TCI-state used for PDSCH transmission is activated in the second cell.
6. ATCI-state used for PDSCH transmission is activated in the second cell.

When the condition 3 (for example, PDSCH transmission of the first cell is scheduled by the second cell (which may also be replaced with that the first cell is an Scell), transmission is performed in the second cell by using a frequency in an FR 1 (which may also be replaced with that no TCI-state including QCL-info of a type typeD is configured in the second cell), and the network device does not configure a CORESET for the terminal device in the second cell and/or no TCI-state used for PDSCH transmission is activated in the second cell) is met, the PDSCH transmission meets one or more of the following constraints.

1. A time interval between the PDSCH and the PDCCH corresponding to the PDSCH (for example, a time interval between the last symbol of the PDCCH and the first symbol of the PDSCH) is greater than or equal to a preset threshold timeDurationForQCL. The preset threshold timeDurationForQCL indicates a time required by the terminal device to receive and process the PDCCH and prepare a receive beam of the PDSCH (in other words, it may take a specific time to switch to the receive beam of the PDSCH). It should be understood that a name of the preset threshold is not limited to timeDurationForQCL in this embodiment of this application.

2. The PDCCH includes a TCI field (for example, the type of the DCI carried in the PDCCH is a DCI format 1-1 and an RRC parameter tci-PresentInDCI is configured as "enabled"), or the PDCCH indicates QCL information of the PDSCH (for example, QCL information of typeD).

When the condition 3 is met, the terminal device determines the first TCI-state by using one of the method 1 to the method 4.

In another implementation, when the condition 3 is met, it is limited that data transmission cannot be performed. To be specific, it may be specified in a protocol that in a case corresponding to the condition 3, the network device cannot send data to the terminal device, and the terminal device does not receive data from the network device. For example, it is specified in a protocol that, when the first cell or PDSCH transmission of the first cell is scheduled by the second cell, and transmission is performed in the second cell by using a frequency in an FR 1 (which may also be replaced with that no TCI-state including QCL-info of a type typeD is configured in the second cell), and no TCI-state used for PDSCH transmission is activated in the second cell, the network device does not transmit data to the terminal device. In other words, for an Scell or a cell scheduled by another cell, if a cell scheduled by transmission is performed in the cell by using a frequency in an FR 1 (which may also be replaced with that no TCI-state including QCL-info of a type typeD is configured in the cell scheduled by the cell), the terminal device does not receive data from the cell before a TCI-state of a PDSCH of the cell is activated, and the terminal device does not receive data from the cell until the TCI-state of the PDSCH of the cell is activated.

Optionally, the foregoing method may also be extended to determining of the TCI-state of the PDCCH. In other words, the PDSCH in the foregoing method may be replaced with the PDCCH to determine the TCI-state for PDCCH transmission. For example, if the first cell is an Scell, and a PDCCH TCI-state of the first cell is not activated, the terminal device may determine the first TCI-state by using various methods corresponding to the method 1 to the method 3.

It should be understood that the PDCCH may not be transmitted in the foregoing case. For example, it is specified in a protocol that when the first cell is an Scell, and no TCI-state used for PDCCH transmission is activated in the first cell, the network device does not transmit the PDCCH. In other words, for an Scell, the terminal device does not receive the PDCCH from the cell before a TCI-state of a PDCCH of the cell is activated, and the terminal device does not receive data from the cell until the TCI-state of the PDCCH of the cell is activated.

According to the method in this embodiment of this application, the terminal device can determine, in a plurality of manners, the TCI-state used by the network device for data transmission, to receive the PDSCH. This not only improves data transmission efficiency, but also improves data transmission reliability.

An embodiment of this application further provides a data transmission method, and also provides a MAC CE format used to activate a plurality of TCI-states. The method includes the following steps.

Step 1: A network device determines and sends first signaling, and correspondingly, a terminal device receives the first signaling, where the first signaling is used to activate a plurality of transmission configuration indicator state (TCI-state) groups, and each of the plurality of TCI-state groups includes one or two TCI-states.

Step 2: The terminal device determines, based on configuration information of a CORESET or indication information in the first signaling, a manner of mapping each TCI-state to a TCI field value. Each TCI-state herein is the TCI-state included in the TCI-state group indicated by the first signaling.

In this embodiment of this application, a network device may simultaneously activate, by using the first signaling, TCI-states used for transmission performed by two TRPs, to enable transmission of a plurality of TRPs. In a possible implementation, the first signaling may be MAC CE signaling.

In an optional embodiment, the mapping manner includes a first mapping manner, and in the first mapping manner, in the plurality of TCI-state groups, a $j^{th}$ TCI-state in a TCI-state group i indicates a $j^{th}$ TCI-state corresponding to a TCI field value i, where i is an integer greater than or equal to 0, and j is a positive integer. Therefore, in the first mapping manner, one TCI field value corresponds to one or two TCI-states.

In an optional embodiment, the mapping manner includes a second mapping manner, and in the second mapping manner, in the plurality of TCI-state groups, the $j^{th}$ TCI-state in the TCI-state group i indicates a TCI-state corresponding to the TCI field value i in a PDCCH corresponding to a CORESET whose group index value is j−1, where i is an integer greater than or equal to 0, and j is a positive integer. Therefore, in the second mapping manner, one TCI field value corresponds to one TCI-state.

It should be understood that the first signaling indicates a plurality of TCI-state groups, i represents an index of the plurality of TCI-state groups and starts from 0, and a largest value of i is a quantity of the plurality of TCI-state groups. j represents an index of a TCI-state in each TCI-state group and starts from 1, and j=1 or 2. For example, in the first signaling, the TCI-state j of the TCI-state group i may be specifically indicated by using a TC-state $ID_{i,j}$. For example, a TCI-state $ID_{0,1}$ is used to indicate the first TCI-state in a TCI-state group 0. A TCI-state $ID_{0,2}$ is used to indicate the second TCI-state in the TCI-state group 0. In this application, the TCI-state group i may also be referred to as an $(i+1)^{th}$ TCI-state group.

In an optional embodiment, the method further includes. The terminal device sends a terminal capability parameter, and correspondingly, the network device receives the terminal capability parameter, where the terminal capability parameter includes one or more of the following:

a first capability parameter, used to indicate an upper limit of a quantity of different TCI states corresponding to a CORESET associated with one group index value when a configured CORESET is associated with two different group index values;

a second capability parameter, used to indicate an upper limit of a quantity of different TCI states corresponding to a configured CORESET when the configured CORESET is associated with two different group index values;

a third capability parameter, used to indicate an upper limit of a quantity of different TCI states corresponding to a configured CORESET when the configured CORESET is associated with a same group index value;

a fourth capability parameter, used to indicate an upper limit of a quantity of different TCI states in TCI states indicated by the first signaling;

a fifth capability parameter, used to indicate an upper limit of a quantity of different TCI states in TCI states indicated by the first signaling when a configured CORESET is associated with two different group index values;

a sixth capability parameter, used to indicate an upper limit of a quantity of different TCI states in TCI states indicated by the first signaling when a configured CORESET is associated with a same group index value;

a seventh capability parameter, used to indicate an upper limit of a quantity of different TCI states in TCI states indicated by the first signaling when the first mapping manner is used; or an eighth capability parameter, used to indicate an upper limit of a quantity of different TCI states in TCI states indicated by the first signaling when the second mapping manner is used.

In this embodiment of this application, the different capability parameters reflect terminal capabilities at different granularities. A terminal device may flexibly report all or some of the capability parameters based on an actual situation, so that a TCI state activated by the network device for the terminal device by using the first signaling meets a capability of the terminal device, thereby improving subsequent data transmission efficiency.

For example, it is assumed that five CORESETs (whose indexes are 0 to 4 respectively) are configured. If a group index value associated with a CORESET 0, a CORESET 1, and a CORESET 3 is 1, the CORESET 0, the CORESET 1, and the CORESET 3 form a CORESET group 1. If a group index associated with a CORESET 2 and a CORESET 4 is 2, the CORESET 2 and the CORESET 4 form a CORESET group 2. Therefore, the first capability parameter may be an upper limit of a quantity of different TCI states corresponding to the CORESETs in the CORESET group 1 or an upper limit of a quantity of different TCI states corresponding to the CORESETs in the CORESET group 2. The second capability parameter may be an upper limit of a quantity of different TCI states corresponding to the five CORESETs (the CORESET group 1 and the CORESET group 2). For example, it is assumed that five CORESETs (whose indexes are 0 to 4) are configured, and the five CORESETs are associated with a same group index value. The third capability parameter may be an upper limit of a quantity of different TCI states corresponding to the five CORESETs. Subsequent parameters are similar, and are not listed one by one. It should be understood that the fifth capability parameter is the same as the eighth capability parameter, and the sixth capability parameter is the same as the seventh capability parameter.

In this embodiment of this application, that one TCI-state group may include one or two TCI-states is merely used as an example for description. However, it should be understood that one TCI-state group may alternatively include a plurality of TCI-states. This is not limited in this embodiment of this application. This embodiment of this application is described in detail below with reference to FIG. 13.

FIG. 13 is a schematic diagram of a format of MAC CE signaling used to activate a TCI-state. The MAC CE signaling may be used to activate the TCI-state in the following two cases.

Case 1: Data sent by two TRPs is scheduled by using one piece of DCI, and the DCI may be sent by using one of the TRPs. For example, data sent by both a TRP 1 and a TRP 2 is scheduled by using one piece of DCI, and the DCI may be sent by the TRP 1 or may be sent by the TRP 2. A TCI-state field in the DCI indicates two TCI-states. Each field value of the TCI field in the DCI may be associated with one or two TCI-states. When the field value of the TCI field is associated with two TCI-states, the field value may indicate the two TCI-states.

Case 2: The data sent by the two TRPs is scheduled by using respective DCI of the two TRPs. For example, the TRP 1 and the TRP 2 each send one piece of DCI, to respectively schedule data sent by the TRP 1 and the TRP 2. Each field value of a TCI field in the two pieces of DCI is associated with one TCI-state, used to indicate the TCI-state.

In the case 1, the MAC CE signaling may be used to activate a plurality of TCI-state groups, each TCI-state group includes one or two TCI-states, and each TCI-state group may correspond to one TCI field value.

An R field is a reserved field and currently has no usage. A serving cell (serving cell) ID occupies five bits, and is used to indicate an ID of a cell, namely, a cell whose TCI-state is activated by using the MAC CE signaling. A BWP ID occupies two bits, and is used to indicate an ID of a BWP, namely, a BWP whose TCI-state is activated by using the MAC CE signaling. A TCI-state $ID_{i,1}$ indicates the first TCI-state in the $(i+1)^{th}$ TCI-state group (that is, the TCI-state group i). A TCI-state $ID_{i,2}$ indicates the second TCI-state in the $(i+1)^{th}$ TCI-state group. The two TCI-states form a group and are associated with the TCI field value i. $i \in \{0, 1, \ldots, N\}$. In other words, a TCI-state $ID_{i,j}$ indicates a $j^{th}$ TCI-state corresponding to the TCI field value i. For example, a TCI-state $ID_{i,1}$ indicates the first TCI-state corresponding to the TCI field value i, and a TCI-state $ID_{i,2}$ indicates the second TCI-state corresponding to the TCI field value i. $j \in \{1,2\}$. It should be understood that, if one TCI-state group includes more TCI-states, one TCI field value may correspond to more TCI-states, and a value of j may also be another value.

$C_i$ is used to indicate whether there is the second TCI-state (that is, the TCI-state $ID_{i,2}$) in the $(i+1)^{th}$ TCI-state group. If there is the second TCI-state, the TCI-state group includes two TCI-states. If there is no second TCI-state, the TCI-state group includes only a single TCI-state. Specifically, from a perspective of parsing a MAC CE format, the terminal device may determine, based on a value of $C_i$, whether there is an octet (octet) corresponding to the TCI-state $ID_{i,2}$. For example, if $C_i=1$, the terminal device may determine that there is an octet corresponding to the TCI-state $ID_{i,2}$ in the MAC CE, that is, determine that eight bits after the TCI-state $ID_{i,1}$ carry one $S_i$ field and one TCI-state $ID_{i,2}$ field. If $C_i=0$, the terminal device may determine that there is no octet corresponding to the TCI-state $ID_{i,2}$ in the MAC CE, that is, determine that eight bits after the TCI-state $ID_{i,1}$ carry one $C_{i+1}$ field and one TCI-state $ID_{i+1,1}$ field.

$S_i$ is used to indicate whether there is an $(i+2)^{th}$ TCI-state group in the plurality of TCI-state groups, or used to indicate whether there is the TCI-state $ID_{i+1,1}$ in the MAC CE signaling, or used to indicate whether there is an octet corresponding to the TCI-state $ID_{i,1}$ in the MAC CE signaling. For example, if $S_i=1$, the terminal device may determine that there is an octet corresponding to the TCI-state $ID_{i+1,1}$ in the MAC CE, that is, determine that eight bits after the TCI-state $ID_{i,2}$ carry one $C_{i+1}$ field and one TCI-state $ID_{i+1,1}$ field. If $S_i=0$, the terminal device may determine that there is no octet corresponding to the TCI-state $ID_{i+1,1}$ in the MAC CE, that is, determine that there is no other bit after the TCI-state $ID_{i,2}$. In other words, an end position of the MAC CE is determined by using $S_i$. If $S_i=0$, it indicates that the octet corresponding to the TCI-state $ID_{i,2}$ is the last octet, and no other octet follows. Optionally, $S_i$ may also be used as a reserved field.

The terminal device may determine, by using the foregoing method, a quantity N+1 of TCI-state groups activated by using the MAC CE signaling. Optionally, when a quantity of TCI-state groups activated by using the MAC CE signaling is less than a quantity of TCI field values, the active TCI-state groups may be sequentially mapped to the first several smallest groups of TCI field values.

It should be understood that the quantity N+1 of TCI-state groups activated by using the MAC CE signaling may be further configured through an RRC parameter (for example, tci-PresentInDCI or tci-PresentInDCI-ForDCIFormat1_2), or determined based on a quantity X of bits of a TCI field configured by using RRC signaling. For example, $N-1=2^X$. For example, if a length of a TCI field value configured by using RRC signaling is 3 bits, that is, X=3, it may be determined that eight groups of TCI-states, that is, N=7, are activated by using the MAC-CE signaling.

It should be further understood that the TCI-state $ID_{i,2}$ and the TCI-state $ID_{i,1}$ shown in FIG. 13 may be the same or may be different. When the TCI-state $ID_{i,2}$ is the same as the TCI-state $ID_{i,1}$, it indicates that only a single TCI-state is actually activated, that is, the $(i+1)^{th}$ TCI-state group includes only a single TCI-state, or the TCI field value i is associated with only one TCI-state (that is, the TCI-state $ID_{i,1}$). In addition, the TCI-state $ID_{i,2}$ may also be a specified special value or an invalid value. When the TCI-state $ID_{i,2}$ is a specified special value or an invalid value, it indicates that only a single TCI-state (that is, the TCI-state $ID_{i,1}$) is actually activated, that is, the $(i+1)^{th}$ TCI-state group includes only a single TCI-state (that is, the TCI-state $ID_{i,1}$), or the TCI field value i is associated with only one TCI-state (that is, the TCI-state $ID_{i,1}$).

In the case 2, the MAC CE signaling may be used to activate a plurality of TCI-state groups, and each TCI-state group may include one or two TCI-states. A first TCI-state (that is, the TCI-state $ID_{i,1}$) is mapped to a TCI field in a PDCCH corresponding to one TRP. If there is a second TCI-state (that is, the TCI-state $ID_{i,2}$), the second TCI-state is mapped to a TCI field in a PDCCH corresponding to the other TRP, and i∈{0,1, . . . , N}. Specifically, meanings of the R field, the serving cell (serving cell) ID field, the $C_i$ field, and the $S_i$ field may be the same as those in the case 1, and details are not described herein again.

The TCI-state $ID_{i,j}$ represents a TCI-state corresponding to the TCI field value i in a PDCCH corresponding to a $j^{th}$ TRP or a $j^{th}$ CORESET group, and j∈{1,2}. For example, the TCI-state $ID_{i,1}$ indicates a TCI-state (that is, the first TCI-state) corresponding to the TCI field value i in a PDCCH corresponding to the first TRP or the first CORESET group, and the TCI-state $ID_{i,2}$ indicates a TCI-state (that is, the second TCI-state) corresponding to the TCI field value i in a PDCCH corresponding to the second TRP or the second CORESET group.

For example, the TRP may be represented by a CORESET group. The network device may configure a plurality of CORESETs for the terminal device. A group index (for example, CORESETPoolIndex) may be configured for each CORESET, and a value (for example, a value of CORESETPoolIndex) of the group index may be 0 or 1. If the group index is not configured, the group index is 0 by default. Therefore, that the group index is not configured is equivalent to and can be replaced by that the group index is 0 by default. CORESETs having the same group index value may be considered as one group, and correspond to one TRP. Therefore, the TCI-state association relationship may also be represented as: The TCI-state $ID_{i,j}$ indicates a TCI-state corresponding to the TCI field value i in a PDCCH corresponding to a CORESET whose group index value is j−1. For example, the TCI-state $ID_{i,1}$ indicates a TCI-state corresponding to the TCI field value i in a PDCCH corresponding to a CORESET whose group index value is 0, and the TCI-state ID indicates a TCI-state corresponding to the TCI field value i in a PDCCH corresponding to a CORESET whose group index value is 1. Alternatively, the TCI-state $ID_{i,1}$ indicates a TCI-state corresponding to the TCI field value i in a PDCCH corresponding to a CORESET whose group index value is 1, and the TCI-state $ID_{i,2}$ indicates a TCI-state corresponding to the TCI field value i in a PDCCH corresponding to a CORESET whose group index value is 0.

In the two cases, mapping manners of the TCI-state $ID_{i,j}$ are different, and the terminal device may determine a specific case, to determine the mapping manner of the TCI-state $ID_{i,j}$. In this embodiment, the terminal device may determine the mapping manner of the TCI-state $ID_{i,j}$ in the following plurality of manners. This is not limited in this embodiment of this application.

In a possible implementation, the terminal device may perform determining based on a group index value (for example, CORESETPoolIndex) associated with a configured CORESET. In this embodiment of this application, each CORESET may be associated with a group index value, and the group index value may be a value (for example, 0 or 1) explicitly configured by the network device, or the group index value may be a default value 0 when the network device does not configure the group index value. That the CORESET is associated with the group index value 0 may be that the group index value 0 is configured for the CORESET, or no group index value is configured for the CORESET. For example, if group index values associated with all the CORESETs include two different values in total, for example, group index values associated with some CORESETs are 0, and group index values associated with some CORESETs are 1, the terminal device may use the mapping manner in the case 2. Alternatively, if group index values associated with all the CORESETs have only one value, for example, the group index values associated with all the CORESETs are 0 (which may be replaced with: The group index value 0 is configured for all the CORESETs; or the group index value is not configured for all the CORESETs, or the group index value 0 is configured for some CORESETs, and the group index value is not configured for some CORESETs); or group index values associated with all the CORESETs are 1 (which may be replaced with: The group index value 1 is configured for all the CORESETs), the terminal device may use the mapping manner in the case 1.

In another possible implementation, the terminal device may determine the mapping manner of the TCI-state $ID_{i,j}$ by using information (for example, the R field) in the MAC CE. For example, a value of the R field is used to indicate the case 1 or the case 2. Specifically, for example, R=0 is used to indicate the case 1, and R=1 is used to indicate the case 2. Alternatively, R=0 is used to indicate the case 2, and R=1 is used to indicate the case 1.

It should be noted that j in the TCI-state $ID_{i,j}$ in the MAC CE may also be numbered from 0. In this case, the TCI-state $ID_{i,j}$ may be replaced with a TCI-state $ID_{i,j-1}$. For example, the TCI-state $ID_{i,1}$ is replaced with the TCI-state $ID_{i,0}$, and the TCI-state $ID_{i,2}$ is replaced with the TCI-state $ID_{i,1}$. i in the TCI-state $ID_{i,j}$ in the MAC CE may also be numbered from 1. In this case, the TCI-state $ID_{i,j}$ may be replaced with the TCI-state $ID_{i+1,j}$. For example, the TCI-state $ID_{0,j}$ is replaced with the TCI-state $ID_{1,j}$, the TCI-state $ID_{1,j}$ is replaced with the TCI-state $ID_{2,j}$, and the rest can be deduced by analogy.

A quantity or a quantity upper limit of different TCI-states included in the MAC CE format may be reported by the terminal device to the network device in a terminal capability reporting process. In other words, different quantities of TCI-states corresponding to two TRPs or two CORESET groups may be reported by the terminal device to the network device in a terminal capability reporting process. Details are not described herein.

It should be understood that there may be a plurality of MAC CEs in different formats in the system, for example, a MAC CE (for ease of description, referred to as a format 1 for short) used to activate a TCI-state in the R15 protocol. The TCI-state uses a bitmap to indicate a to-be-active TCI-state (a bit whose value is 1 indicates that a corresponding TCI-state is activated, and active TCI-states in ascending order of indexes are one-by-one associated with TCI field values in ascending order of TCI field values). A maximum of eight TCI-states can be activated. In addition, the MAC CE format (for ease of description, the format is referred to as a format 2 for short) described in the foregoing method also exists. In this way, the terminal device may receive a plurality of MAC CEs used to activate the TCI-state of the PDSCH. In this case, one of the following methods may be used. This is not limited in this embodiment of this application.

1. The terminal device may determine, by using a latest received MAC CE signaling, a TCI-state corresponding to each TCI field value.

2. The terminal device may select, based on priorities of MAC CEs in different formats, a MAC CE with a relatively high format priority, and determine a TCI-state corresponding to each TCI field value.

Specifically, different formats may have different priorities. For example, a priority of the format 2 is higher than that of the format 1. After receiving the MAC CE in the format 2, the terminal device refreshes a TCI-state corresponding to each TCI field value, regardless of whether the TCI-state corresponding to the current TCI field value is activated by using the MAC CE signaling in the format 1 or activated by using the MAC CE signaling in the format 2. When the MAC CE in the format 1 is received, if the TCI-state corresponding to the current TCI field value is activated by using the MAC CE signaling in the format 1, the terminal device refreshes a TCI-state corresponding to each TCI field value. If the TCI-state corresponding to the current TCI field value is activated by using the MAC CE signaling in the format 2, the terminal device cannot refresh a TCI-state corresponding to each TCI field value. Alternatively, the foregoing priorities may be reversed. For example, the priority of the format 1 is higher than the priority of the format 2. After receiving the MAC CE in the format 1, the terminal device refreshes a TCI-state corresponding to each TCI field value, regardless of whether the TCI-state corresponding to the current TCI field value is activated by using the MAC CE signaling in the format 1 or activated by using the MAC CE signaling in the format 2. When the MAC CE in the format 2 is received, if the TCI-state corresponding to the current TCI field value is activated by using the MAC CE signaling in the format 2, the terminal device refreshes a TCI-state corresponding to each TCI field value. If the TCI-state corresponding to the current TCI field value is activated by using the MAC CE signaling in the format 1, the terminal device cannot refresh a TCI-state corresponding to each TCI field value.

3. The terminal device may report, in a capability reporting process, a type that is of a MAC CE and that is supported by the terminal device, and the network device sends only a MAC CE in a format supported by the terminal device. Alternatively, the terminal device may report, in a capability reporting process, a release that is of a protocol and that is supported by the terminal device (for example, report that the R15 protocol is supported or report that the R16 protocol is supported), and the network device sends, to the terminal device, only a MAC CE in a format supported by a protocol of the corresponding release. For example, the terminal device reports that the R15 protocol is supported, and the network device sends only a MAC CE in the format 1 to the terminal device. The terminal device reports that the R16 protocol is supported, and the network device sends only a MAC CE in the format 2 to the terminal device.

4. It may be limited in a protocol that the network device cannot send both the MAC CE in the format 1 and the MAC CE in the format 2 to the terminal device.

It should be understood that sequence numbers of the foregoing processes do not indicate an execution sequence. The execution sequence of the processes should be determined based on functions and internal logic of the processes, and should not be construed as any limitation on an implementation process of this embodiment of this application.

The data transmission method according to the embodiments of this application is described in detail above with reference to FIG. 1 and FIG. 10, and data transmission apparatuses according to embodiments of this application are described in detail below with reference to FIG. 11 and FIG. 12.

Figure 11:
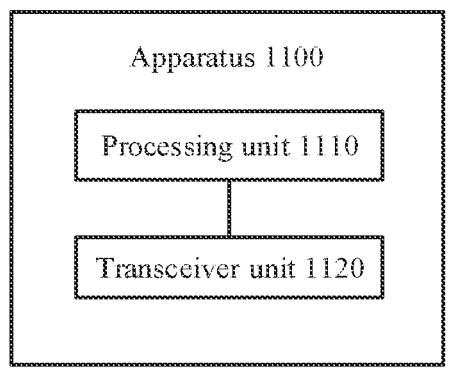
FIG. 11 is a schematic block diagram of a data transmission apparatus according to an embodiment of this application.

FIG. 11 shows a data transmission apparatus 1100 according to an embodiment of this application. The apparatus 1100 may be a terminal device, or may be a chip in a terminal device. The apparatus 1100 includes a processing unit 1110 and a transceiver unit 1120.

In a possible implementation, the apparatus 1100 is configured to perform procedures and steps corresponding to the terminal device in the method 400.

The transceiver unit 1120 is configured to receive a first physical downlink control channel (PDCCH), where the first PDCCH is used to schedule a first physical downlink shared channel (PDSCH); and receive a downlink signal by using a first transmission configuration indicator state (TCI-state).

The processing unit 1110 is configured to: obtain a time interval between the first PDCCH and the first PDSCH; and if the time interval is less than a preset threshold, obtain the first PDSCH from the downlink signal.

Optionally, the first TCI-state is a TCI-state included in a TCI-state group corresponding to a smallest or largest TCI field value in one or more TCI-state groups that include a TCI-state used by the first PDCCH; or the first TCI-state is a TCI-state included in a TCI-state group corresponding to a smallest or largest TCI field value in one or more TCI-state groups that include an active TCI-state in a CORESET with a smallest or largest index in one or more latest received CORESETs, where the TCI-state group corresponds to one TCI field value, and the TCI-state group includes one TCI-state or two TCI-states.

Optionally, if there is no one or more TCI-state groups that include the TCI-state used by the first PDCCH, the first TCI-state is the TCI-state used by the first PDCCH; or if there is no one or more TCI-state groups that include the active TCI-state in the CORESET with the smallest or largest index in the one or more latest received CORESETs, the first TCI-state is the active TCI-state in the CORESET with the smallest or largest index in the one or more latest received CORESETs.

Optionally, when no activation signaling is received, the first TCI-state is the TCI-state used by the first PDCCH; or the first TCI-state is the active TCI-state in the CORESET with the smallest or largest index in the one or more latest received CORESETs, where the activation signaling is used to activate a TCI-state used for PDSCH transmission.

Optionally, the processing unit 1110 is further configured to: if the time interval is greater than or equal to the preset threshold, and the first PDCCH does not carry information about a TCI-state, determine a second TCI-state, and receive, through the transceiver unit, the first PDSCH by using the second TCI-state.

Optionally, the second TCI-state is a TCI-state included in the TCI-state group corresponding to the smallest or largest TCI field value in the one or more TCI-state groups that include the TCI-state used by the first PDCCH; or the second TCI-state is a TCI-state included in the TCI-state group corresponding to the smallest or largest TCI field value in the one or more TCI-state groups that include the active TCI-state in the CORESET with the smallest or largest index in the one or more latest received CORESETs, where the TCI-state group corresponds to one TCI field value, and the TCI-state group includes one TCI-state or two TCI-states.

Optionally, if there is no one or more TCI-state groups that include the TCI-state used by the first PDCCH, the second TCI-state is the TCI-state used by the first PDCCH; or if there is no one or more TCI-state groups that include the active TCI-state in the CORESET with the smallest or largest index in the one or more latest received CORESETs, the second TCI-state is the active TCI-state in the CORESET with the smallest or largest index in the one or more latest received CORESETs.

Optionally, when no activation signaling is received, the second TCI-state is the TCI-state used by the first PDCCH; or the second TCI-state is the active TCI-state in the CORESET with the smallest or largest index in the one or more latest received CORESETs, where the activation signaling is used to activate a TCI-state used for PDSCH transmission.

Optionally, the transceiver unit 1120 is further configured to: receive first signaling, where the first signaling is used to activate one or more TCI-states for one CORESET, and the first signaling includes one or more of the following fields: a field used to indicate a quantity of active TCI-states, or a field used to indicate whether a quantity of active TCI-states is greater than or equal to 1.

Optionally, the processing unit 1110 is further configured to: determine, based on a plurality of groups of currently active TCI-states used for PDSCH transmission, whether the network device transmits the first PDSCH by using two TCI-states; and if at least one TCI-state group includes two TCI-states in the plurality of groups of currently active TCI-states used for PDSCH transmission, determine that the network device sends the first PDSCH by using the two TCI-states.

In a possible implementation, the apparatus 1100 is configured to perform procedures and steps corresponding to the terminal device in the method 700.

The transceiver unit 1120 is configured to: receive N physical downlink control channels (PDCCH), where the N PDCCHs are respectively used to schedule N physical downlink shared channels (PDSCH), and N is an integer greater than 1; and receive a downlink signal by using N transmission configuration indicator states (TCI-states).

The processing unit 1110 is configured to: obtain a time interval between a first PDCCH in the N PDCCHs and a first PDSCH corresponding to the first PDCCH; and if the time interval is less than a preset threshold, obtain the first PDSCH from a downlink signal received by using a first TCI-state corresponding to the first PDCCH in the N TCI-states.

Optionally, the first TCI-state is a currently active TCI-state in a control resource set (CORESET) with a smallest or largest index in a group of first CORESETs that are received in a latest slot, and the first CORESET group is a CORESET group including CORESETs having a same index as a CORESET corresponding to the first PDCCH.

Optionally, the index is an index related to a transmission station. CORESETs corresponding to a same transmission station use a same index, and CORESETs corresponding to different transmission stations use different indexes.

Optionally, the transceiver unit 1120 is specifically configured to: receive the downlink signal in a first time interval by using the first TCI-state, where the first time interval is a time interval including K consecutive symbols starting from the first symbol or the last symbol of the first PDCCH or the first symbol after the first PDCCH, and K is a quantity of symbols corresponding to the preset threshold.

Optionally, the transceiver unit 1120 is specifically configured to: receive the downlink signal in the first time interval by using the first TCI-state; and receive the downlink signal in a second time interval by using a second TCI-state in the N TCI-states, where a transmission time of the first PDCCH is earlier than a transmission time of a second PDCCH, a time interval including K consecutive symbols starting from a first moment overlaps a time interval including K consecutive symbols starting from a second moment, the first time interval is a first half of a time interval including the first moment to a third moment, the second time interval is a second half of the time interval including the first moment to the third moment, the first moment is the first symbol or the last symbol of the first PDCCH or the first symbol after the first PDCCH, the second moment is the first symbol or the last symbol of the second PDCCH or the first symbol after the second PDCCH, and the third moment is a $K^{th}$ symbol after the second moment.

In a possible implementation, the apparatus 1100 is configured to perform procedures and steps corresponding to the terminal device in the method 500.

The transceiver unit 1120 is configured to: receive downlink control information (DCI), where the DCI is used to schedule a physical downlink shared channel (PDSCH); and receive the PDSCH based on the DCI, where when a preset condition is met, the DCI and the PDSCH meet one or more of the following: a time interval between a receiving time of the DCI and a receiving time of the PDSCH is greater than or equal to a preset threshold; or the DCI includes a transmission configuration indicator (TCI) field value, and the preset condition includes one or more of the following: a cell corresponding to a physical downlink control channel (PDCCH) for transmitting the DCI is different from a cell corresponding to the PDSCH; a subcarrier spacing used by the DCI is different from a subcarrier spacing used by the PDSCH; a transmission configuration indicator state (TCI-state) used for PDSCH transmission is not activated in a cell corresponding to the PDSCH; a control resource set (CORESET) is not configured in a cell corresponding to the PDSCH; transmission is performed in a cell corresponding to the DCI by using a frequency in a frequency range (FR) 1; or a TCI-state including quasi-co-location (QCL)-TypeD information is not configured in a cell corresponding to the DCI.

Optionally, the preset condition includes: the cell corresponding to the PDCCH for transmitting the DCI is different from the cell corresponding to the PDSCH; the TCI-state used for PDSCH transmission is not activated in the cell corresponding to the PDSCH; and the subcarrier spacing used by the DCI is different from the subcarrier spacing used by the PDSCH.

Optionally, the preset condition includes: the TCI-state used for PDSCH transmission is not activated in the cell corresponding to the PDSCH; and the subcarrier spacing used by the DCI is different from the subcarrier spacing used by the PDSCH.

In a possible implementation, the apparatus 1100 is configured to perform procedures and steps corresponding to the terminal device in the method 500.

The transceiver unit 1120 is configured to: receive downlink control information (DCI), where the DCI is used to schedule a physical downlink shared channel (PDSCH); and receive the PDSCH by using a transmission configuration indicator state (TCI-state), where when a preset condition is met, the TCI-state is a TCI-state used by a physical downlink control channel (PDCCH) for transmitting the DCI, and the preset condition includes one or more of the following: a cell corresponding to the physical downlink control channel (PDCCH) for transmitting the DCI is different from a cell corresponding to the PDSCH; a time interval between a receiving time of the DCI and a receiving time of the PDSCH is greater than or equal to a preset threshold; the DCI does not include a TCI field value; transmission is performed in a cell corresponding to the DCI by using a frequency in a frequency range (FR) 2; a TCI-state including quasi-co-location (QCL)-TypeD information is configured in a cell corresponding to the DCI; a TCI-state used for PDSCH transmission is not activated in a cell corresponding to the PDSCH; or a control resource set (CORESET) is not configured in a cell corresponding to the PDSCH.

Optionally, the preset condition includes: the cell corresponding to the PDCCH for transmitting the DCI is different from the cell corresponding to the PDSCH; the cell corresponding to the DCI performs transmission by using the frequency in the frequency range (FR) 2; the DCI does not include the TCI field value; and the time interval between the receiving time of the DCI and the receiving time of the PDSCH is greater than or equal to the preset threshold.

In a possible implementation, the apparatus 1100 is configured to perform procedures and steps corresponding to the terminal device in the method 500.

The transceiver unit 1120 is configured to: receive downlink control information (DCI), where the DCI is used to schedule a physical downlink shared channel (PDSCH); and receive the PDSCH by using a transmission configuration indicator state (TCI-state), where when a preset condition is met, the TCI-state is an active TCI-state in a CORESET with a smallest index in at least one CORESET that is latest monitored by a terminal device in a currently active bandwidth part (BWP) of a cell corresponding to the DCI, and the preset condition includes one or more of the following: a cell corresponding to a physical downlink control channel (PDCCH) for transmitting the DCI is different from a cell corresponding to the PDSCH; a time interval between a receiving time of the DCI and a receiving time of the PDSCH is less than a preset threshold; the cell corresponding to the DCI performs transmission by using a frequency in a frequency range (FR) 2; a TCI-state including quasi-co-location (QCL)-TypeD information is configured in the cell corresponding to the DCI; a TCI-state used for PDSCH transmission is not activated in a cell corresponding to the PDSCH; or a control resource set (CORESET) is not configured in a cell corresponding to the PDSCH.

Optionally, the preset condition includes: the cell corresponding to the PDCCH for transmitting the DCI is different from the cell corresponding to the PDSCH; the cell corresponding to the DCI performs transmission by using the frequency in the frequency range (FR) 2; the time interval between the receiving time of the DCI and the receiving time of the PDSCH is less than the preset threshold; and the TCI-state used for PDSCH transmission is not activated in the cell corresponding to the PDSCH.

In a possible implementation, the apparatus 1100 is configured to perform procedures and steps corresponding to the terminal device in the method 600.

The transceiver unit 1120 is configured to receive first signaling, where the first signaling is used to activate a plurality of transmission configuration indicator state TCI state groups, and each of the plurality of TCI state groups includes one or two TCI states.

The processing unit 1110 is configured to determine a mapping manner between each TCI state and a TCI field value based on configuration information of a control resource set (CORESET) or indication information in the first signaling.

Optionally, the mapping manner includes a first mapping manner, and in the first mapping manner, in the plurality of TCI state groups, a $j^{th}$ TCI state in a TCI state group i indicates a $j^{th}$ TCI state corresponding to a TCI field value i, where i is an integer greater than or equal to 0, and j is a positive integer.

Optionally, the mapping manner includes a second mapping manner, and in the second mapping manner, in the plurality of TCI state groups, the $j^{th}$ TCI state in the TCI state group i indicates a TCI state corresponding to the TCI field value i in a PDCCH corresponding to a CORESET whose group index value is j−1, where i is an integer greater than or equal to 0, and j is a positive integer.

Optionally, each CORESET is associated with a group index value, and CORESETs having a same group index value form a group.

Optionally, when group index values of each configured CORESET include two different values in total, the mapping manner is the second mapping manner; or when a group index value of each configured CORESET includes one value in total, the mapping manner is the first mapping manner.

Optionally, when a value of a first field in the first signaling is 0, the mapping manner is the first mapping manner; or when a value of a first field in the first signaling is 1, the mapping manner is the second mapping manner.

Optionally, when a value of a first field in the first signaling is 1, the mapping manner is the first mapping manner; or when a value of a first field in the first signaling is 0, the mapping manner is the second mapping manner.

Optionally, the first field is a field including the first bit in the first signaling.

Optionally, in the first signaling, a second field is included before a field corresponding to the last TCI state in the TCI state group i in the plurality of TCI state groups, and the second field is used to indicate whether a TCI state group i+1 exists in the plurality of TCI state groups, where i is an integer greater than or equal to 0.

Optionally, the transceiver unit 1120 is further configured to: send a terminal capability parameter, where the terminal capability parameter includes one or more of the following:

a first capability parameter, used to indicate an upper limit of a quantity of different TCI states corresponding to a CORESET associated with one group index value when a configured CORESET is associated with two different group index values;

a second capability parameter, used to indicate an upper limit of a quantity of different TCI states corresponding to a configured CORESET when the configured CORESET is associated with two different group index values;

a third capability parameter, used to indicate an upper limit of a quantity of different TCI states corresponding to a configured CORESET when the configured CORESET is associated with a same group index value;

a fourth capability parameter, used to indicate an upper limit of a quantity of different TCI states in TCI states indicated by the first signaling:

a fifth capability parameter, used to indicate an upper limit of a quantity of different TCI states in TCI states indicated by the first signaling when a configured CORESET is associated with two different group index values; or a sixth capability parameter, used to indicate an upper limit of a quantity of different TCI states in TCI states indicated by the first signaling when a configured CORESET is associated with a same group index value.

It should be understood that, the apparatus 1100 herein is presented in a form of function units. The term "unit" herein may be an application-specific integrated circuit (ASIC), an electronic circuit, a processor (for example, a shared processor, a dedicated processor, or a group processor) configured to execute one or more software or firmware programs, a memory, a merged logic circuit, and/or another proper component that supports the described function. In an optional example, a person skilled in the art may understand that the apparatus 1100 may be specifically the terminal device in the foregoing embodiments, and the apparatus 1100 may be configured to perform procedures and/or steps corresponding to the terminal device in the foregoing method embodiments. To avoid repetition, details are not described herein again. In another optional example, a person skilled in the art may understand that the apparatus 1100 may be specifically the network device in the foregoing embodiments, and the apparatus 1100 may be configured to perform procedures and/or steps corresponding to the network device in the foregoing method embodiments. To avoid repetition, details are not described herein again.

The apparatus 1100 in the foregoing solutions has a function of implementing corresponding steps performed by the terminal device or the network device in the foregoing methods. The functions may be implemented by hardware, or may be implemented by hardware by executing corresponding software. The hardware or the software includes one or more modules corresponding to the foregoing functions. For example, the transceiver unit 1120 may include a sending unit and a receiving unit. The sending unit may be configured to implement steps and/or procedures that correspond to the transceiver unit and that are used to perform a sending action, and the receiving unit may be configured to implement steps and/or procedures that correspond to the transceiver unit and that are used to perform a receiving action. The sending unit may be replaced with a transmitter, and the receiving unit may be replaced with a receiver, to separately perform receiving and sending operations and related processing operations in the method embodiments.

In this embodiment of this application, the apparatus 1100 in FIG. 1 may alternatively be a chip or a chip system, for example, a system on chip (SoC). Correspondingly, the transceiver unit 1120 may be a transceiver circuit of the chip. This is not limited herein.

Figure 12:
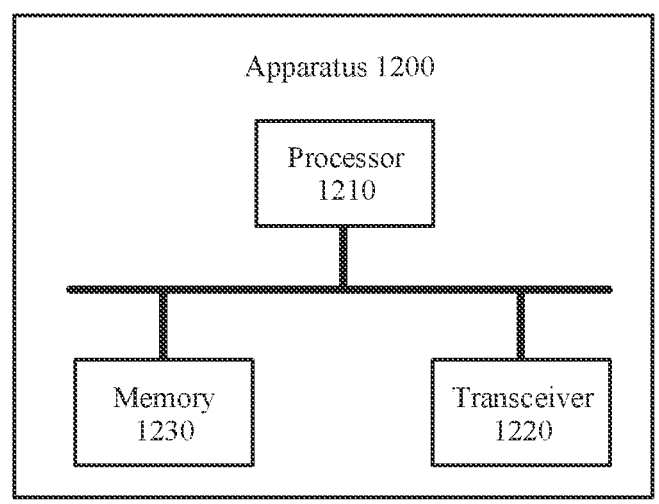
FIG. 12 is a schematic block diagram of another data transmission apparatus according to an embodiment of this application.

FIG. 12 shows another data transmission apparatus 1200 according to an embodiment of this application. The apparatus 1200 includes a processor 1210, a transceiver 1220, and a memory 1230. The processor 1210, the transceiver 1220, and the memory 1230 communicate with each other through an internal connection path. The memory 1230 is configured to store an instruction. The processor 1210 is configured to execute the instruction stored in the memory 1230, to control the transceiver 1220 to send a signal and/or receive a signal.

In a possible implementation, the apparatus 1200 is configured to perform procedures and steps corresponding to the terminal device in the method 400.

The processor 1210 is configured to: receive, through the transceiver 1220, a first physical downlink control channel (PDCCH), where the first PDCCH is used to schedule a first physical downlink shared channel (PDSCH) receive a downlink signal by using a first transmission configuration indicator state (TCI-state); obtain a time interval between the first PDCCH and the first PDSCH; and if the time interval is less than a preset threshold, obtain the first PDSCH from the downlink signal.

In a possible implementation, the apparatus 1200 is configured to perform procedures and steps corresponding to the terminal device in the method 700.

The processor 1210 is configured to: receive, through the transceiver 1220, N physical downlink control channels (PDCCH), where the N PDCCHs are respectively used to schedule N physical downlink shared channels (PDSCH), and N is an integer greater than 1; receive a downlink signal by using N transmission configuration indicator states (TCI-states); obtain a time interval between a first PDCCH in the N PDCCHs and a first PDSCH corresponding to the first PDCCH; and if the time interval is less than a preset threshold, obtain the first PDSCH from a downlink signal received by using a first TCI-state corresponding to the first PDCCH in the N TCI-states.

In a possible implementation, the apparatus 1200 is configured to perform procedures and steps corresponding to the terminal device in the method 500. Details are not described herein.

In a possible implementation, the apparatus 1200 is configured to perform procedures and steps corresponding to the terminal device in the method 600. Details are not described herein.

It should be understood that the apparatus 1200 may be specifically the terminal device or the network device in the foregoing embodiments, and may be configured to perform steps and/or procedures corresponding to the terminal device or the network device in the foregoing method embodiments. Optionally, the memory 1230 may include a read-only memory and a random access memory, and provide the instruction and data to the processor. A part of the memory may further include a nonvolatile random access memory. For example, the memory may further store information about a device type. The processor 1210 may be configured to execute the instruction stored in the memory. In addition, when the processor 1210 executes the instruction stored in the memory, the processor 1210 is configured to perform steps and/or the procedures corresponding to the terminal device or the network device in the foregoing method embodiments. The transceiver unit 1220 may include a transmitter and a receiver. The transmitter may be configured to implement steps and/or procedures that correspond to the transceiver and that are used to perform a sending action, and the receiver may be configured to implement steps and/or procedures that correspond to the transceiver and that are used to perform a receiving action.

It should be understood that in the embodiments of this application, the processor in the foregoing apparatus may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

In an implementation process, steps in the foregoing methods can be implemented by using a hardware integrated logical circuit in the processor or by using instructions in a form of software. The steps of the method disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor executes the instruction in the memory and completes the steps in the foregoing methods in combination with the hardware of the processor. To avoid repetition, details are not described herein again.

A person of ordinary skill in the art may be aware that, method steps and units described in the embodiments disclosed in this specification may be implemented by electronic hardware, computer software, or a combination thereof. To clearly describe interchangeability between the hardware and the software, the foregoing content has generally described steps and compositions of each embodiment according to functions. Whether the functions are performed by hardware or software depends on particular applications and design constraints of the technical solutions. A person of ordinary skill in the art may use a different method to implement the described function for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the foregoing apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving downlink control information (DCI), wherein the DCI contains a transmission configuration indicator (TCI) field, and the TCI field has one or more TCI field values; and
   if a time interval between the DCI and a corresponding physical downlink shared channel (PDSCH) is less than a preset threshold, at least one TCI field value of the one or more TCI field values corresponds to two transmission configuration indicator states (TCI-states), and at least one configured TCI-state for a serving cell of a PDSCH comprises quasi-co-location (QCL)-TypeD information, receiving the corresponding PDSCH using two default TCI-states, wherein the two default TCI-states are different.

2. The method according to claim 1, wherein the two default TCI-states are two TCI-states corresponding to a smallest TCI field value among TCI field values that correspond to two TCI-states.

3. The method according to claim 1, wherein the PDSCH is transmitted using a frequency in a frequency range (FR) 2.

4. The method according to claim 1, wherein terminal capability information indicates that reception of the PDSCH using the two default TCI-states is supported.

5. The method according to claim 1, wherein the method further comprises:
receiving second DCI, wherein the second DCI contains a second TCI field and the second TCI field has one or more second TCI field values; and
if a second time interval between the second DCI and a corresponding second PDSCH is less than the preset threshold, and each of the one or more second TCI field values corresponds to a single TCI-state, receiving the second PDSCH using a single default TCI-state.

6. The method according to claim 5, wherein the single default TCI-state is an active TCI-state in a control resource set (CORESET) with a smallest index in one or more CORESETs that are monitored by a terminal device in a latest slot, and the latest slot is a slot in which the one or more CORESETs are monitored in an active bandwidth part (BWP) of a serving cell that schedules the second PDSCH.

7. The method according to claim 5, wherein second terminal capability information indicates that reception of the second PDSCH using the two default TCI-states is not supported.

8. A method, comprising:
sending downlink control information (DCI), wherein the DCI contains a transmission configuration indicator (TCI) field, and the TCI field has one or more TCI field values; and
if a time interval between the DCI and a corresponding physical downlink shared channel (PDSCH) is less than a preset threshold, at least one TCI field value of the one or more TCI field values corresponds to two transmission configuration indicator states (TCI-states), and at least one configured TCI-state for a serving cell of a PDSCH comprises quasi-co-location (QCL)-TypeD information, receiving the corresponding PDSCH using two default TCI-states, wherein the two default TCI-states are different.

9. The method according to claim 8, wherein the two default TCI-states are two TCI-states corresponding to a smallest TCI field value among TCI field values that correspond to two TCI-states.

10. The method according to claim 8, wherein the PDSCH is transmitted using a frequency in a frequency range (FR) 2.

11. The method according to claim 8, wherein terminal capability information indicates that reception of the PDSCH using the two default TCI-states is supported.

12. The method according to claim 8, wherein the method further comprises:
sending second DCI, wherein the second DCI contains a second TCI field and the second TCI field has one or more second TCI field values; and
if a second time interval between the second DCI and a corresponding second PDSCH is less than the preset threshold, and each of the one or more second TCI field values corresponds to a single TCI-state, sending the second PDSCH using a single default TCI-state.

13. The method according to claim 12, wherein the single default TCI-state is an active TCI-state in a control resource set (CORESET) with a smallest index in one or more CORESETs that are monitored by a terminal device in a latest slot, and the latest slot is a slot in which the one or more CORESETs are monitored in an active bandwidth part (BWP) of a serving cell that schedules the second PDSCH.

14. An apparatus, wherein the apparatus is configured to:
receive downlink control information (DCI), wherein the DCI contains a transmission configuration indicator (TCI) field, and the TCI field has one or more TCI field values; and
if a time interval between the DCI and a corresponding physical downlink shared channel (PDSCH) is less than a preset threshold, at least one TCI field value of the one or more TCI field values corresponds to two transmission configuration indicator states (TCI-states), and at least one configured TCI-state for a serving cell of a PDSCH comprises quasi-co-location (QCL)-TypeD information, receiving the corresponding PDSCH using two default TCI-states, wherein the two default TCI-states are different.

15. The apparatus according to claim 14, wherein the two default TCI-states are two TCI-states corresponding to a smallest TCI field value among TCI field values that correspond to two TCI-states.

16. The apparatus according to claim 14, wherein the apparatus is further configured to:
receive second DCI, wherein the second DCI contains a second TCI field and the second TCI field has one or more second TCI field values; and
if a second time interval between the second DCI and a corresponding second PDSCH is less than the preset threshold, and each of the one or more second TCI field values corresponds to a single TCI-state, receive the second PDSCH using a single default TCI-state.

17. The apparatus according to claim 16, wherein the single default TCI-state is an active TCI-state in a control resource set (CORESET) with a smallest index in one or more CORESETs that are monitored by a terminal device in a latest slot, and the latest slot is a slot in which the one or more CORESETs are monitored in an active bandwidth part (BWP) of a serving cell that schedules the second PDSCH.

18. The apparatus according to claim 16, wherein second terminal capability information indicates that reception of the second PDSCH using the two default TCI-states is not supported.

19. The apparatus according to claim 14, wherein the PDSCH is transmitted using a frequency in a frequency range (FR) 2.

20. The apparatus according to claim 14, wherein terminal capability information indicates that reception of the PDSCH using the two default TCI-states is supported.

21. An apparatus, wherein the apparatus is configured to:
send downlink control information (DCI), wherein the DCI contains a transmission configuration indicator (TCI) field, and the TCI field has one or more TCI field values; and
if a time interval between the DCI and a corresponding physical downlink shared channel (PDSCH) is less than a preset threshold, at least one TCI field value of the one or more TCI field values corresponds to two transmission configuration indicator states (TCI-states), and at least one configured TCI-state for a serving cell of a PDSCH comprises quasi-co-location (QCL)-TypeD information, receiving the corresponding PDSCH using two default TCI-states, wherein the two default TCI-states are different.

22. The apparatus according to claim 21, wherein the two default TCI-states are two TCI-states corresponding to a smallest TCI field value among TCI field values that correspond to two TCI-states.

23. The apparatus according to claim 21, wherein the PDSCH is transmitted using a frequency in a frequency range (FR) 2.

24. The apparatus according to claim 21, wherein terminal capability information indicates that reception of the PDSCH using the two default TCI-states is supported.

25. The apparatus according to claim 21, wherein the apparatus is configured to:
   send second DCI, wherein the second DCI contains a second TCI field and the second TCI field has one or more second TCI field values; and
   if a second time interval between the second DCI and a corresponding second PDSCH is less than the preset threshold, and each of the one or more second TCI field values corresponds to a single TCI-state, send the second PDSCH using a single default TCI-state.

26. The apparatus according to claim 25, wherein the single default TCI-state is an active TCI-state in a control resource set (CORESET) with a smallest index in one or more CORESETs that are monitored by a terminal device in a latest slot, and the latest slot is a slot in which the one or more CORESETs are monitored in an active bandwidth part (BWP) of a serving cell that schedules the second PDSCH.

\* \* \* \* \*

UNITED STATES PATENT AND TRADEMARK OFFICE
CERTIFICATE OF CORRECTION

PATENT NO. : 12,063,682 B2
APPLICATION NO. : 17/219151
DATED : August 13, 2024
INVENTOR(S) : Bo Fan, Xi Zhang and Lu Rong Page 1 of 1

It is certified that error appears in the above-identified patent and that said Letters Patent is hereby corrected as shown below:

On the Title Page

In Column 2 (item (57) Abstract), In Line 2, Delete (TC-state" and insert -- TCI-state --.

In Column 2 (item (57) Abstract), In Line 8-9, Delete (TC-state);" and insert -- (TCI-state); --.

Signed and Sealed this
Nineteenth Day of November, 2024

Katherine Kelly Vidal
*Director of the United States Patent and Trademark Office*